(12) United States Patent
Boutaud

(10) Patent No.: US 10,969,476 B2
(45) Date of Patent: Apr. 6, 2021

(54) HIGH DYNAMIC RANGE FOR SENSING SYSTEMS AND METHODS

(71) Applicant: Rockwell Automation Technologies, Inc., Mayfield Heights, OH (US)

(72) Inventor: Frederic Boutaud, Lexington, MA (US)

(73) Assignee: Rockwell Automation Technologies, Inc., Mayfield Hts, OH (US)

( * ) Notice: Subject to any disclaimer, the term of this patent is extended or adjusted under 35 U.S.C. 154(b) by 433 days.

(21) Appl. No.: 16/031,084

(22) Filed: Jul. 10, 2018

(65) Prior Publication Data

US 2020/0018834 A1   Jan. 16, 2020

(51) Int. Cl.
*G01C 3/08* (2006.01)
*G01S 7/4865* (2020.01)
(Continued)

(52) U.S. Cl.
CPC ............ *G01S 7/4866* (2013.01); *G01S 7/484* (2013.01); *G01S 7/4808* (2013.01); *G01S 7/489* (2013.01);
(Continued)

(58) Field of Classification Search
CPC ...... G01S 7/4873; G01S 7/484; G01S 7/4866; G01S 7/4808; G01S 7/4861;
(Continued)

(56) References Cited

U.S. PATENT DOCUMENTS

| 3,810,115 A | 5/1974 | Stafford |
| 7,623,221 B2 | 11/2009 | Thun et al. |

(Continued)

FOREIGN PATENT DOCUMENTS

| EP | 2 402 784 A2 | 1/2012 |
| EP | 3 015 881 A2 | 5/2016 |

(Continued)

OTHER PUBLICATIONS

Extended European Search Report received for European Patent Application Serial No. 19198920.1 dated Feb. 5, 2020, 8 pages.
(Continued)

*Primary Examiner* — Mark Hellner
(74) *Attorney, Agent, or Firm* — Amin, Turocy & Watson, LLP

(57) ABSTRACT

A time of flight (TOF) sensor device employs a measuring sequence that facilitates accurate distance measurement across a high dynamic range. In one or more embodiments, for a given measuring sequence in which a distance of an object or surface corresponding to a pixel is to be determined, the TOF sensor device performs multiple iterations of a measuring cycle, whereby for each successive iteration the number of emitted and measured pulses that are accumulated for the iteration is increased relative to the previous iteration of the measuring cycle. In this way, multiple values of increasing resolution are measured for the same physical entity over a corresponding number of measuring cycles. The sensor then selects a value from the multiple measured values that yields the highest resolution without saturating the pixel, and this value is used to determine the pulse propagation time and object distance.

20 Claims, 38 Drawing Sheets

(51) Int. Cl.
| | |
|---|---|
| *G06T 7/73* | (2017.01) |
| *G01S 17/14* | (2020.01) |
| *G01S 7/48* | (2006.01) |
| *G01S 7/484* | (2006.01) |
| *G01S 7/4863* | (2020.01) |
| *G01S 7/487* | (2006.01) |
| *G01S 7/489* | (2006.01) |
| *G01S 17/89* | (2020.01) |

(52) U.S. Cl.
CPC .......... *G01S 7/4863* (2013.01); *G01S 7/4873* (2013.01); *G01S 17/14* (2020.01); *G01S 17/89* (2013.01); *G06T 7/73* (2017.01); *G06T 2207/10028* (2013.01); *G06T 2207/20208* (2013.01)

(58) Field of Classification Search
CPC ...... G01S 7/4865; G01S 7/4863; G01S 17/89; G01S 17/14; G01S 17/10; G06T 2207/10028; G06T 2207/20208
USPC .......................................................... 356/5.01
See application file for complete search history.

(56) References Cited

U.S. PATENT DOCUMENTS

| | | | |
|---|---|---|---|
| 9,880,266 B2* | 1/2018 | Davidovic | ............ G01J 1/4204 |
| 2004/0151345 A1 | 8/2004 | Morcom | |
| 2006/0192938 A1 | 8/2006 | Kawahito | |
| 2007/0109653 A1 | 5/2007 | Schofield | |
| 2007/0146682 A1 | 6/2007 | Tachino et al. | |
| 2007/0158533 A1 | 7/2007 | Bamji et al. | |
| 2008/0079833 A1 | 4/2008 | Ichikawa et al. | |
| 2008/0297360 A1 | 12/2008 | Knox et al. | |
| 2011/0037969 A1 | 2/2011 | Spickermann et al. | |
| 2011/0043806 A1 | 2/2011 | Guetta et al. | |
| 2011/0058167 A1 | 3/2011 | Knox et al. | |
| 2011/0194099 A1 | 8/2011 | Kamiyama | |
| 2012/0025964 A1 | 2/2012 | Beggs et al. | |
| 2012/0200841 A1 | 8/2012 | Kamiyama et al. | |
| 2012/0262696 A1 | 10/2012 | Eisele et al. | |
| 2014/0240692 A1 | 8/2014 | Tien et al. | |
| 2015/0362586 A1 | 12/2015 | Heinrich | |
| 2016/0124089 A1 | 5/2016 | Meinherz et al. | |
| 2016/0161611 A1 | 6/2016 | Ito et al. | |
| 2016/0342840 A1 | 11/2016 | Mullins et al. | |
| 2018/0045513 A1 | 2/2018 | Kitamura et al. | |
| 2018/0246214 A1 | 8/2018 | Ishii et al. | |
| 2018/0299554 A1 | 10/2018 | Van Dyck et al. | |
| 2018/0329063 A1 | 11/2018 | Takemoto et al. | |
| 2019/0081095 A1 | 3/2019 | Hanzawa et al. | |
| 2019/0174120 A1 | 6/2019 | Wang | |
| 2019/0179017 A1 | 6/2019 | Nagai | |
| 2019/0187290 A1 | 6/2019 | Kim et al. | |
| 2019/0281276 A1 | 9/2019 | Wang et al. | |

FOREIGN PATENT DOCUMENTS

| | | |
|---|---|---|
| EP | 3 141 930 A1 | 3/2017 |
| KR | 10-2017-0140786 A | 12/2017 |
| WO | 2008/152647 A2 | 12/2008 |
| WO | 2017/045618 A1 | 3/2017 |
| WO | 2018/042887 A1 | 3/2018 |

OTHER PUBLICATIONS

Communication pursuant to Rule 69 EPC received for EP Patent Application Serial No. 19198920.1 dated Mar. 30, 2020, 2 pages.
Non-Final Office Action received for U.S. Appl. No. 16/139,436 dated Mar. 5, 2020, 63 pages.
Communication pursuant to Rule 69 EPC received for EP Patent Application Serial No. 19185081.7 dated Jan. 20, 2020, 2 pages.
Notice of Allowance received for U.S. Appl. No. 16/139,436 dated Jun. 8, 2020, 47 pages.
IEC, "Safety of machinery—Electro-sensitive protective equipment—Part 3: Particular requirements for Active Opto-electronic Protective Devices responsive to Diffuse Reflection (AOPDDR)", International Standard, IEC 61496-3, Edition 2.0, Feb. 2008, 144 pages.
Non-Final Office Action received for U.S. Appl. No. 15/708,268 dated Oct. 18, 2019, 41 pages.
Zach et al., "A 2×32 Range-Fim:ling Sensor Array with Pixel-Inherent Suppression of Ambient Light up to 120Klx", Sensors and Mems, 20.7, IEEE International Solid-State Circuits Conference, 2009, pp. 352-353.
Davidovic et al., "A 33 ×25 µm2 Low-Power Range Finder", IEEE, 2012, pp. 922-925.
Chen et al., "Development of a Low-cost Ultra-tiny Line Laser Range Sensor", IEEE/RSJ International Conference on Intelligent Robots and Systems (IROS), Oct. 9-14, 2016, pp. 111-116.
Notice of Allowance received for U.S. Appl. No. 15/708,294 dated Oct. 31, 2019, 21 pages.
Extended European Search Report received for EP Patent Application Serial No. 19173193.4 dated Oct. 25, 2019, 9 pages.
Communication pursuant to Rule 69 EPC received for EP Patent Application Serial No. 19173193.4 dated Dec. 2, 2019, 2 pages.
Extended European Search Report received for EP Patent Application Serial No. 19173194.2 dated Oct. 25, 2019, 3 pages.
Communication pursuant to Rule 69 EPC received for EP Patent Application Serial No. 19173194.2 dated Dec. 2, 2019, 2 pages.
Extended European Search Report received for EP Patent Application Serial No. 19185081.7 dated Nov. 18, 2019, 10 pages.
Trunk, G.V., "Automatic Detection, Tracking, and Sensor Integration", Chapter 8, Naval Research Laboratory, pp. 8.1-8.23.
Non-Final Office Action received for U.S. Appl. No. 15/978,679 dated Oct. 8, 2020, 118 pages.
Non-Final Office Action received for U.S. Appl. No. 15/978,728 dated Oct. 2, 2020, 114 pages.

* cited by examiner

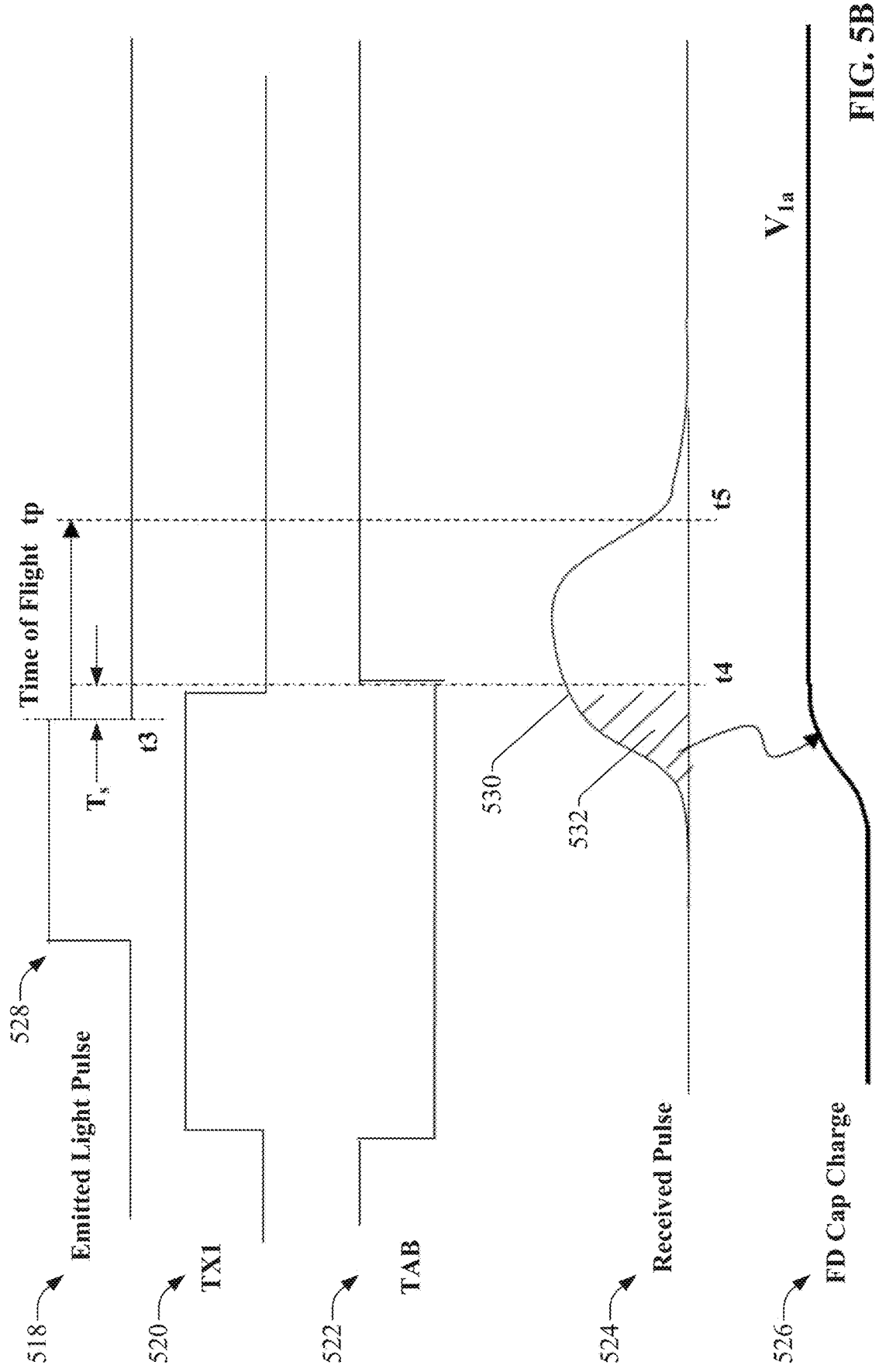

| Readout | 1 | 2 | 3 | 4 | 5 | 6 | 7 | 8 | 9 | 10 |
|---|---|---|---|---|---|---|---|---|---|---|
| Exposure Gating | A | A | 2A | 4A | 8A | 16A | 32A | 64A | 128A | 256A |
| Total Exposure | A | 2A | 4A | 8A | 16A | 32A | 64A | 128A | 256A | 512A |
| $V_0$ | $V_{01}$ | $V_{02}$ | $V_{03}$ | $V_{04}$ | $V_{05}$ | $V_{06}$ | $V_{07}$ | $V_{08}$ | $V_{09}$ | $V_{010}$ |
| $V_1$ | $V_{11}$ | $V_{12}$ | $V_{13}$ | $V_{14}$ | $V_{15}$ | $V_{16}$ | $V_{17}$ | $V_{18}$ | $V_{19}$ | $V_{110}$ |
| $V_2$ | $V_{21}$ | $V_{22}$ | $V_{23}$ | $V_{24}$ | $V_{25}$ | $V_{26}$ | $V_{27}$ | $V_{28}$ | $V_{29}$ | $V_{210}$ |
| Scaling Factor | 512 | 256 | 128 | 64 | 32 | 16 | 8 | 4 | 2 | 1 |
| Exponent | 9 | 8 | 7 | 6 | 5 | 4 | 3 | 2 | 1 | 0 |

1402

Stored Values

FIG. 14

| Readout | 1 | 2 | 3 | 4 | 5 | 6 | 7 | 8 | 9 | 10 |
|---|---|---|---|---|---|---|---|---|---|---|
| Exposure Gating | A | A | 2A | 4A | 8A | 16A | 32A | 64A | 128A | 256A |
| Total Exposure | A | 2A | 4A | 8A | 16A | 32A | 64A | 128A | 256A | 512A |
| $V_0$ | $V_{01}$ | $V_{02}$ | $V_{03}$ | $V_{04}$ | $V_{05}$ | $V_{06}$ | $V_{07}$ | $V_{08}$ | $V_{09}$ | $V_{010}$ |
| $V_1$ | $V_{11}$ | $V_{12}$ | $V_{13}$ | $V_{14}$ | $V_{15}$ | $V_{16}$ | $V_{17}$ | $V_{18}$ | $V_{19}$ | $V_{110}$ |
| $V_2$ | $V_{21}$ | $V_{22}$ | $V_{23}$ | $V_{24}$ | $V_{25}$ | $V_{26}$ | $V_{27}$ | $V_{28}$ | $V_{29}$ | $V_{210}$ |
| Scaling Factor | 512 | 256 | 128 | 64 | 32 | 16 | 8 | 4 | 2 | 1 |
| Exponent | 9 | 8 | 7 | 6 | 5 | 4 | 3 | 2 | 1 | 0 |

1502

Stored Values

FIG. 15

HIGH DYNAMIC RANGE FOR SENSING SYSTEMS AND METHODS

BACKGROUND

The subject matter disclosed herein relates generally to optical sensor devices, and, more particularly, to sensors that use light based time of flight measurement to generate distance or depth information.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a time of flight sensor device is provided, comprising an emitter component configured to emit a light pulse at a first time during each pulse period of each measuring cycle of a distance measuring sequence, wherein the distance measuring sequence comprises multiple measuring cycles and each measuring cycle comprises multiple pulse periods; a photo-sensor component comprising a photo-detector, the photo-detector comprising a photo device configured to generate electrical energy in proportion to a quantity of received light, and a measuring capacitor connected to the photo device via a control line switch controlled by a gating signal, wherein the photo-sensor component is configured to, for each pulse period of each measuring cycle, set the gating signal of the control line switch at a second time during the pulse period defined relative to the first time, and reset the control signal at a third time, wherein setting the gating signal at the second time and resetting the gating signal at the third time causes a portion of the electrical energy to be stored in the measuring capacitor, the portion of the electrical energy is proportional to one of ambient light, a leading edge portion of a received light pulse plus the ambient light, or a trailing edge portion of the received light pulse plus the ambient light, the emitter component and the photo-sensor component are configured to, for each measuring cycle of the multiple measuring cycles after a first of the measuring cycles, increase the number of pulse periods executed in the measuring cycle relative to an immediately preceding measuring cycle of the multiple measuring cycles, the photo-sensor component is configured to measure a voltage value on the measuring capacitor and store the voltage value in response to completion of each of the multiple measuring cycles to yield multiple values of a pulse characteristic, and the time of flight sensor device further comprises a distance determination component configured to, in response to completion of all of the multiple measuring cycles of the distance measuring sequence, select a pulse characteristic value of the multiple values of the pulse characteristic and determine a propagation time of the light pulse based on the pulse characteristic value.

Also, one or more embodiments provide a method for measuring a distance of an object, comprising generating, by a photo device of a photo-detector of a time of flight sensor device comprising a processor, electrical energy in proportion to a quantity of light received at the photo device; for each pulse period of each measuring cycle of a distance measuring sequence comprising multiple measuring cycles: emitting, by the time of flight sensor device, a light pulse at a first time within the pulse period, setting, by the time of flight sensor device at a second time during the pulse period defined relative to the first time, a gating signal of a control line switch, and resetting, by the time of flight sensor device at a third time, the control signal, wherein the setting the gating signal at the second time and the resetting the gating signal at the third time causes a portion of the electrical energy to be stored in a measuring capacitor connected to the photo device via the first control line switch, and the portion of the electrical energy is proportional to one of ambient light, a leading edge portion of a received light pulse plus the ambient light, or a trailing edge portion of the received light pulse plus the ambient light; performing, by the time of flight sensor device, the emitting, the setting, and the resetting for a number of pulse periods for each of the multiple measuring cycles, wherein the performing comprises increasing the number of pulse periods for each successive measuring cycle; in response to completion of each of the multiple measuring cycles, measuring, by the time of flight sensor device, a voltage value on the measuring capacitor, and storing, by the time of flight sensor device, the voltage value, wherein performing the measuring and the storing for each of the multiple measuring cycles yields multiple values of a pulse characteristic; and in response to completion of the multiple measuring cycles of the distance measuring sequence: selecting, by the time of flight sensor device, a pulse characteristic value of the multiple values of the pulse characteristic, and determining, by the time of flight sensor device, a propagation time of the light pulse based on the pulse characteristic value.

Also, according to one or more embodiments, a non-transitory computer-readable medium is provided having stored thereon instructions that, in response to execution, cause a time of flight sensor device comprising a processor and a photo device that generates electrical energy in proportion to a quantity of received light, to perform operations, the operations comprising: for each pulse period of each measuring cycle of a distance measuring sequence comprising multiple measuring cycles: initiating emission of a light pulse at a first time within the pulse period, setting, at a second time during the pulse period defined relative to the first time, a gating signal of a control line switch that controls transfer of the electrical energy to a measuring capacitor, and resetting, at a third time, the control signal, wherein the setting the gating signal at the second time and the resetting the gating signal at the third time causes a portion of the electrical energy to be stored in the measuring capacitor, and the portion of the electrical energy is proportional to one of ambient light, a leading edge portion of a received light pulse plus the ambient light, or a trailing edge portion of the received light pulse plus the ambient light; performing the emitting, the setting, and the resetting for a number of pulse periods for each of the multiple measuring cycles, wherein the performing comprises increasing the number of pulse periods for each measuring cycle relative to an immediately preceding measuring cycle; in response to completion of each of the multiple measuring cycles, measuring a voltage value on the measuring capacitor, and storing the voltage value in a memory, wherein performing the measuring and the storing for each of the multiple measuring cycles yields multiple values of a pulse characteristic; and in response to completion of the multiple measuring cycles: selecting a pulse characteristic value of the multiple values of the pulse characteristic, and determining a propagation time of the light pulse based on the pulse characteristic value.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 5B is a timing diagram illustrating example timings of events associated with operation of a single-capacitor photo-detector in which a leading edge portion of a light pulse is captured.

FIG. 14 is a table illustrating a first approach to storing and selecting suitable values of $V_0$, $V_1$, and $V_2$ for some three-capacitor embodiments of a TOF sensor device.

FIG. 15 is a table illustrating a second approach to storing and selecting suitable values of $V_0$, $V_1$, and $V_2$ for some three-capacitor embodiments of a TOF sensor device.

DETAILED DESCRIPTION

Figure 1:
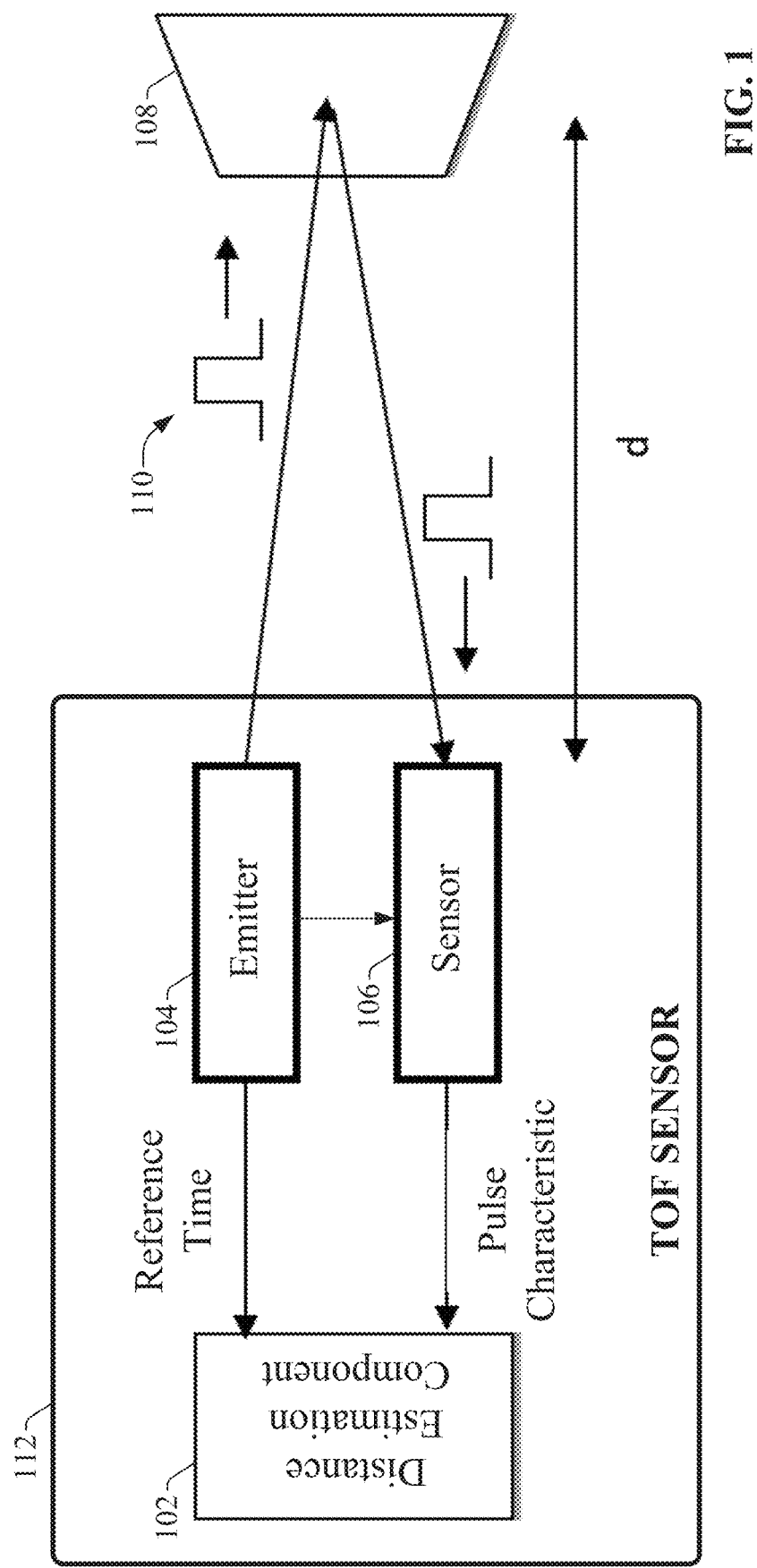
FIG. 1 is a generalized block diagram of a TOF sensor illustrating pulsed light time of flight principles.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Time of Flight (TOF) optical sensors—such as photo detectors or multi-pixel image sensors—are generally used to detect distances of objects or surfaces within a viewing range of the sensor. Such sensors can include, for example, photo detectors that measure and generate a single distance data point for an object within range of the detector, as well as multi-pixel image sensors comprising an array of photodetectors that are each capable of generating a distance data point for a corresponding image pixel.

Some types of TOF sensors that employ pulsed light illumination measure the elapsed time between emission of a light pulse to the viewing field (or viewing space) and receipt of a reflected light pulse at the sensor's photo-receiver. Since this time of flight information is a function of the distance of the object or surface from the sensor, the sensor is able to leverage the TOF information to determine the distance of the object or surface point from the sensor.

FIG. 1 is a generalized block diagram of a TOF sensor 112 illustrating pulsed light time of flight principles. In general, the sensing technology used by some TOF sensors measures the time taken by a light pulse to travel from the sensor's illumination light source—represented by emitter 104—to an object 108 or surface within the viewing field and back to the sensor's light photo-detectors, represented by sensor 106. Sensor 106 can be, for example a dedicated multi-pixel CMOS application-specific integrated circuit (ASIC) imager that integrates specialized means for measuring pulse characteristics of received pulses. Distance estimation components 102 can measure and calculate the received pulse position in time and determine the distance d to the object 108 as $$d=(c/2)t \quad (1)$$

where c is the speed of light, and t is the measured time of the round trip for the pulse from the emitter 104 to the object 108 and back to the sensor 106.

Emitter 104 of the TOF sensor 112 emits a short pulse 110 into the viewing field. Objects and surfaces within the viewing field, such as object 108, reflect part of the pulse's radiation back to the TOF sensor 112, and the reflected pulse is detected by sensor 106 (e.g., a photo-detector or a photo-sensor such as a photo-diode). Since the speed of light c is a known constant and the time t elapsed between emission and reception of the pulse 110 can be measured, the distance estimation components 102 can determine the distance between the object 108 and the sensor by calculating half of the round-trip distance, as given by equation (1) above. Collectively, the distance information obtained for all pixels of the viewing space yields depth map data for the viewing space. In some implementations, distance estimation components 102 can include a timer that measures the arrival time of the received pulse relative to the time at which emitter 104 emitted the pulse. In general, the TOF sensor 112 generates information that is representative of the position in time of the received pulse.

When radiation of the reflected pulse is incident on the photo-receivers or photo-detectors that make up sensor 106, the incident light is converted into an electrical output proportional to the intensity of the incident light. The distance estimation components 102 then recover and analyze the electrical output in order to identify the pulse, thereby determining that the reflected pulse has been received at the sensor 106. Accurate distance measurement using light pulse time delay estimation depends upon reliable recovery and representation of the reflected light pulse and its time related characteristics.

In some implementations, the photo-detectors of sensor 106 accumulate electrical charges based on the exposure duration of the sensor 106 to the received light pulse radiation relative to a time reference. The accumulated charges translate into a voltage value that is used by the distance estimation components 102 to recognize the pulse. Once the pulse is identified, the distance estimation components 102 can estimate the time that the reflected pulse was received at the TOF sensor relative to the time that the pulse was emitted, and the distance can be estimated based on this time using equation (1) (or another distance determination equation or algorithm that defines propagation time and distance as a function of light pulse information captured by a variety of measuring cycles and measuring sequences).

The level or intensity of the light signal received at the sensor 106 for a given pixel can vary over a wide range due to variable conditions of the emission and receiving paths. The range over which the received signal level may vary is referred to as the dynamic range. Factors that may cause large dynamic range include the emitted light's illumination or irradiance, which can decrease quickly as a function of distance; object reflectivity, which can vary from highly reflective to very dark; and signal variation due to the time range or distance to be measured. In some scenarios, these factors can contribute to dynamic ranges of greater than 120 dB.

Ideally, TOF sensors should be designed to obtain a sufficiently high signal-to-noise (SNR) ratio in all conditions in order to accurately detect objects across a large dynamic range. Imaging sensors typically project a uniform level of illumination toward the viewing field. This level of illumination may be generally optimized to the conditions of the viewing field based on such factors as the level of ambient light present in the viewing area, the degree of reflectivity of objects to be detected, or other such considerations. However, when a uniform illumination is applied to a scene containing objects having wide ranges of reflectivity factors, the illumination level may not be optimal for detection of some objects within the viewing area. For example, applying a uniform illumination to a viewing field containing both very dark objects and highly reflective objects may cause saturation of pixels corresponding to the highly reflective objects if the illumination level is optimized to the dark objects, or insufficient SNR for pixels corresponding to the dark objects if the illumination level is highly optimized to the reflective objects.

Figure 2:
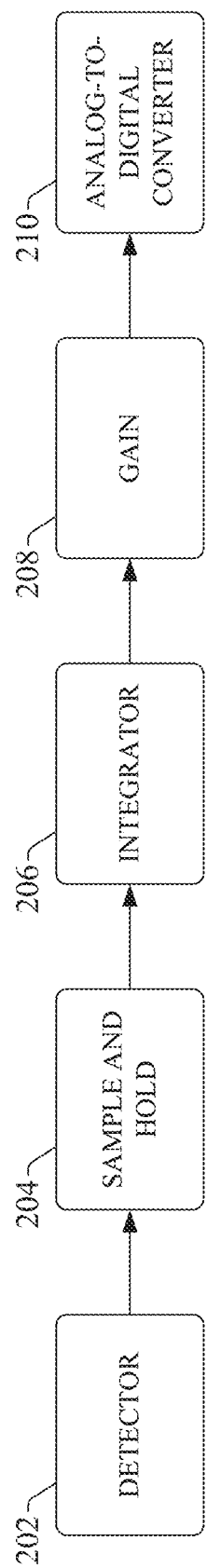
FIG. 2 s a block diagram representing an example sensing signal chain for a pixel of a TOF sensor.

Scaling factors or variable gains associated with each pixel may be used to facilitate signal measurements over a large dynamic range, particularly in systems that convert an analog signal to a digital value. FIG. 2 is a block diagram representing an example sensing signal chain for a pixel of a TOF sensor. The sensing signal chain comprises a detector 202 or sensing device (e.g., a photo device), one or more sample-and-hold devices 204 that capture signal values measured by the detector 202 as a function of the intensity of received light incident on the detector, and an integrator 206 associated with each sample-and-hold device 204. The sample-and-hold device 204 and integrator 206 may be combined into a single device in some implementations, or may be realized by two separate devices.

In some implementations, the analog value captured by the sample-and-hold device 204 can be converted to a digital value at various points in the signal chain, such as after the sample-and-hold device 204 or after the integrator 206. The example depicted in FIG. 2 depicts the ADC 210 as being located after the integrator 206. A 12-bit analog-to-digital converter (ADC) can suitably handle a dynamic range up to $2^{12}$, equivalent to 72 dB. A variable gain stage 208 can be placed at any position within the chain to adjust the incoming signal level as needed. Placing a variable gain stage 208 in front of the ADC 210 can allow the sensor to adjust the signal chain to different signal levels in order to achieve a suitable SNR for object detection across a wide dynamic range. For example, attenuating the signal in a ratio from 1 to 16 can prevent pixel saturation with a signal up to 16 times stronger than the original permissible range. In the case of smaller received signals, the gain may be increased or multiple measurements may be taken and averaged in order to achieve better resolution. Some systems also attempt to process large dynamic ranges using a logarithmic scale implemented in the analog circuitry.

However, proper attenuation or amplification of the received signal is rendered difficult due to the fact that the received signal may be of unknown strength, since the distance of the reflecting object and the reflectivity of the object are often unknown. Moreover, since an imaging sensor typically comprises an array of pixels performing measurements on the viewing area simultaneously, different pixels of the array may receive signals of different levels from different objects within the viewing space. Consequently, at a given time different pixels must process signals of different amplitudes or input levels. Sensing issues resulting from varying signal levels may be especially pronounced in TOF sensors that employ multiple measuring capacitors for each pixel in order to capture pulse information more quickly, since each measuring capacitor may operate substantially independently and may capture portions of a given received signal at different levels. The values captured by these multiple signals must be compatible in order to accurately calculate critical parameters such as object distance.

To address these and other issues, one or more embodiments of the present disclosure provide a TOF sensor device that employs a method to maximize the dynamic range of the device. In one or more embodiments, for a given measuring sequence in which a distance of an object or surface corresponding to a pixel is to be determined, the TOF sensor device can perform multiple iterations of a measuring cycle, whereby for each successive iteration the number of emitted and measured pulses that are accumulated for the iteration is increased relative to the previous iteration of the cycle. Increasing the number of pulse integrations for each measuring cycle is equivalent to increasing the gain or improving the resolution of the measurement. In this way, multiple values of increasing resolution are measured for the same physical entity over a corresponding number of measuring cycles. The sensor can then select a value from the multiple measured values that yields the highest resolution without saturating the pixel. Typically, objects that are darker or farther from the TOF sensor may require values measured using a larger number of integrations relative to more reflective objects or objects that are closer to the sensor.

The sensor can apply this process to all pixels of the array and their associated one or more measuring capacitors simultaneously or substantially simultaneously so that information of different signal levels across the array can be captured and read with sufficient resolution without saturating the pixels. Varying the integration number (or the number of pulses that are integrated to yield a measured value for the object) across the pixels as needed to obtain a suitable measured value is similar in function to varying the gain or scaling factor applied to the incoming signal.

Figure 3:
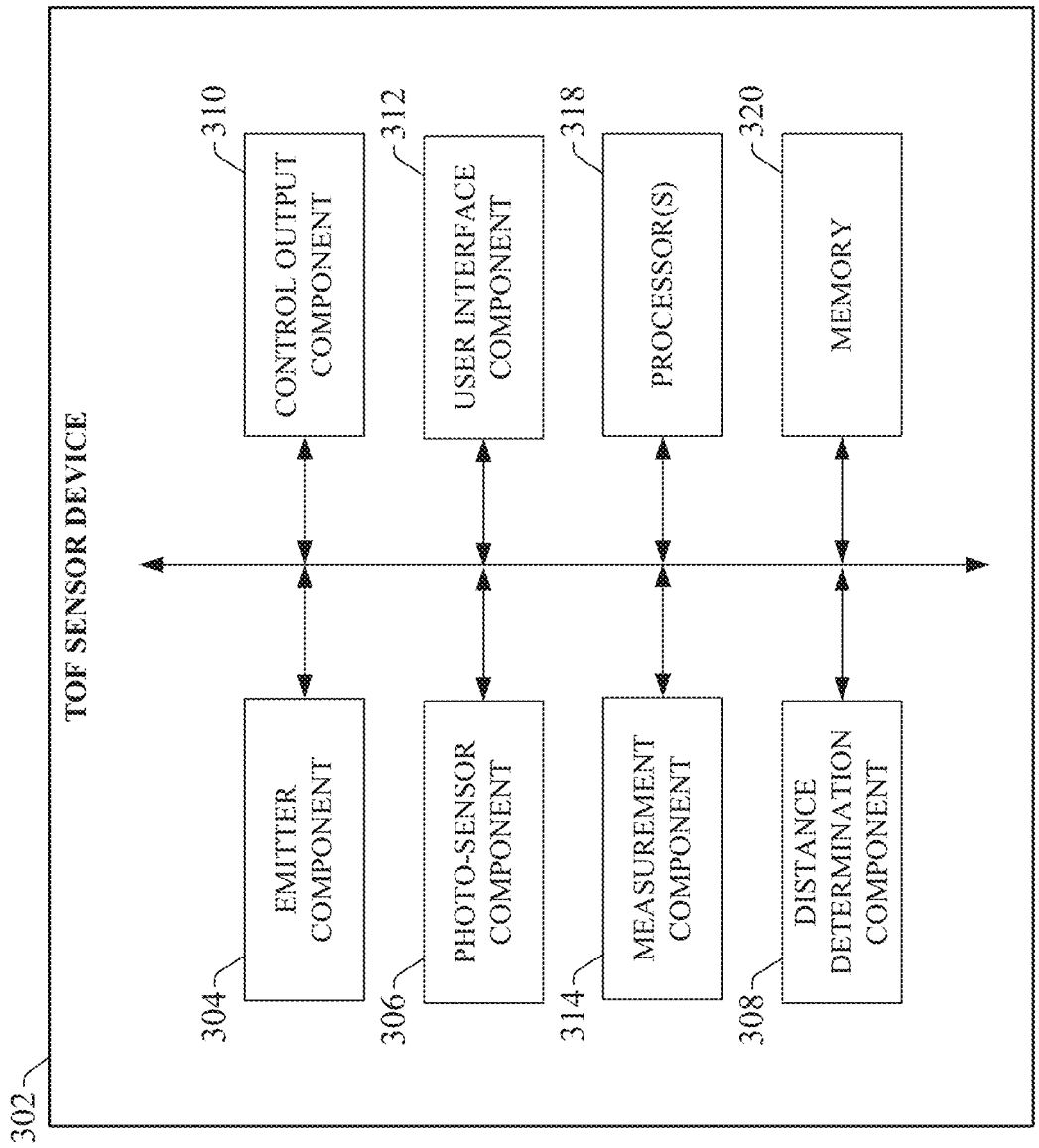
FIG. 3 is a block diagram of an example TOF sensor device.

FIG. 3 is a block diagram of an example TOF sensor device 302 according to one or more embodiments of this disclosure. Although FIG. 3 depicts certain functional components as residing on TOF sensor device 302, it is to be appreciated that one or more of the functional components illustrated in FIG. 3 may reside on a separate device relative to TOF sensor device 302 in one or more embodiments. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

TOF sensor device 302 can include an emitter component 304, a photo-sensor component 306, a measurement component 314, a distance determination component 308, a control output component 310, a user interface component 312, one or more processors 318 and memory 320. In various embodiments, one or more of the emitter component 304, photo-sensor component 306, measurement component 314, distance determination component 308, control output component 310, user interface component 312, the one or more processors 318, and memory 320 can be electrically and/or communicatively coupled to one another to perform one or more of the functions of the TOF sensor device 302. In some embodiments, one or more of components 304, 306, 314, 308, 310, and 312 can comprise software instructions stored on memory 320 and executed by processor(s) 318. TOF sensor device 302 may also interact with other hardware and/or software components not depicted in FIG. 3. For example, processor(s) 318 may interact with one or more external user interface devices, such as a keyboard, a mouse, a display monitor, a touchscreen, or other such interface devices. TOF sensor device 302 may also include network communication components and associated networking ports for sending data generated by any of components 304, 306, 314, 308, 310, and 312 over a network (either or both of a standard data network or a safety network), or over a backplane.

Emitter component 304 can be configured to control emission of light by the TOF sensor device 302. In one or more embodiments, TOF sensor device 302 may comprise a laser or light emitting diode (LED) light source under the control of emitter component 304. Emitter component 304 can generate pulsed light emissions directed to the viewing field so that time of flight information for the reflected light pulses can be generated by the TOF sensor device 302 (e.g., by the distance determination component 308).

Photo-sensor component 306 can be configured to convert light energy incident on a photo-receiver or photo-detector array to electrical energy for respective pixels of a viewing space, and selectively control the storage of the electrical energy in various electrical storage components (e.g., measuring capacitors) for distance analysis. In one or more embodiments, the pixels of photo-sensor component 306 may be single-capacitor pixels, whereby each pixel is associated with a single measuring capacitor for accumulation of pulse information. Alternatively, in one or more other embodiments, the pixels of photo-sensor component 306 may be multi-capacitor pixels, whereby each pixel is associated with more than one measuring capacitor (e.g., three measuring capacitors) so that pulse information can be accumulated and analyzed more quickly using fewer received light pulses.

Measurement component 314 can be configured to measure and pre-process voltage values from the one or more measuring capacitors of the photo-sensor component 306 prior to estimation of the distance. For example, measurement component 314 can include one or more analog-to-digital converters for converting the analog voltage values on the one or more measuring capacitors to digital values, noise reduction components that filter noise from the measured values to yield corrected pulse characteristic values, or other such components.

Distance determination component 308 can be configured to determine a propagation time (time of flight) for emitted light pulses for respective pixels of the viewing space based on the stored electrical energy generated by the photo-sensor component 306, and to further determine a distance value of an object or surface corresponding to a pixel within the viewing space based on the determined propagation time.

The control output component 310 can be configured to analyze and control one or more sensor outputs based on results generated by the distance determination component 308. This can include, for example, sending an analog or digital control signal to a control or supervisory device (e.g., an industrial controller, an on-board computer mounted in a mobile vehicle, etc.) to perform a control action, initiating a safety action (e.g., removing or disconnecting power from a hazardous machine, switching an industrial system to a safe operating mode, etc.), sending a feedback message to one or more plant personnel via a human-machine interface (HMI) or a personal mobile device, sending data over a safety network, or other such signaling actions. In various embodiments, control output component 310 can be configured to interface with a plant network (e.g., a control and information protocol network, and Ethernet/IP network, a safety network, etc.) and send control outputs to other devices over the network connection, or may be configured to send output signals via a direct hardwired connection.

User interface component 312 can be configured to receive user input and to render output to the user in any suitable format (e.g., visual, audio, tactile, etc.). In one or more embodiments, user interface component 312 can be configured to communicate with a graphical user interface (e.g., a programming or development platform) that executes on a separate hardware device (e.g., a laptop computer, tablet computer, smart phone, etc.) communicatively connected to TOF sensor device 302. In such configurations, user interface component 312 can receive input parameter data entered by the user via the graphical user interface, and deliver output data (e.g., device status, health, or configuration data) to the interface. Input parameter data can include, for example, normalized pulse shape data that can be used as reference data for identification of irregularly shaped pulses, light intensity settings, minimum safe distances or other distance threshold values to be compared with the measured distance value for the purposes of determining when to initiate a control or safety output, or other such parameters. Output data can comprise, for example, status information for the TOF sensor device 302, alarm or fault information, parameter settings, or other such information.

The one or more processors 318 can perform one or more of the functions described herein with reference to the systems and/or methods disclosed. Memory 320 can be a computer-readable storage medium storing computer-executable instructions and/or information for performing the functions described herein with reference to the systems and/or methods disclosed.

Figure 4:
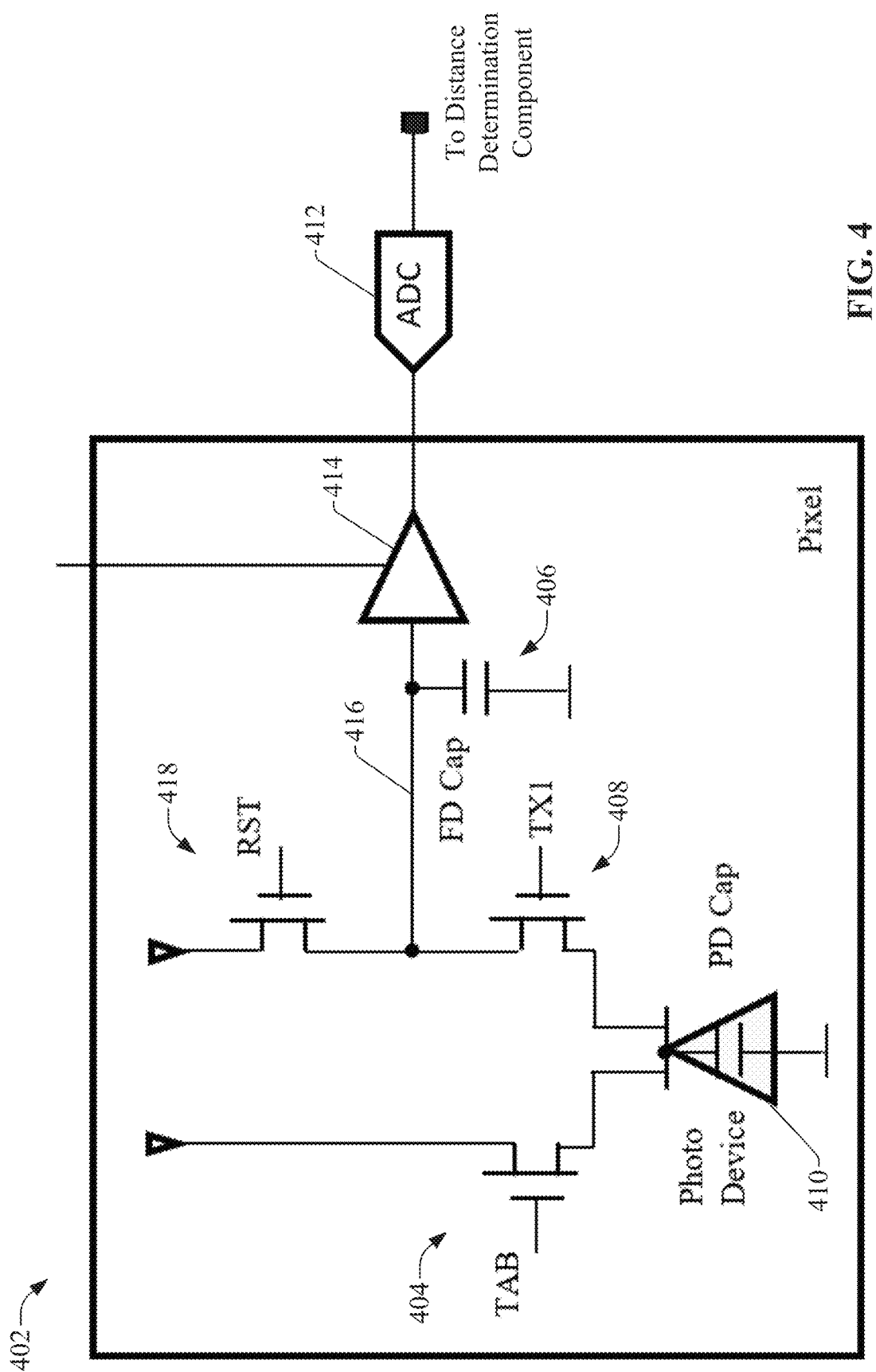
FIG. 4 is a diagram of an example architecture for a single-capacitor photo-detector.

The techniques described herein for maximizing the dynamic range of a sensing system are suitable for TOF sensor devices comprising pixels that use a single measuring capacitor (or other type of component for sample-and-hold and integration functions) to capture reflected pulse information, as well as TOF sensor devices that use multiple measuring capacitors in order to capture pulse information more quickly. An example single-capacitor TOF sensing system according to one or more embodiments is now described. FIG. 4 is a diagram of an example architecture for a single-capacitor photo-detector 402. Photo-detector 402 can correspond to a single pixel and can be one of an array of photo-detectors that make up the photo-sensor component 306 and measuring component 314 of TOF sensor device 302. Collectively, the array of photo-detectors capture received pulse signal information that can be used to calculate distance information for respective pixels of a viewing space being monitored by the TOF sensor 302. The collection of pixel-wise distance data for the viewing space can yield point cloud information that describes a depth or distance topology of the viewing space. Although the present example describes photo-detector 402 as being one of an array of photo-detectors that make up an imaging sensor device, the techniques carried out by photo-detector 402 to measure distance information can also be implemented in a single-point photo-sensor that generates only a single distance value for an object within range of the sensor.

The photo-detector 402 includes a photo device 410 (e.g., a photo-diode and a capacitor (PD Cap)) that generates and stores electrical charges when exposed to light, such as pulsed light from a reflected pulse as well as ambient light. The magnitude of the electrical charge is proportional to the intensity of the light incident on the photo device 410. The photo device 410 is connected to a first switch 404 enabled by an anti-blooming control (TAB) and a second switch 408 enabled by a capture control line (TX1). Switches 404 and 408 can be transistors or other types of switching devices. The charges stored on the photo device 410 are diverted when the TAB switch 404 is active (e.g., when a logical high control signal is applied to the gate of the TAB switch 404), thereby clearing the charges from the photo device 410. The photo device 410 is connected to a measuring capacitor (e.g., a floating diffusion (FD) capacitor or another type of measuring capacitor) 406 via the control line TX1.

With this configuration, the charges stored on the photo device 410 can also be transferred to the measuring capacitor 406 when the TX1 switch 408 is active (e.g., when a logical high control or gating signal is applied to the gate of the TX1 switch 408). The amount of charge stored on the measuring capacitor 406 (transferred from the photo device 410) can be read by an analog-to-digital converter (ADC) 412 via an amplifier 414, and the ADC 412 converts the magnitude of the charge to a proportional digital value representing the amount of charge. To ensure that a sufficiently high level of charge has been accumulated to yield a high signal value that can be accurately measured, photo-detector 402 can be configured to base the distance measurement on a series of received pulses rather than a single received pulse. In such implementations, ADC 412 may be configured to read the magnitude of the charge on measuring capacitor 406 after a defined number of pulses have been emitted and received, such that the charge on measuring capacitor 406 represents an accumulation of a series of pulses. The accumulated charge stored on the measuring capacitor 406 can be cleared when a logical high control signal is applied to the gate of the reset (RST) transistor 418. The RST transistor 418, control line TX1, measuring capacitor 406, and input of the amplifier 414 are connected to the same node 416.

The output of the ADC 412—that is, the digital value representing the amount of electrical charge on measuring capacitor 406—is provided to the distance determination component 308, which uses the value to calculate the propagation time (or time of flight) and corresponding distance for an emitted light pulse.

As photo-detector 402 receives pulsed light, it develops charges that are captured and integrated into the measuring capacitor 406. In this way, each pixel corresponding to a photo-detector 402 generates time-related information and amplitude information (based on charge values) based on received light pulses backscattered by an object in the viewing field illuminated by the emitter component 304.

Figure 5A:
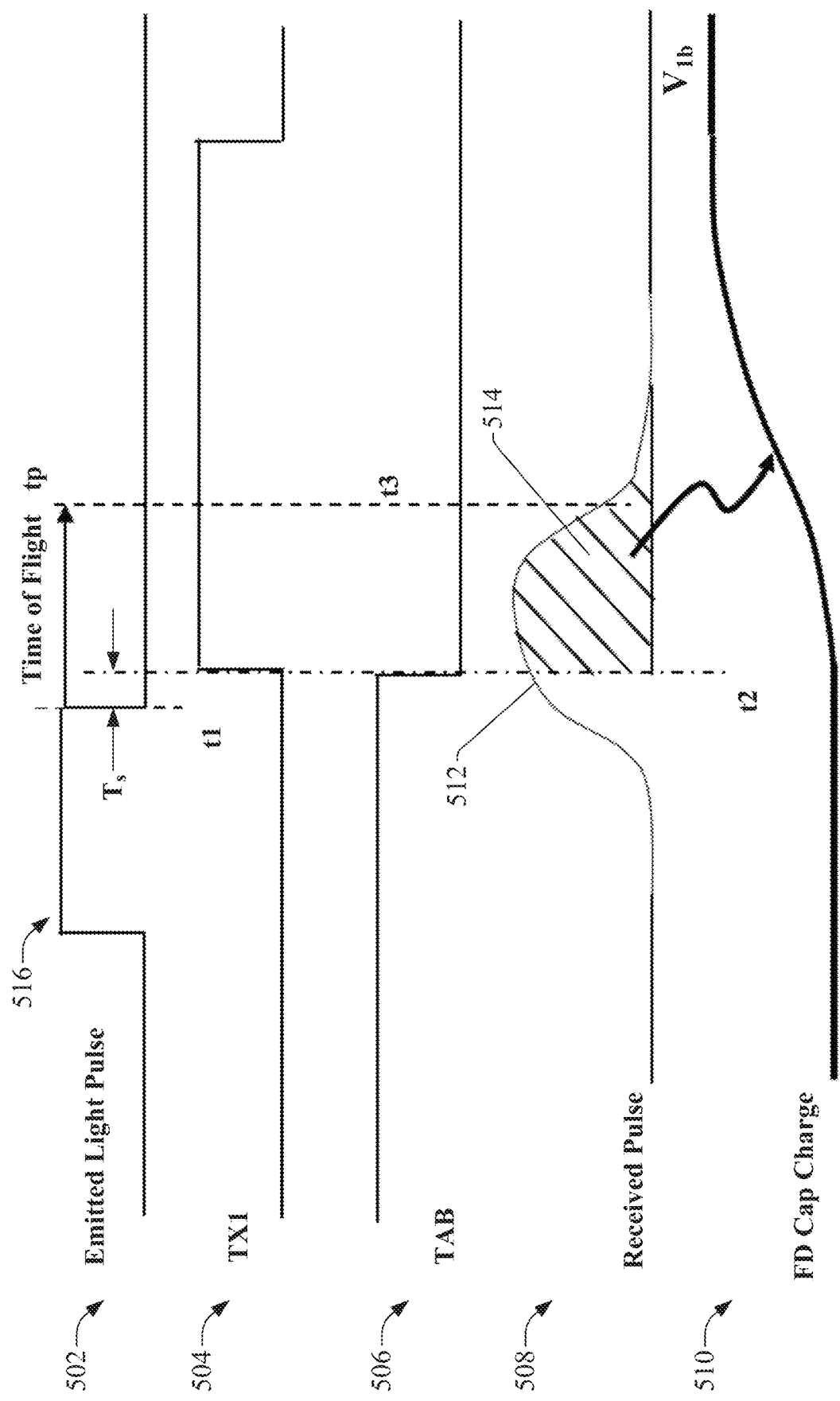
FIG. 5A is a timing diagram illustrating example timings of events associated with operation of a single-capacitor photo-detector in which a trailing edge portion of a light pulse is captured.

FIGS. 5A and 5B are timing diagrams illustrating example timings of events associated with operation of a single-capacitor photo-detector 402 (example timings associated with three-capacitor embodiments will be described herein). In an example operation, photo-detector 402 may execute two measuring cycles comprising one or more iterations of each of the pulse periods depicted in FIGS. 5A and 5B. The pulse period depicted in FIG. 5A can be used to capture a trailing edge portion of a received pulse during a first measuring cycle, and the pulse period depicted in FIG. 5B can be used to capture a leading edge portion of the received pulse during a second measuring cycle. The distance determination component 308 can then calculate the estimated distance based on a ratio of the trailing edge portion to the full pulse value (where the full pulse value is the sum of the trailing and leading edges) or using another calculation technique based on the leading and trailing edge portions.

FIG. 5A depicts the timing of events for capturing the trailing edge portion of a pulse during a first measuring cycle of the single-capacitor distance measuring cycle. FIG. 5A depicts a single pulse period of the first measuring cycle (e.g., a period of emission and reception of one pulse). However, as will be described below, a given measuring cycle typically comprises multiple pulse periods such that an array of pulses is emitted as a burst and pulse information is accumulated from all corresponding reflected pulses. Timing chart 502 represents the timing of the light pulse output modulated by the TOF sensor device's emitter component 304, where the high level of chart 502 represents the time at which the emitter component 304 is emitting a light pulse (e.g., light pulse 516). Timing charts 504 and 506 represent the timings of the TAB control signal and the TX1 control signal, respectively (that is, the timing of the signals applied to the TAB and TX1 control lines). Timing chart 508 represents the amount or intensity of light received at the photo device 410 of the photo-detector 402, where the rise in the chart represents receipt of the reflected pulse 312 corresponding to the emitted pulse. Timing chart 510 represents the amount of charge stored on the measuring capacitor 406 over time. The control signals applied to various control elements of photo-detector 402 can be controlled in accordance with control algorithms executed by the TOF sensor 302.

The time at which the TAB control signal goes low and the TX1 gating signal goes high—referred to as the sampling point or split point—is defined to be a constant time relative to the time of emission of the light pulse 516. In the illustrated example, the sampling point occurs at time t2, which is set to be a fixed time relative to the time t1 corresponding to the trailing edge of the emitted pulse 516 (the sampling time may also be defined relative to the leading edge of the emitted pulse 516 in some embodiments). When the TAB control signal goes low and the TX1 gating signal goes high at the sampling point (at time t2), the accumulated electrical charge collected by the photo device 410 in response to received light begins transferring to the measuring capacitor 406.

As shown in FIG. 5A, the timing of the TAB and TX1 control signals relative to the received reflected pulse 512 determines the fraction of the total pulse-generated charge that is transferred to measuring capacitor 406. In the illustrated example, the trailing edge of the emitted pulse 516 leaves the emitter at time t1 (see chart 502). At sampling time t2 (after a preset delay relative to time t1), the control signal on the TAB is turned off, leaving the measuring (FD) capacitor 406 discharged, and the gating signal on the TX1 switches to ON (see charts 504 and 506), at which time the measuring capacitor 406 begins accumulating charges in proportion to the intensity of the light received at the photo device 410. As shown in chart 508, in the present example the reflected pulse 512 corresponding to the emitted pulse 516 begins being received at the photo device 410 some time before time t2 (that is, the rising edge of the reflected pulse 512 is received at the photo device 410 before sampling time t2 when the TX1 gating signal goes high). Starting at time t2, when the TX1 gating signal goes high, the charge on the measuring capacitor 406 begins increasing in proportion to the level of received light, as shown in chart 510. After receipt of reflected pulse 512, the voltage $V_{1b}$ corresponding to the amount of charge transferred to the measuring capacitor is proportional to the shaded area 514 under the received pulse timing chart, which is defined between sampling time t2 and the time when the TX1 gating signal goes low. Thus, the voltage value $V_{1b}$ stored on the measuring capacitor 406 is proportional to the area of the trailing slice of the reflected pulse 512 captured after sampling time t2, and is therefore function of the position in time of the received pulse 512 relative to a calibrated time reference (e.g., the falling edge of the TAB control signal at time t2).

Since the time at which the reflected pulse 512 is received is a function of the distance of the object or surface from which the pulse 512 was reflected, the amount of the trailing portion of the reflected pulse that is collected by measuring capacitor 406 as a fraction of the total received pulse is also a function of this distance. Accordingly, at the completion of the measuring cycle (comprising one or more iterations of the pulse period depicted in FIG. 5A), distance determination component 308 stores a value (e.g., voltage $V_{1b}$ or a corresponding value of an electrical charge) representing the amount of charge stored on measuring capacitor 406 after completion of the measuring cycle. The TOF sensor device 302 then initiates the second measuring cycle, which comprises one or more iterations of the pulse period depicted in FIG. 5B, in order to obtain the leading edge portion.

Similar to the timing sequence depicted in FIG. 5A, FIG. 5B includes a timing chart 518 representing emitted pulse 528 sent during a pulse period of the second measuring cycle; timing charts 520 and 522 representing the timings of the TAB control signal and the TX1 gating signal, respectively (that is, the timing of the signals applied to the TAB and TX1 control lines during the second measuring cycle); a timing chart 524 representing the amount or intensity of light received at the photo device 410, where the rise in the chart represents receipt of the reflected pulse 530 corresponding to the emitted pulse 528; and a timing chart 526 representing the amount of charge stored on the measuring capacitor 406 over time.

As can be seen by comparing FIGS. 5A and 5B, the timing of events during the second measuring cycle differs from that of the first measuring cycle in that emitted pulse 528 is sent at a later time relative to the rising edge of the TX1 gating signal. This can be achieved by either delaying emission of emitted pulse 528 relative to the first measuring cycle, or by switching the TX1 gating signal high at an earlier time relative to the first measuring cycle. In the illustrated example, the TX1 gating signal is set high prior to emission of emitted pulse 528 (in contrast to the first stage depicted in FIG. 5A, in which the TX1 gating signal goes high after emission of emitted pulse 516). To ensure that the portion of the received pulse that was not captured during the first measuring cycle is fully captured during the second measuring cycle (with little or no overlap between the captured leading and trailing portions), the TX1 gating signal goes high at a time that is earlier by a duration that is substantially equal to the duration of the TX1 high signal. This causes the falling edge of the TX1 gating signal to occur at substantially the same time—relative the falling edge of emitted pulse 528—as the rising edge of the TX1 gating signal during the first measuring cycle (i.e., the difference between times t4 and t3 during the second measuring cycle is substantially equal to the difference between times t2 and t1 during the first measuring cycle). This ensures that the sampling point at time t4 slices the received pulse 530 at substantially the same location as the sampling point at time t2 during the first measuring cycle. Since the TX1 gating signal is already set high at the time the reflected pulse 530 is received, this timing causes the leading edge portion 532—the portion of the reflected pulse 530 not capture during the first measuring cycle—to be captured by measuring capacitor 406 as voltage $V_{1a}$.

In general, the nearer the object or surface is to the TOF sensor device 302, the earlier in time the reflected pulse (pulse 512 or 530) will be received, and thus the smaller the trailing portion of the pulse charge that will be collected by measuring capacitor 406. Accordingly, after completion of the first and second measuring cycles of the single-capacitor measuring cycle depicted in FIGS. 5A and 5B (and a third measuring cycle for capturing the effects of ambient light if the effects of ambient light are to be considered), the distance determination component 308 can compute the estimated distance based on the ratio of the measured trailing edge portion 514 to the total of the trailing edge portion 514 and the leading edge portion 532. For example, the distance determination component 308 can calculate the time of flight (or propagation time) tp for the pulse according to:

$$t_p = \left(\frac{V_{1b}}{V_{1a} + V_{1b}}\right)T_0 + T_s \quad (2)$$

where $T_s$ is the sampling time relative to the falling edge of the emitted pulse, and $T_0$ is the duration of the pulse. Note that, in embodiments in which the sampling time is set to coincide with the falling edge of the emitted pulse, $T_s$ will be zero. Although the example described above determines the propagation time using a ratio method as represented by equation (2), other distance calculation techniques can also be used to obtain the propagation time based on voltages $V_{1a}$ and $V_{1b}$.

Figure 6:
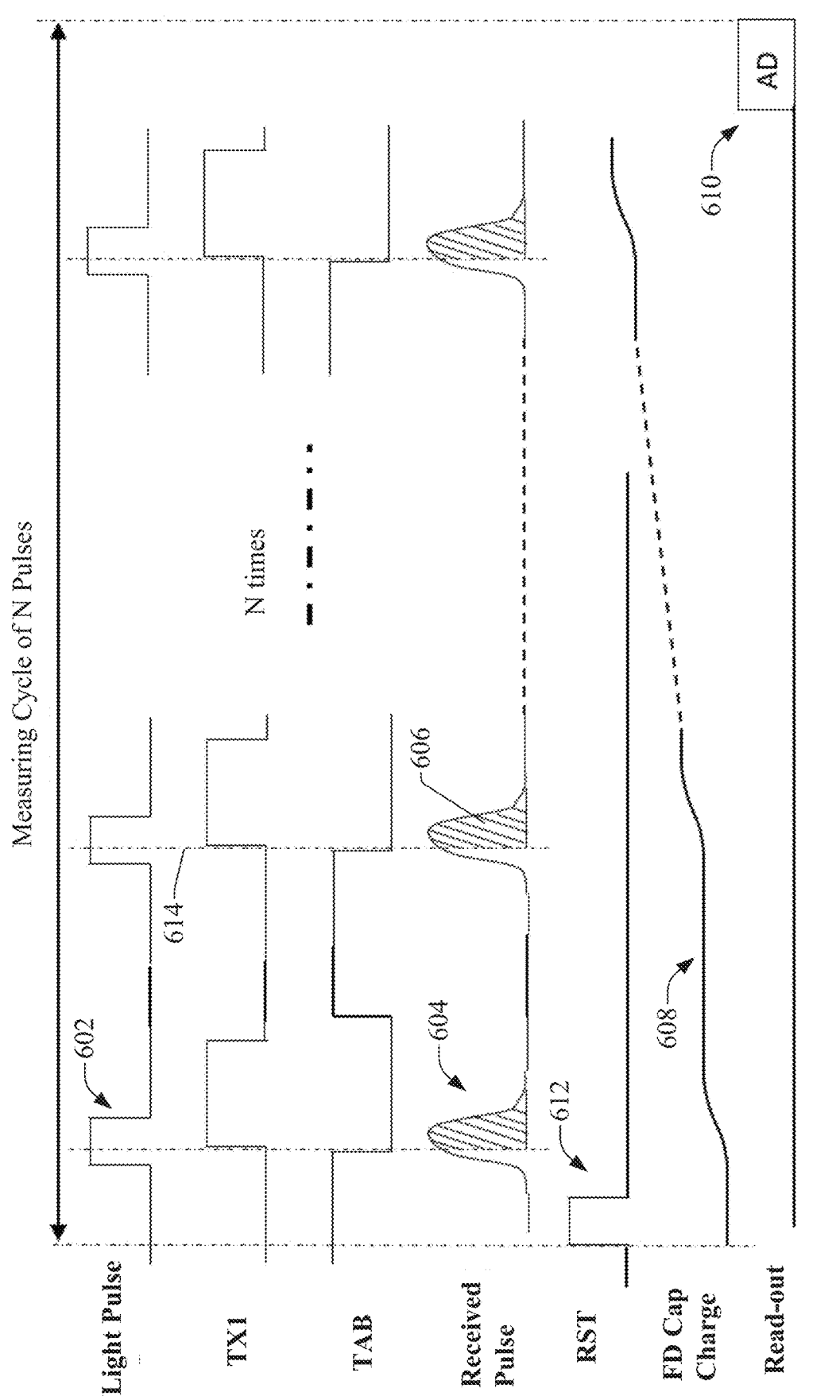
FIG. 6 is an example timing diagram illustrating a measuring cycle of a first stage of a measuring sequence repeated over a sequence of multiple (N) pulses.

To ensure a sufficiently high SNR to obtain high resolution values representing the leading and trailing edge portions of the received pulse, the pulse periods depicted in FIGS. 5A and 5B are repeated multiple times per measuring cycle in order to accumulate and collect a measurable amount of charge on the measuring capacitor 406. FIG. 6 is an example timing diagram illustrating a measuring cycle comprising the pulse period described above in connection with FIG. 5A repeated over a series of multiple (N) pulses. As shown in the light pulse timing chart of FIG. 6, a sequence of N light pulses 602 is received at the TOF sensor device's photo-sensor component 306. Light pulses 602 are reflected pulses obtained as a result of emission of a series of pulses by the TOF sensor device's emitter component 304. After a defined time duration has elapsed relative to the time of the leading edge of each emitted pulse 602, the control signal on the TAB goes low and the gating signal on the TX1 goes high, causing the measuring capacitor 406 to begin collecting the charge from the photo device 410. This charge is a function of the intensity of light received by the photo device 410 while the TX1 gating signal is high (measuring capacitor 406 is reset and cleared of charges at the beginning of the sequence by applying a high signal 612 on the RST control line). The vertical dashed lines represent the sampling points 614 at which the TAB control signal goes low and the TX1 gating signal goes high, where these sampling points 614 are defined relative to the leading edge of each emitted pulse 602.

As in the example pulse period described above in connection with FIG. 5A, the measuring capacitor 406 begins collecting the charge corresponding to a reflected pulse 504 after the leading edge of the reflected pulse 604 has reached the photo-sensing component 306. Thus, each time a reflected pulse 604 is received by the photo-sensing component 306 and detected by the photo device 410, the charge on the measuring capacitor 406—represented by timing chart 608—increases by an amount proportional to the shaded region 606 of each received pulse 604 (beginning at the time that the TX1 gating signal goes high). As discussed above, the amount of this shaded region (and thus the amount of charge collected by the measuring capacitor 406) relative to the amount of the total received pulse is a function of the distance of an object or surface from which the received pulse 604 was reflected. By repeating this pulse period over the series of N pulses, the charges on measuring capacitor 406 are accumulated over the N received pulses 604 to attain a measurable quantity of charge, ideally with an acceptable signal to noise ratio. The number of pulses N defining this measuring cycle is referred to as the integration number or gating number.

For the example sequence depicted in FIG. 6, when charges for the N reflected pulses have been accumulated by the measuring capacitor 406, a read-out signal 610 is activated to trigger a reading of the accumulated charge (or a corresponding voltage) from the measuring capacitor 406. In response to the read-out signal 610, the amount of the accumulated charge stored on the measuring capacitor 406 at the end of the measuring cycle is measured or communicated as an analog value (e.g., a charge Q or a voltage V), or can be converted into a digital value by ADC 412. The measured value is then provided to the distance determination component 308 as the measured trailing edge portion. A similar multiple-pulse sequence can be carried out for the second stage illustrated in FIG. 5B in order to accumulate enough charge to obtain a readable measurement of the leading edge portion, which is also provided to distance determination component 308. Distance determination component 308 can then use the leading and trailing edge values to determine the propagation time of the light pulses and the distance corresponding to the propagation time.

In some embodiments that take ambient light into consideration, in addition to the two stages depicted in FIGS. 5A and 5B, some embodiments may execute a third measuring cycle whereby the TX1 gating signal is pulsed N times without emission of light pulses, thereby accumulating and storing an amount of charge indicative of ambient light incident on the photo-detector 402. In such embodiments, this ambient light value can be subtracted from the leading and trailing edge values obtained by the first and second stages described above prior to calculation of the propagation time using equation (2).

If the integration number N (that is, the number of received pulses 604 that are accumulated to obtain the measured leading or trailing edge value) is constant for all measuring cycles, the received signal level and corresponding SNR can vary considerably across different measurement conditions, based on such factors as the conditions of the pulse emission and receiving paths, the reflectivity or darkness of the object from which the pulses 604 are reflected, and the distance of the object from the TOF sensor device 302 (since the illumination or irradiance of the pulse is attenuated as a function of the total distance of the emission and receiving paths). Consequently, a fixed integration number N may accumulate an acceptable amount of charge on measuring capacitor 406 and yield sufficiently high-resolution values for the leading and trailing edge portions under some circumstances (e.g., when the object is relatively reflective or is relatively close to the TOF sensor device 402), but may be insufficient to obtain a reliable measurable amount of charge on the measuring capacitor 406 in other circumstances (e.g., when the object is relatively dark or is far from the TOF sensor device 402). While the fixed integration number N can be increased to accommodate dark or distant objects, this can increase the risk of pixel saturation when measuring more reflective objects or objects that are closer to the sensor device 302. Pixel saturation, or accumulation of charge up to the measuring capacitor's storage capacity, can result in lost information and yield inaccurate distance measurements since any electrical information received after saturation of the pixel is not recorded on the measuring capacitor. Designing a TOF sensor device to accommodate these variations in sensing conditions can be particularly difficult for viewing areas having large dynamic ranges.

Although variable gains or scaling factors (e.g., variable gain block 208) can be applied to the signal channels to adjust the signal level to suit the current sensing conditions, determining a suitable gain or scaling factor value is difficult since the sensor typically does not have a priori knowledge of the strength of the received signal, as the distance and reflectivity of the object is initially unknown.

As an alternative to (or in addition to) the use of variable gains or scaling factors to achieve a suitable SNR capable of yielding a high-resolution pulse data, one or more embodiments of TOF sensor device 302 are configured to sample and record multiple charge or voltage values for a given measuring sequence comprising multiple measuring cycles, where each value is obtained at a different level of integration. These multiple values (representing the trailing edge or leading edge portion of the received pulse) can be sampled by performing multiple non-destructive readouts (NDROs) of the measuring capacitor 406 during the measuring sequence, where each readout is taken after integration of an increasing number of received pulses. The TOF sensor device's photo-sensor component 306 can select one of the sampled values from the multiple values based on a suitable selection criterion, and the distance determination component 308 will use this selected value to compute the distance of the object corresponding to the pixel. In one or more embodiments, the photo-sensor component 306 can select the highest value of the set of values that does not saturate the pixel or that does not exceed a defined pixel saturation setpoint. This selection criterion can ensure that the value with the highest reliable (non-saturated) signal level is used for distance calculations. Thus, embodiments of the TOF sensor device 302 are able to automatically adapt the number of integrations used to capture pulse data for a given measuring sequence to suit the current sensing conditions. For example, received signals of high intensity can be measured by accumulating charges from a relatively small number of light pulses (a low integration number), while low-level received signals can be measured by accumulating charges from a larger number of light pulses. In this way, the TOF sensor device 302 can accurately measure pulse information from a wide range of signal levels within environments having a high dynamic range.

Figure 7:
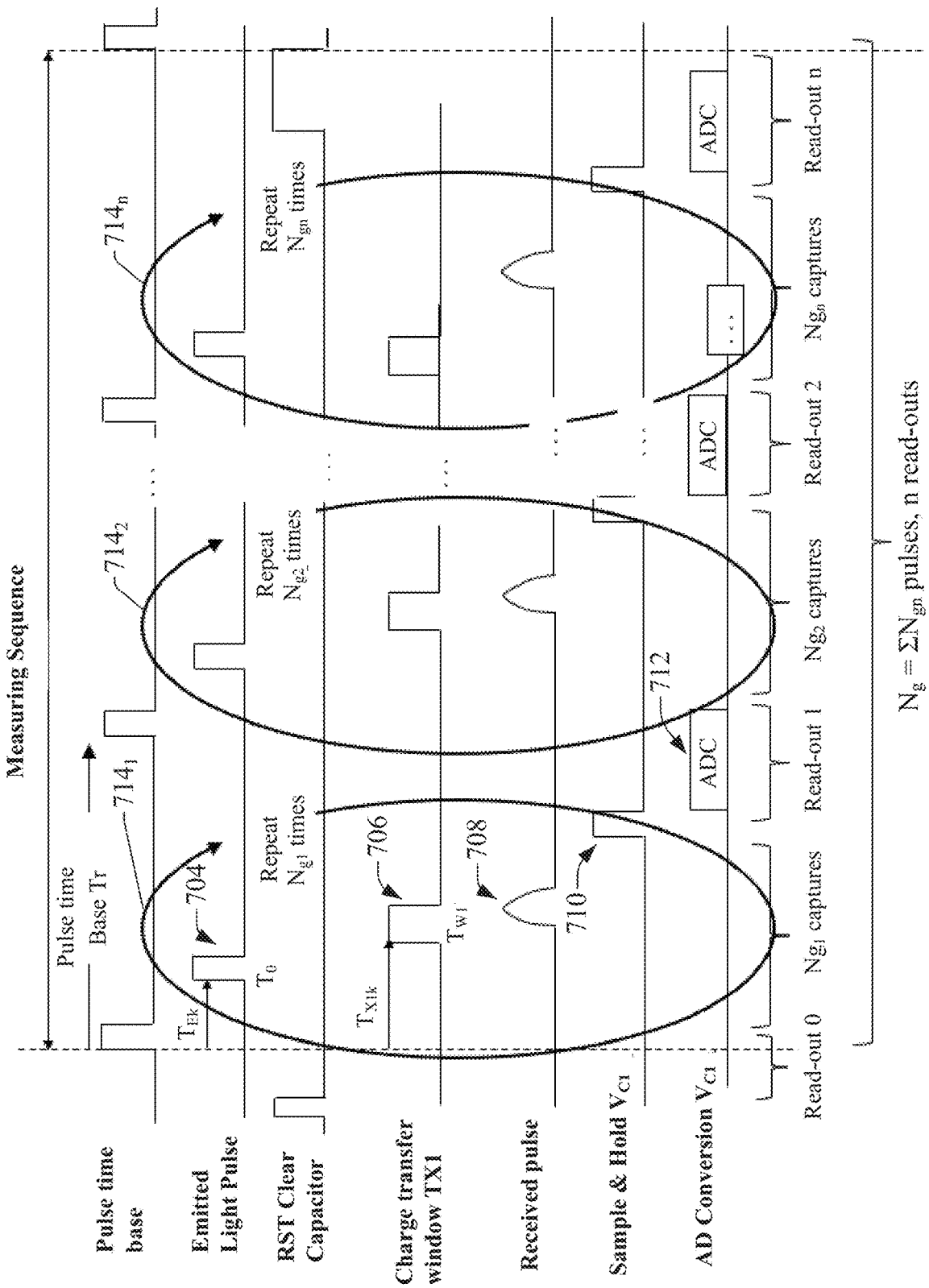
FIG. 7 is a timing diagram illustrating example timings of events carried out by a single-capacitor photo-detector during a measuring sequence, wherein multiple measured values are sampled and recorded at different integration levels within a single measuring sequence.

FIG. 7 is a timing diagram illustrating example timings of events carried out by a single-capacitor photo-detector 402 during a measuring sequence according to one or more embodiments, wherein multiple measured values are sampled and recorded at different integration levels within a single measuring sequence. Although the example measuring technique depicted in FIG. 7 is described herein in connection with single-capacitor photo-detector 402, this measuring sequence can also be applied to embodiments of TOF sensor device 302 comprising pixels having multiple measuring capacitors (e.g., three measuring capacitors, as will be described in more detail below).

The measurement approach illustrated in FIG. 7 follows a general event flow:

Step 1: Initialize the measurement system
Step 2: Readout the initial value
Step 3: Integrate multiple pulse captures at a current integration factor
Step 4: Stop the integration and hold the measured value(s)
Step 5: Perform non-destructive readout of the integrated value(s)
Step 6: Increase the integration factor (number of pulses)
Step 7: Repeat steps 3-6 until measuring sequence is complete Repeated iterations of steps 3-6 (after initialization of the measurement system) yields multiple measured values that are obtained by the non-destructive readout of the measuring capacitor(s) at Step 5, with each value resulting from a larger number of pulse accumulations than its preceding value. Increasing the integration factor (that is, the number of pulse accumulations N) for each iteration is equivalent to increasing the gain applied to the received signal or improving the resolution of the measured value. The TOF sensor device (e.g., the photo-sensor component 306) can select one of the obtained values to be used to calculate the distance of the object based on a selection criterion that identifies a value that provides satisfactory resolution without saturating the pixel.

The timing charts depicted in FIG. 7 illustrate an example timing that follows this principle. In this example, a measuring sequence carried out by the TOF sensor device 302 for each pixel comprises n measuring cycles $714_1$-$714_n$, where each measuring cycle 714 is similar to the measuring cycle illustrated in FIG. 6. After initially clearing the measuring capacitor at the beginning of the sequence by pulsing the RST signal (RST pulse 716), an initial read-out (read-out 0) may be performed prior emission of any light pulses 704 in some embodiments. This initial read-out 0 may be used to obtain a "noise" value associated with the measuring capacitor, which can be subtracted from subsequent measured voltage values in order to correct the measured values that will be used to compute the propagation time and distance. In the examples described herein, it is assumed that the voltage values obtained during the measuring cycles are corrected for noise using any suitable noise elimination technique. After initialization (e.g., clearing of the measuring capacitor and measurement of a noise correction value, the first measuring cycle $714_1$ begins. Similar to the measuring cycle described above in connection with FIG. 6, the emitter component 304 emits a series of pulses 704 into the viewing area for this first measuring cycle $714_1$. For clarity, only one emitted pulse 704 is depicted for each measuring cycle 714 in FIG. 7. However, it should be understood that multiple pulses 704 are emitted for each measuring cycle 714, as described above in connection with FIG. 6. For the first measuring cycle $714_1$, the integration number—that is, the number of emitted pulses 704, as represented by N in FIG. 6—is $N_{g1}$. Each emitted pulse 704 has a duration or width of $T_0$.

As described in previous examples, the gating signal on TX1 goes high for a defined duration ($T_{W1}$) after a defined time duration has elapsed relative to the leading edge of each emitted pulse 704. In the example timing depicted in FIG. 7, each emitted pulse 704 is emitted after a time $T_{Ek}$ has elapsed relative to a start of the current measuring cycle $714_1$, and the TX1 gating signal is pulsed after a time $T_{X1k}$ has elapsed relative to the start of the current measuring cycle, where $T_{X1k}$ is greater than $T_{Ek}$ and the values of $T_{X1k}$ and $T_{Ek}$ depend on which $k^{th}$ pulse is being emitted. This timing of the TX1 gating signal causes an amount of charge analogous to a captured portion of each received light pulse 708 (corresponding to one of the emitted pulses 704) to be stored in measuring capacitor 406. The portion of the received pulse 708 that is captured while the TX1 gating signal is high may be a leading edge portion or a trailing edge portion, depending on the particular embodiment or depending on the stage of the measuring cycle being carried out (e.g., a first stage in which the trailing edge is captured as in FIG. 5A or a second stage in which the leading edge is captured as in FIG. 5B). This amount of charge representative of the captured portion of the received pulse 708 is accumulated in the measuring capacitor 406 over $N_{g1}$ emitted pulses 704 during this first measuring sequence $714_1$.

After $N_{g1}$ light pulses have been emitted and received (resulting in $N_{g1}$ captures), photo-sensor component 306 performs a non-destructive read-out of the measuring capacitor 406 by sampling the stored charge or voltage value (sample and hold pulse 710) and performing an analog to digital conversion of the sampled value (ADC pulse 712). This first sampled value is stored in memory (e.g., memory 320).

Overall, this first measuring cycle $714_1$ is substantially similar to the cycle described above in connection with FIG. 6. However, whereas in previously described examples this first sampled and converted value would invariably be used to calculate the pulse time of flight and corresponding distance for the present measuring sequence, in the present example the photo-detector component 306 initiates a second measuring cycle $714_2$ without clearing the measuring capacitor 406 after the value obtained by the first read-out (Read-out 1) is read, converted, and stored. This second measuring cycle $714_2$ is similar to the first measuring cycle $714_1$, except that the integration number for the second measuring cycle $714_2$ is increased from $N_{g1}$ to $N_{g2}$ (where $N_{g2} > N_{g1}$). As a result, a larger number $N_{g2}$ of light pulses are emitted and received during the second measuring cycle $714_2$ relative to the first measuring cycle $714_1$. Consequently, an additional $N_{g2}$ captures of the portion of the received light pulse 708 are accumulated in measuring capacitor 406 over the course of the second measuring cycle $714_2$. Upon completion of the second measuring cycle $714_2$, the stored charge or voltage on measuring capacitor 406 is again sampled, converted to a digital value (Read-out 2), and stored in memory separately from the first stored value obtained during the first measuring cycle $714_1$. Photo-sensor component 306 then increases the integration number again and initiates a third measuring cycle using this new integration number ($N_{g3}$, which is larger than $N_{g2}$).

In general, the emitter component 304 and photo-sensor component 306 perform n measuring cycles for each measuring sequence, where each subsequent measuring cycle $714i$ uses a larger integration number than its preceding measuring cycle $714(i-1)$ (where i is an integer representing an iteration of the measuring cycle). Moreover, the measuring capacitor is not cleared at the end of each measuring cycle 714, and so the charges accumulated during a given measuring sequence are added to those accumulated during the preceding measuring cycles of the current measuring sequence. As a result, upon completion of the $n_{th}$ measuring cycle $714n$, a total of n measured values representing the captured portion of the received pulse 708 are stored in memory, where each of the n measured values was obtained by a corresponding one of the measuring cycles 714. The stored values ranging from the $1^{st}$ value to the $n^{th}$ value have increasing signal levels (that is, higher charge or voltage levels) as a result of the progressively increasing number of accumulated pulses used to generate the n values. That is, the $1^{st}$ stored value, generated based on the smallest number of pulse accumulations, has the smallest signal level (and correspondingly the smallest resolution), while the $n^{th}$ value has the highest signal level. Specifically, the $n^{th}$ value is generated based on the accumulation of $N_g$ pulses, where $N_g$ is equal to the sum of all pulses accumulated over the n measuring cycles, or $$N_g = \Sigma N_{gn} \quad (3)$$

To ensure that the pulse information having the highest resolution and accuracy is used to determine the time of flight of the emitted pulses and corresponding distance, the stored value having the highest signal level should be used to perform the distance calculations. However, in some detection scenarios in which the received pulse 708 has a high signal level (e.g., if the pulse was reflected by a highly reflective object, or if the object is relatively close to the TOF sensor device 302), integration of the pulse signal in excess of a certain number of pulses may cause the amount of charge accumulated on the measuring capacitor to exceed the capacitor's storage capacity, resulting in saturation of the pixel. Pixel saturation distorts the pulse characteristic measurement, since received pulse information in excess of the measuring capacitor's total capacity is lost. Consequently, some measuring sequences may produce viable measured values of the pulse characteristics up to a certain measuring cycle (e.g., the $6^{th}$ measuring cycle or another measuring cycle less than the $n^{th}$ measuring cycle), while producing saturated values for all subsequent measuring cycles, which continue accumulating and integrating charges in excess of the measuring capacitor's storage capacity as more measuring cycles are executed and more pulses are received.

Accordingly, upon completion of the measuring cycle described above in connection with FIG. 7, the photo-sensor component 306 selects a suitable value of the n stored pulse characteristic values to be used by the distance determination component 308 to computer the pulse time of flight and corresponding distance. Any suitable selection criterion can be used to select an appropriate non-saturated value. For example, in some embodiments, the photo-sensor component 306 may have knowledge of the saturation level of the measuring capacitor 406, and may select, as the value to be used in the distance calculation, the highest of the n stored values that corresponds to a charge or voltage that is less than the saturation level of the measuring capacitor. In other example embodiments, the photo-sensor component 306 may define the cut-off level to be 10% below the saturation level of the measuring capacitor 406, such that the highest of the n values that does not exceed the level 10% below the saturation level is selected to be used in the distance calculation. Regardless of the criterion used to select the value from the n stored values, the selected value will be used by the distance determination component 308 to determine the pulse time of flight for the measuring sequence using one or more suitable equations (e.g. equations (2) and (1), or other suitable propagation time and/or distance formulas). Since the magnitude of the selected value is a function of not only the amount of the captured portion of the received pulse (the leading edge or trailing edge portion) but also the number of accumulated pulses that were used to generate the value—which itself is a function of which of the n measuring cycles 714 generated the value—the distance determination component 308 will apply a scaling factor to the selected value in order to normalize the value with other measured values used in the propagation time and distance calculations. In one or more embodiments, the scaling factor applied to the value will be a function of which of the n measuring cycles generated the value, as will be described in more detail below.

For single-capacitor embodiments that use equation (2) (or a similar formula) to determine the propagation time of the pulse, both the trailing edge portion ($V_{1b}$) and the leading edge portion ($V_{1a}$) of the received pulses 708 must be captured and recorded in order to determine the propagation time. Accordingly, in such embodiments, the measuring sequence can comprise two iterations of the measuring cycles $714_1$-$714_n$, where the first iteration of the measuring cycles $714_1$-$714_n$ is used to capture one portion of the pulse (e.g., the trailing edge portion using a similar timing to that described above in connection with FIG. 5A), while the second iteration of the measuring cycles $714_1$-$714_n$ is used to capture the other portion of the pulse (e.g., the leading edge portion using a similar timing to that described above in connection with FIG. 5B). At the end of the first iteration of the n measuring cycles 714, the photo-sensor component 306 can select one of the n stored values to be used to represent the corresponding portion of the pulse (leading edge or trailing edge portion) using a suitable selection criterion as described above. After this value is selection, the measuring capacitor is cleared (e.g., by pulsing the RST control signal) and the second iteration of the n measuring cycles 714 is performed, with the TX1 gating signal timing modified to capture the other portion of the received pulses (that is, the $T_{X1k}$ timing is modified so that the opposite portion of the received pulses is captured during the second stage). At the end of this second cycle, the photo-sensor component 306 selects which of the resulting n stored values is to be used to represent the other portion of the pulse using a similar selection criterion. These two selected values are then used together with the pulse width $T_0$ and the sampling time $T_s$ by the distance detection component 308 to determine the propagation time according to equation (2), which is then used to compute the distance according to equation (1) (or other equations for determining propagation time and distance).

Any number of measuring cycles n can be executed for a given measuring sequence without departing from the scope of one or more embodiments. Moreover, the integration number $N_{gk}$ (where k is 1 to n) can be increased between consecutive measuring cycles 714 using substantially any arithmetic or exponential increasing function. In one or more example embodiments, the TOF sensor device 302 may perform ten measuring sequences (n=10) and may increase the integration number $N_{gk}$ between consecutive measuring cycles using a power of two progression (although a power of two progression is described herein for illustrative purposes, other types of progressions can also be used without departing from the scope of one or more embodiments). With this configuration the scaling factor to be applied to the respective values in order to normalize the values can also be based on a power of two. This configuration is summarized in Table 1 below:

TABLE 1

| Readout | 1 | 2 | 3 | 4 | 5 | 6 | 7 | 8 | 9 | 10 |
| --- | --- | --- | --- | --- | --- | --- | --- | --- | --- | --- |
| Exposure Gating # | A | A | 2A | 4A | 8A | 16A | 32A | 64A | 128A | 256A |
| Total Exposure | A | 2A | 4A | 8A | 16A | 32A | 64A | 128A | 256A | 512A |
| Scaling Factor | 512 | 256 | 128 | 64 | 32 | 16 | 8 | 4 | 2 | 1 |
| Exponent | 9 | 8 | 7 | 6 | 5 | 4 | 3 | 2 | 1 | 0 |

Table 1 above summarizes, for each of ten measuring cycles making up an example measuring sequence, the number of exposure gatings (that is, the number of pulses received during the measuring cycle), the total number of exposures (that is, the number of pulse accumulations) stored on the measuring capacitor 406 upon completion of the measuring cycle, the scaling factor to be applied to measured values generated by the measuring cycle in order to normalize the value with values obtained by other measuring capacitors, and the exponent associated with the measuring cycle. Integer A in the Exposure Gating # and Total Exposure rows is a base number of pulses, and can be any number of pulses capable of producing a measurable amount of charge on measuring capacitor 406 in at least some circumstances (e.g., 1000 pulses).

As shown in Table 1, the total number of pulse exposures stored on the measuring capacitor 406 at the end of each measuring cycle is double the number of stored pulse exposures at the conclusion of its preceding measuring cycle. To achieve this, the first two measuring cycles (Readout 1 and Readout 2) each emit and accumulate A light pulses, and the number of pulses emitted during each subsequent measuring cycle is doubled relative to its preceding measuring cycle (e.g., measuring cycle 3 emits 2A pulses, measuring cycle 4 emits 4A pulses, etc.). In this way, the signal levels of the measured pulse values increase over the ten measuring cycles according to a power of two progression, with the first measured value having the lowest signal level (based on accumulation of A light pulses on measuring capacitor 406) and the tenth measured value having the highest signal level (based on accumulation of 512A light pulses on measuring capacitor 406). In general, as the number of pulse samples accumulated in the measuring capacitor increases from read-out to read-out, the precision of the measured value also increases and the error is reduced. However, as noted above, this increase in precision from read-out to read-out is only maintained until the total amount of charge on the measuring capacitor reaches or exceeds the saturation level for the pixel, which may occur starting at one of the measuring cycles if the level of the received optical signal is high (e.g., in cases in which the object or surface being measured is relatively reflective or is relatively close to the TOF sensor device 302, or if the illumination of the emitted light pulses is high). Note that, although the example depicted in Table 1 increases the exposure gating by a factor of two for each consecutive measuring cycles, the number of exposure gatings may be increased according to other increasing functions (e.g., by a factor of 10 for each consecutive measuring sequence).

As noted above, upon completion of all measuring cycles of a measuring sequence (e.g., 10 cycles in the example summarized in Table 1), the photo-detector component 306 selects one of the measured values to be used by the distance determination component 308 to compute the propagation time of the pulses and corresponding distance of an object or surface corresponding to the pixel. In one or more embodiments, the photo-detector component 306 can select the value associated with the highest signal level that does not saturate the pixel. For example, if none of the ten measured values summarized in Table 1 saturate the pixel (that is, if amount of charge accumulated on the measuring capacitor 406 by the 512A total exposures upon completion of the tenth measuring cycle does not exceed the measuring capacitor's total storage capacity), the photo-detector component 306 will select the tenth measured value for use in the distance calculation (e.g., by using the value in equations (1) and (2) or similar equations). Alternatively, if the total number of exposures at the end of one of the measuring cycles causes the pixel to saturate by producing an amount of charge that exceeds the measuring capacitor's storage capacity, the photo-detector component 306 will select the value generated by the measuring cycle immediately preceding the first saturated measuring cycle. For example, if the 32A pulse exposures used to generate the sixth measured value in Table 1 exceed the measuring capacitor's storage capacity, but the 16A pulse exposures that gave rise to the fifth measured value do not exceed the measuring capacitor's storage capacity, the photo-detector component 306 will select the fifth measured value (generated by the fifth measuring cycle) for use in the distance computations.

Any suitable selection criterion can be used to identify the first saturated or near-saturated value of the multiple recorded values. For example, if the maximum charge capacity of the measuring capacitor is known, the system may determine that a value is a saturated (and therefore unusable) value if the magnitude of the charge stored on the measuring capacitor at the end of the value's measuring cycle is equal to or greater than the nominal maximum charge capacity. Alternatively, a charge setpoint level may be defined that is less than the nominal maximum charge capacity (e.g., 10% below the nominal maximum capacity). In such embodiments, the TOF sensor device 302 will deem a value to be saturated if the charge on the measuring capacitor used to obtain the value exceeds this charge setpoint level, and will therefore select the value generated by the immediately preceding measuring cycle. Other selection criteria may also be used in one or more embodiments in addition or as an alternative to determining the highest non-saturated value, depending on the processing to be performed on the data.

In order to maintain mathematical consistency across different numbers of pulse exposures, each measuring cycle is associated with a scaling factor that must be applied to any value generated by that measuring cycle. This is particularly important for embodiments that comprise more than one measuring capacitor per pixel (such as the three-capacitor embodiments to be described below), since different capacitors may select values associated with different measuring cycles for a given measuring sequence. Applying suitable scaling factors to the measured values based on the total number of exposures that gave rise to the value can ensure that the values read from different capacitors use the same scale even if each capacitor selects a different exposure gating to generate its value. The scaling factor applied to each measuring cycle's value is based on the number of total exposures used to generate the value. For the example depicted above in Table 1, since the total number of exposures increases between consecutive measuring cycles according to a power of two progression, each measuring cycle can have an associated exponent (indicated by the Exponent row of Table 1) that is a function of the measuring cycle's read-out number. The exponent can be given by:

$$exp = max\_readout\# - readout\# \quad (4)$$

The integer maxr_readout# is the total number of measuring cycles (10 in the example depicted in Table 1), and the integer readout# is the present measuring cycle number for which the exponent (exp) is to be determined. As shown in Table 1, the exponent for the first measuring cycle is 9 (10-1), the exponent for the second measuring cycle is 8 (10-2), etc. This exponent can be used to determine the scaling factor (sf) for each measuring cycle according to:

$$sf = 2^{exp} \quad (5)$$

The resulting scaling factor for each measuring cycle in the present example is shown in the Scaling Factor row of Table 1. The scaling factor can be applied by either the photo-detector component 306 prior to providing the scaled value to the distance determination component 308, or may be applied by the distance determination component 308 itself prior to performing the propagation time and distance calculations. In either case, the value v (corresponding to values $V_{1a}$ or $V_{1b}$ in equation (2) for the single-capacitor embodiments) used in the propagation time and distance calculations can be given by:

$$v = m \cdot 2^{exp} \quad (6)$$

where m is the digital output value (mantissa) generated by the ADC for the selected measuring cycle (equation (6) yields a unitless, normalized value that may be multiplied by a gain factor in order to obtain an absolute electrical measurement; e.g., a voltage value). Using the ten measuring cycles depicted in Table 1 above, where the number of emitted pulses are doubled for each measuring cycle, nine bits can be added to the dynamic range of the ADC. Thus, executing multiple measuring cycles per measuring sequence and selecting the highest non-saturated value produced by the measuring cycles, as described herein, can increase the dynamic range capabilities of the TOF sensor device without a priori knowledge of the strength of the received optical signal and without the need to anticipate a suitable variable gain value.

In one or more embodiments, the sampled and converted pulse characteristic values can be stored for all n measuring cycles 714 of a given measuring sequence, after which the TOF sensor device (e.g., the photo-sensor component 306 or the distance determination component 308) can select which of the n stored values are to be used for the propagation time and distance calculations based on one or more suitable selection criteria as described above. Alternatively, in other embodiments, all n measuring cycles 714 can be performed, but only the sampled and converted values that are not saturated will be stored in memory at the completion of their respective measuring cycles. In such embodiments, if a measuring cycle yields a saturated value (as determined based on a determination that the value obtained by the measuring cycle exceeds a saturation threshold value), that value will be discarded. Values obtained by the remaining measuring cycles after a saturated measuring cycle will also be saturated, and will therefore also be discarded. In still other alternative embodiments, the TOF sensor device 302 may assess each sampled value after completion of the measuring cycle 714 that gave rise to the value and determine whether the previous value generated by the immediately preceding measuring cycle 714 should be overwritten by the new value. For example, after sampling, converting, and storing a first pulse data value generated by the first measuring cycle $714_1$, the second measuring cycle $714_2$ of the n measuring cycles will be executed as described above. However, rather than storing the second value generated by the second measuring cycle $714_2$ separately from that generated by the preceding measuring cycle $714_1$, the photo-sensor component 306 will determine whether this second value is a saturated value (or otherwise satisfies a defined criterion indicating that the data value is unusable). If the second value is determined to be an unsaturated value (e.g., based on a determination that the stored charge on the measuring capacitor 406 that gave rise to the value does not exceed a defined saturation threshold), the photo-sensor component 306 will overwrite the previously obtained value generated by the first measuring cycle $714_1$ with this second measured value. The next measuring sequence $714_3$ is then executed, and this process of assessing each newly obtained value and overwriting the previous value if the new value is not saturated continues until either all n measuring cycles are completed (and no saturated values are generated) or one of the measuring cycles 714 causes the pixel to saturate. If a measuring cycle causes saturation of the pixel, the new value obtained by this measuring cycle is rejected without overwriting the previously stored value, and the measuring sequence ends. The previously stored value—generated by the measuring cycle immediately preceding the last cycle that produced the saturated value—is then used in the propagation time and distance calculations for that measuring sequence. This technique can conserve memory space on the TOF sensor device 302, particularly in the case of TOF sensor devices with large arrays of pixels with each pixel executing n measuring cycles 714 and generating corresponding n data values per measuring sequence.

Figure 8:
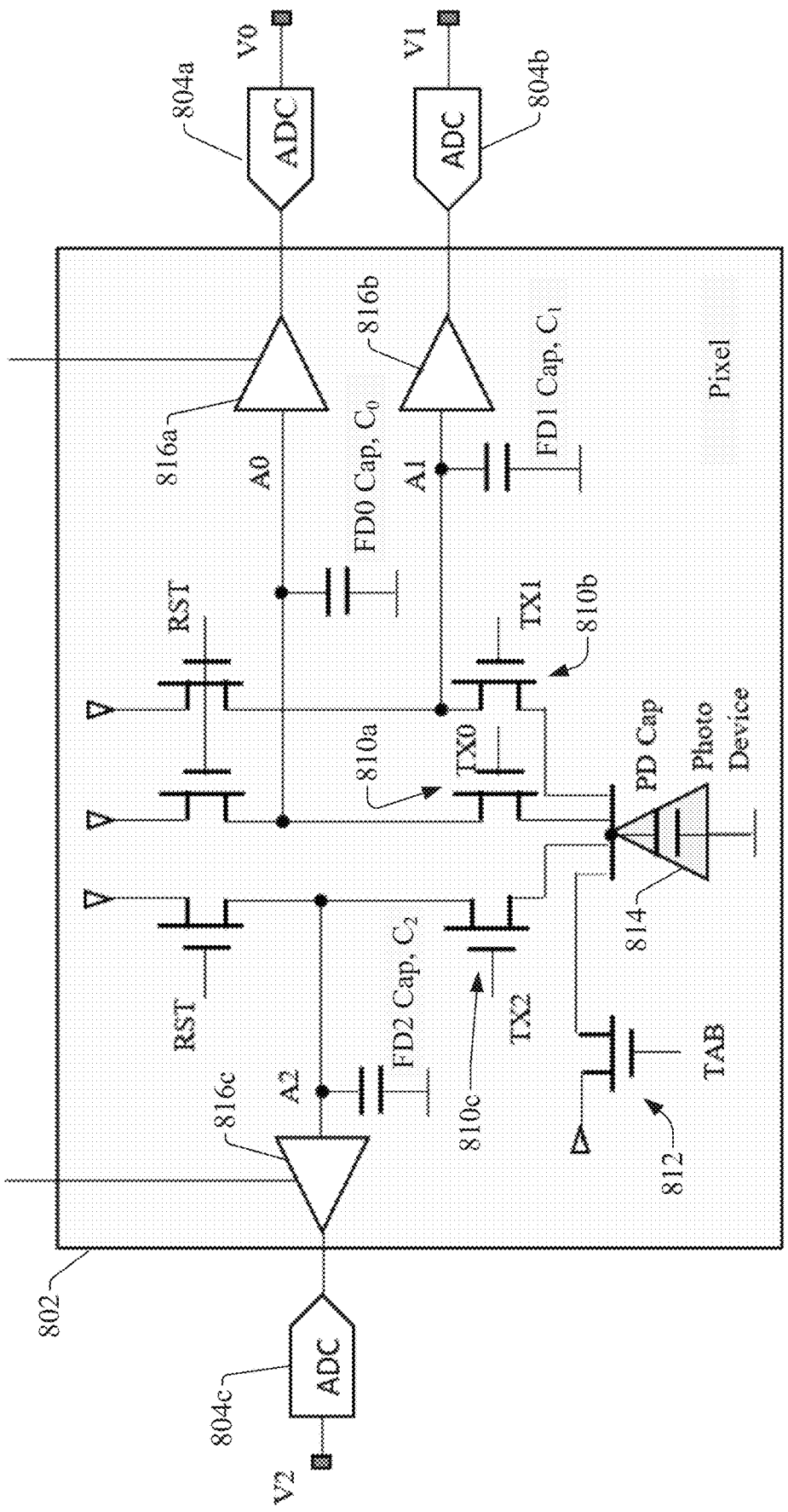
FIG. 8 is a diagram of an example architecture of a photo-detector that includes three measuring capacitors.

Although the foregoing examples have been described in the context of TOF sensor devices having pixels comprising a single measuring capacitor (or other pulse integration means), the general techniques described herein for obtaining high resolution pulse information over a wide dynamic range is also applicable for TOF sensor devices having pixels comprising multiple measuring capacitors. Pixels that employ multiple measuring capacitors can collect pulse information more quickly and with fewer emitted pulses relative to single-capacitor pixels, since more information can be collected and stored per pulse. FIG. 8 is a diagram of an example architecture of a photo-detector 802 for one or more embodiments of TOF sensor device 302 that includes three measuring capacitors C0, C1, and C2 (in contrast to the single-capacitor photo-detector 402 depicted in FIG. 4).

Measuring capacitors C0, C1, and C2 can be floating diffusion capacitors, and are also alternately referred to as FD0, FD1, and FD2, respectively. Photo-detector 802 corresponds to a single pixel of a viewing space being monitored by one or more embodiments of TOF sensor device 302. Photo-detector 802 can be one of an array of photo-detectors 802 that make up a pixel array for the viewing space. Although the present example describes the distance determination features in terms of photo-detector 802, similar techniques can be used to determine time of flight distances in other types of photo-sensitive elements, such as photogates.

Similar to the single-capacitor photo-detector 402 described above, charges generated by photo device 814 in response to incident light is transferred to one of the measuring capacitors C0, C1, or C2, where the measuring capacitor that receives the charge is determined by the states of control line (or gating) switches 810, which are controlled by gating signals TX0, TX1 and TX2. Specifically, a high gating signal TX0 causes the charge to be transferred to measuring capacitor C0, a high gating signal TX1 causes the charge to be transferred to measuring capacitor C1, and a high gating signal TX2 causes the charge to be transferred to measuring capacitor C2. The timing of each gating signal determines when the charges generated by photo device 814 are directed to, and accumulated into, the corresponding measuring capacitor.

This multi-capacitor architecture allows charges generated by photo device 814 in response to a single received light pulse to be separated (or split) and stored in different measuring capacitors by switching from one active gating signal to another while the pulsed light is illuminating the pixel. The time of transition from one gating signal to another is referred to herein as the split point or sampling point, since this transition time determines where, along the received pulse waveform, the received pulse is divided or split.

Figure 9:
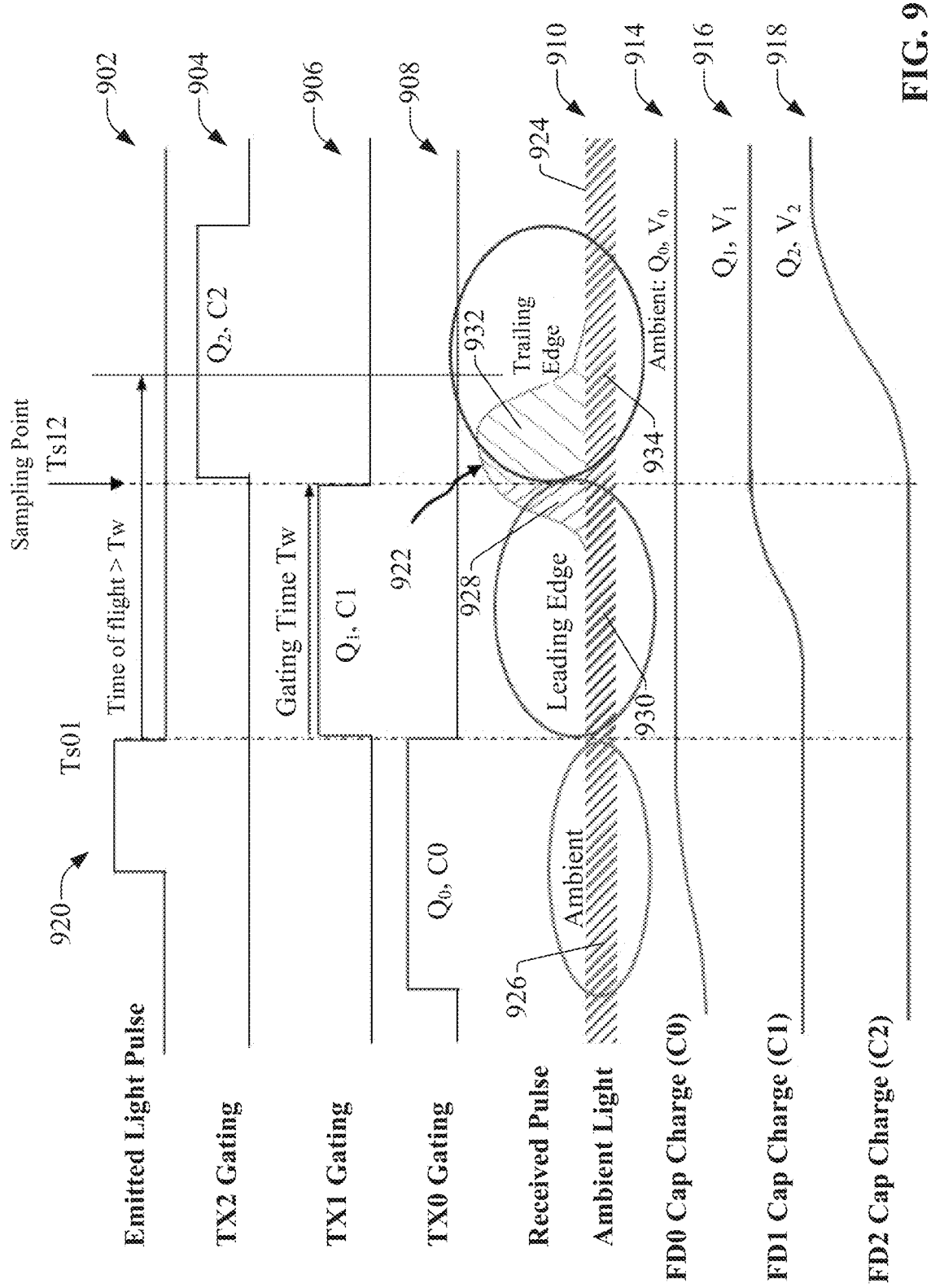
FIG. 9 is a timing diagram illustrating example timings of events associated with operation of a three-capacitor photo-detector for an example pulse period.

FIG. 9 is a timing diagram illustrating example timings of events associated with operation of photo-detector 802 for an example pulse period (e.g., a period of emission and reception of one pulse of an array of pulses comprising a measuring cycle). Emitted light pulse timing chart 902 represents the timing of the light pulse output modulated by the TOF sensor device's emitter component 304, where the high level of chart 902 represents the time at which the emitter component 304 is emitting a light pulse (e.g., light pulse 920). Received pulse timing chart 910 represents the intensity of light received by the photo device 814, where the rise in the intensity represents the received reflected pulse 922 corresponding to the emitted pulse 920 (although emitted pulse 920 is depicted as substantially rectangular, reflected pulse 922 is shown as non-rectangular and somewhat distorted due to possible imperfections in the reading components). In addition to the reflected pulse 922, timing chart 910 also depicts ambient light received at the photo device 814 as a constant flat line 924 above zero (ambient light is assumed to be substantially constant in this example). It is assumed that the anti-blooming control signal to the TAB switch 812 has been pulsed prior to the timing shown in FIG. 9 in order to clear the photo device 814 of charges as an initialization process.

Gating signal timing charts 904, 906, and 908 represent the timings of the TX0, TX1, and TX2 gating signals, respectively. The TX0, TX1, and TX2 gating signals illustrated in FIG. 9 can be controlled by photo-sensor component 306 of three-capacitor embodiments of TOF sensor device 302. In this example timing, the TX0 gating signal goes high prior to emission of pulse 920, and stays high until a time Ts01 (defined relative to the high transition of the TX0 gating signal), for a total duration or gating time of Tw (the gating integration pulse width). The falling edge of the TX0 gating signal can be set to substantially coincide with the falling edge of the emitted light pulse 920 at time Ts01. While the TX0 control signal is high, the light-driven charges collected by the photo device 814 are transferred to measuring capacitor C0, as shown in the FD0 Cap Charge timing chart 914 by the increasing charge $Q_0$ between the leading edge of the TX0 gating signal and time Ts01. The TX0 gating signal goes low at time Ts01, ending the transfer of charges to measuring capacitor C0 (FD0), and causing the total amount of charge on C0 to level to a value $Q_0$ (corresponding to a voltage $V_0$). In the scenario depicted in FIG. 9, since the TX0 gating signal turns off before reflected pulse 922 is received, charge $Q_0$ (and voltage $V_0$) is representative only of ambient light incident on the photo device 814, represented by the circled shaded region 926 under the received light timing chart 910.

Also at time Ts01, the TX1 gating signal turns on and remains high for the duration of gating time Tw (the same duration as the TX0 gating signal), as shown in the TX1 gating timing chart 906. At the end of the gating time Tw, the TX1 gating signal turns off at time Ts12 (also defined relative to the leading edge of the TX0 gating signal). While the Tx1 gating signal is high, light-driven charges from photo device 814 are transferred to measuring capacitor C1 (FD1) as charge $Q_1$, as shown by the increasing $Q_1$ curve between time Ts01 and Ts12 in timing chart 916 (FD1 Cap Charge).

In this example scenario, the time of flight of the emitted pulse, which is a function of the distance of the object or surface from which the pulse was reflected, is such that the leading edge of reflected pulse 922 is received at the photo device 814 while the TX2 gating signal is on. Consequently, this leading edge portion 928 of the reflected pulse is captured as a portion of charge $Q_1$ in measuring capacitor C1. Thus, at time Ts12, charge $Q_1$ on measuring capacitor C1 is representative of the leading edge portion (shaded region 928) of reflected pulse 922 as well as any ambient light received at the photo device 614 while the TX1 control signal is high. That is, the amount of charge $Q_1$ (or voltage $V_1$) stored on measuring capacitor C1 is proportional to the shaded region 930 of timing chart 910 (representing the amount of ambient light collected during the duration of the TX1 high signal) plus the shaded region 928 (representing the leading portion of the received pulse 922 without ambient light).

At time Ts12, the TX1 gating signal goes low and the TX2 gating signal goes high, causing the charges from the photo device 814 to begin transferring to the third measuring capacitor C2. The TX2 gating signal is held high for duration Tw (the same gating time used for the TX0 and TX1 gating signals), and is then switched low. The FD2 Cap Charge timing chart 918 illustrates the rise in the accumulated charge on measuring capacitor C2 during this duration. When the TX2 gating signal goes low, the transfer of charge to measuring capacitor C2 ceases, and the amount of charge on C2 levels to a value $Q_2$ (corresponding to voltage $V_2$). Since time Ts12 occurs while reflected pulse 922 is being received in this example scenario, this timing captures the trailing edge portion of the reflected pulse as a portion of charge $Q_2$ on measuring capacitor C2. Thus, charge $Q_2$ represents the trailing edge portion of received pulse 922 (represented by shaded region 932) plus the amount of ambient light collected while the TX2 gating signal was high (represented by shaded region 934).

Using this gating signal timing, and for the pulse time of flight represented in FIG. 9, the charges generated by reflected pulse 922 are split between measuring capacitors C1 and C2 at the falling edge of the TX1 gating signal (time Ts12). Time Ts12, corresponding to the falling edge of the TX1 gating signal, is therefore the sampling point in this case. In the scenario depicted in FIG. 9, received pulse 922 has a time of flight delay longer than the gating time Tw. Consequently, the received pulse 922 is not received at the photo-detector 802 until after the TX0 gating signal has gone low, and charge $Q_0$ is representative only of ambient light.

Figure 10:
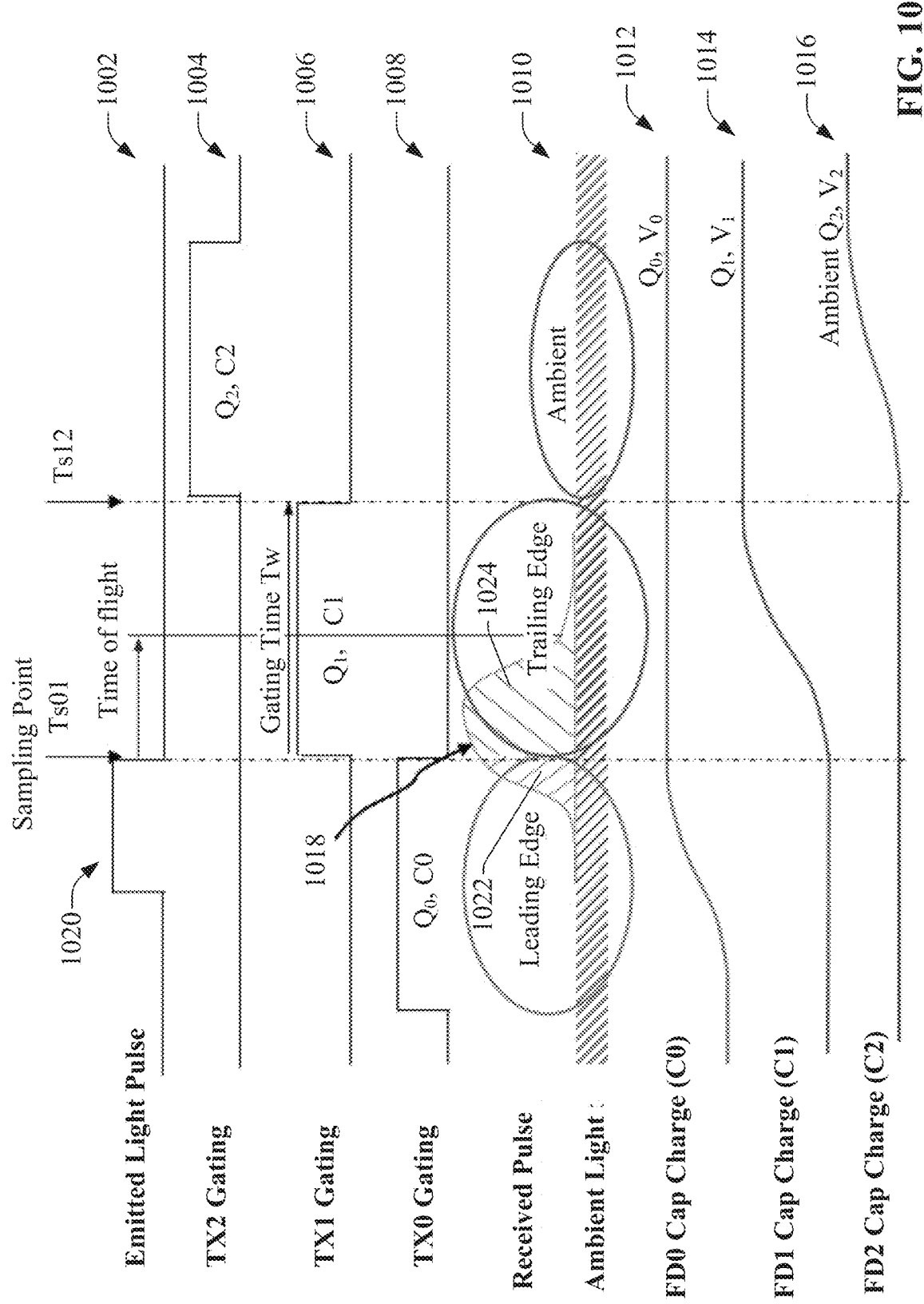
FIG. 10 is another timing diagram illustrating example timings of events associated with operation of a three-capacitor photo-detector.

FIG. 10 is another timing diagram illustrating example timings of events associated with operation of photo-detector 802 for a scenario in which the time of flight for the emitted light pulse 1020 (that is, the time from emission of light pulse 1020 to receipt of reflected pulse 1018 at photo-detector 802) is considerably shorter than that of light pulse 920 of FIG. 9. As shown in timing charts, 1002, 1004, 1006, and 1008, the relative timings of the emission of light pulse 1020 and the TX0, TX1, and TX2 gating signals are the same as those depicted in FIG. 9. However, because the total time of flight of the emitted pulse 1020 is shorter in this scenario relative to the scenario described above (due to the fact that the object or surface from which the pulse is reflected is closer to the TOF sensor device 302), reflected pulse 1018 is received at the TOF sensor device 302 earlier in the pulse cycle relative to reflected pulse 922 shown in FIG. 9.

In contrast to the scenario described above in which the pulse time of flight is longer, in this scenario the reflected pulse 1018 is received while the TX0 gating signal is still high. Consequently, the charge $Q_0$ on measuring capacitor C0 is not only representative of ambient light, as in FIG. 9, but rather is representative of ambient light plus the leading edge portion 1022 of the reflected pulse. Also, the trailing edge portion 1024 of reflected pulse 1018 is captured by measuring capacitor C1 (rather than C2 as in FIG. 9), since the trailing edge portion 1024 is received while the TX1 gating signal is on. Thus, charge $Q_1$ on measuring capacitor C1 is representative of the trailing edge portion 1024 plus ambient light.

As can be seen in the respective timing diagrams of FIGS. 9 and 10, whereas the reflected pulse 922 in FIG. 9 was split (or sampled) at time Ts12, causing the leading and trailing edge portions to be split between measuring capacitors C1 and C2, reflected pulse 1018 is split at time Ts01 due to the shorter time of flight, causing the leading and trailing edge portions to be split between measuring capacitors C0 and C1. Since reflected pulse 1018 has been fully received and captured prior to initiation of the TX2 gating signal, charge $Q_2$ on measuring capacitor C2 is indicative only of ambient light.

The time within the pulse period at which the received pulse is split is referred to as the sampling point. In the case of pulse cycles in which the pulse has a relatively long time of flight (as in FIG. 9), the sampling point will be Ts12, whereas pulse cycles with a relatively short time of flight (as in FIG. 10) will have a sampling point at Ts01. To ensure that the received pulse has only one sampling point, the gating time Tw can be set to be approximately equal to the expected duration between the leading edge and trailing edge of the received pulse (the pulse width $T_0$), to ensure that the pulse is split by only one of the two possible sampling points Ts01 or Ts12, and that the received pulse is unlikely to fall between the sampling times without being split. As illustrated by FIGS. 9 and 10, interpretation of the data stored on each measuring capacitor C0, C1, and C2 changes depending on the sampling point. Specifically, if Ts01 is the sampling point, measuring capacitor C2 records only ambient light, measuring capacitor C0 records ambient light plus the leading edge portion of the received (reflected) pulse, and measuring capacitor C1 records ambient light plus the trailing edge portion of the received pulse. If Ts12 is the sampling point, measuring capacitor C0 records ambient light only, measuring capacitor C1 records ambient light plus the leading edge portion of the received pulse, and measuring capacitor C2 records ambient light plus the trailing edge portion of the pulse.

Once charges $Q_0$, $Q_2$, and $Q_3$ have been accumulated in their respective measuring capacitors for a given pulse sequence, distance determination component 308 of TOF sensor device 402 can identify the sampling point based on a comparison of the charge or voltage values on the measuring capacitors. In an example embodiment, distance determination component 308 can calculate the following two possible pulse amplitude values:

$$\text{Amplitude } 1 = V_0 + V_1 - 2V_2 \qquad (7)$$

$$\text{Amplitude } 2 = V_1 + V_2 - 2V_0 \qquad (8)$$

Equation (7) represents the amplitude of the light pulse in the scenario in which the sampling point is Ts01 (that is, the scenario illustrated in FIG. 10 for shorter times of flight), whereby voltage $V_2$ on measuring capacitor C2 represents only ambient light. In that scenario, voltage $V_0$ is assumed to represent the leading edge of the reflected pulse plus ambient light, and voltage $V_1$ is assumed to represent the trailing edge of the reflected pulse plus ambient light. Therefore, adding $V_0$ and $V_1$ together and subtracting twice $V_2$ yields a value representing the amplitude of the reflected pulse alone, without ambient light.

Equation (8) represents the amplitude of the light pulse in the scenario in which the sampling point is Ts12 (that is, the scenario illustrated in FIG. 9 for longer times of flight), whereby voltage $V_0$ on measuring capacitor C0 represents only ambient light. In that scenario, voltage $V_1$ is assumed to represent the leading edge of the reflected pulse plus ambient light, and voltage $V_2$ is assumed to represent the trailing edge of the reflected pulse plus ambient light. Therefore, adding $V_1$ and $V_2$ together and subtracting twice $V_0$ yields a value representing the amplitude of the reflected pulse alone, without ambient light.

Distance determination component 308, which may not possess a priori knowledge of the sampling point for a given pulse sequence, can determine the sampling point by identifying the largest of the two calculated amplitudes determined according to equations (7) and (8) above. Specifically, the largest of the two calculated amplitudes is taken to represent the correct scenario. If distance determination component 308 determines that Amplitude 1 is greater than Amplitude 2, the sampling point is assumed to be Ts01. Alternatively, if distance determination component 308 determines that Amplitude 2 is greater than Amplitude 1, the sampling point is assumed to be Ts12. This technique for determining the pulse position relative to the sampling points based on amplitude is only intended to be exemplary. In general, any predefined criterion or method for determining the pulse position relative to the sampling points based on a function of measured values can be used.

Figure 11:
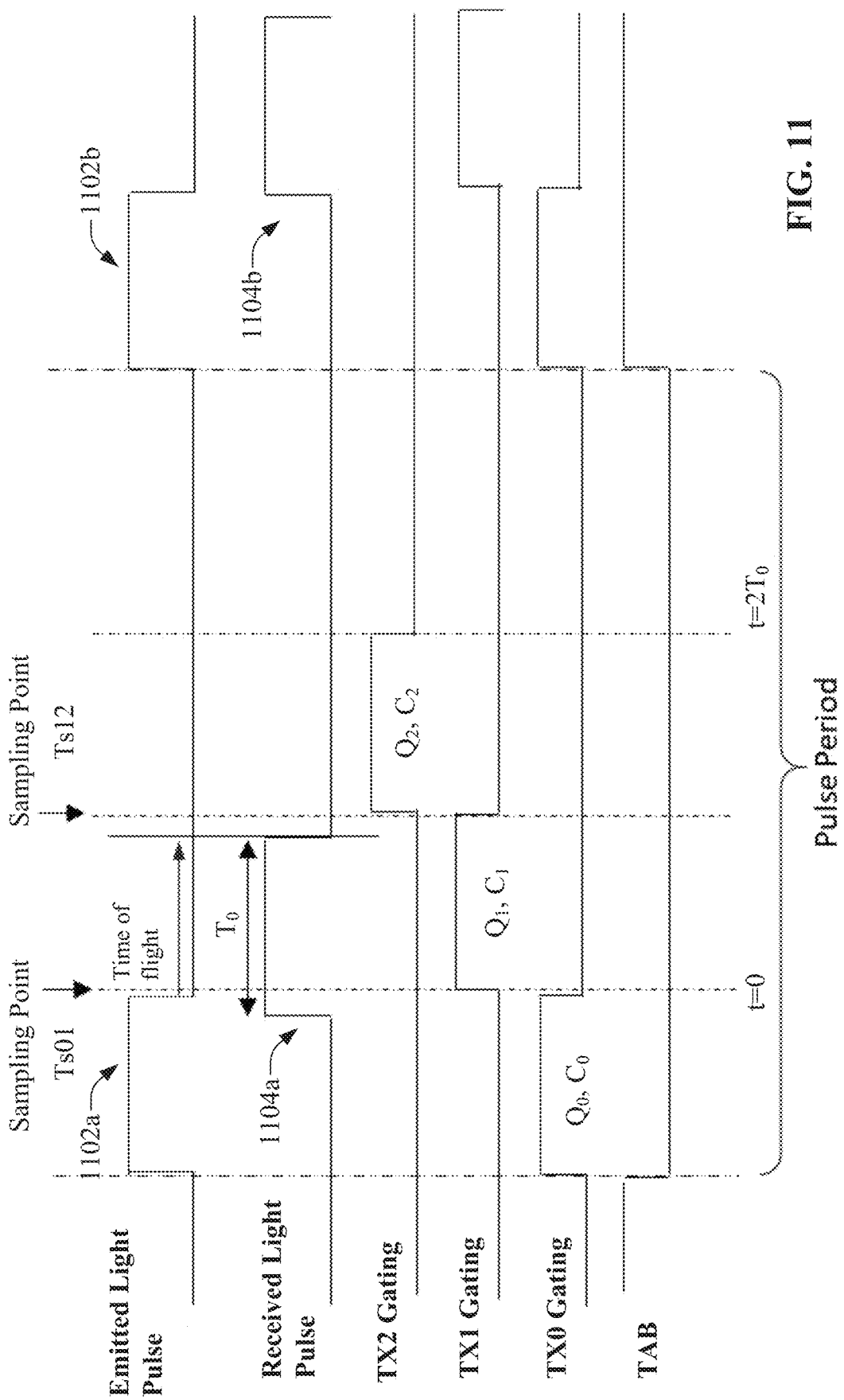
FIG. 11 is a timing diagram illustrating gating timing waveforms during a pulse period.

FIG. 11 is a timing diagram illustrating gating timing waveforms during a pulse period. A pulse period is defined as a time range encompassing emission of a single light pulse 1102 and an iteration of the gating control signal sequence (e.g., the sequence depicted in FIGS. 9 and 10) that captures charges for the corresponding received pulse. As the time of flight of the emitted pulse 1102 increases (as a function of the distance of a reflecting object or surface from the TOF sensor device 302), the received pulse 1104 shifts from the first sampling point Ts01 to the second sampling point Ts12. As the receive pulse 1104 sweeps from the first sampling point Ts01 to the second sampling point Ts12 in time as a function of time of flight (or object distance), the pulse 1104 can be sampled by either Ts01 or Ts12 over a propagation range of twice the pulse width $T_0$, from time t=0 to time t=$2T_0$.

As discussed above, a measuring cycle carried out by the TOF sensor device 302 comprises multiple pulse periods with at least one active gating signal during each pulse period, with the measuring cycle concluding with a readout of the measuring capacitor's stored charge accumulated over the multiple pulse periods. A measuring cycle comprises at least two phases—a pulsing phase and a readout phase.

Figure 12:
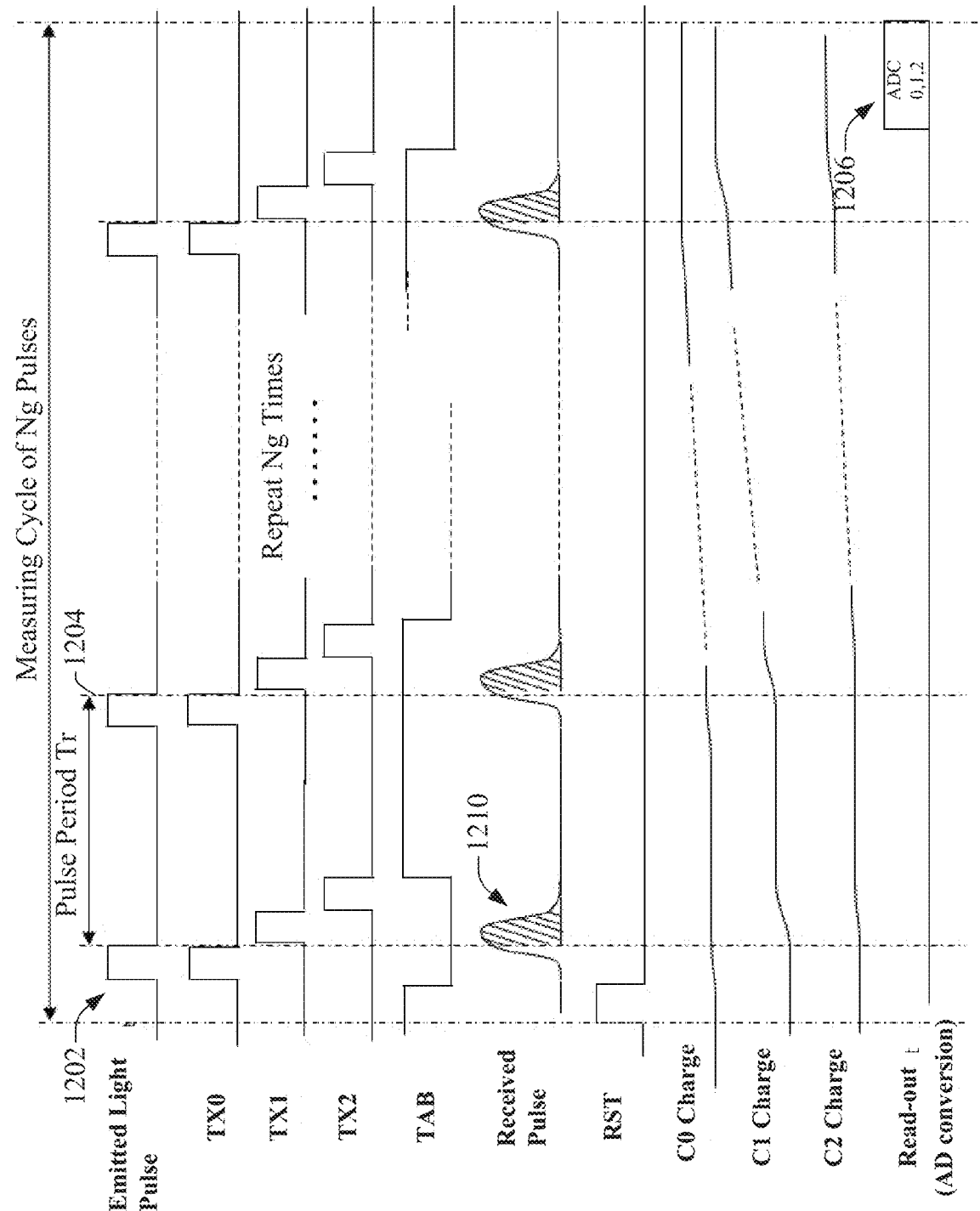
FIG. 12 is a timing diagram illustrating a measuring cycle comprising multiple iterations of a pulse period.

Similar to the single-capacitor embodiments described above, three-capacitor embodiments of TOF sensor device 302 repeat the pulse period—comprising the sequence depicted in FIG. 9 or FIG. 10—multiple times per measuring cycle as a burst sequence. In the three-capacitor embodiments, the charges accumulated over the multiple pulse periods for each measuring cycle are transferred to and collected by the three measuring capacitors (rather than a single capacitor as in the single capacitor embodiments). Repeating the pulse period multiple times within a measuring cycle can ensure that the measuring capacitors accumulate and collect a measurable amount of charge. FIG. 12 is a timing diagram illustrating a measuring cycle comprising multiple iterations of the pulse period described above in connection with FIG. 11. As shown in the emitted light pulse timing chart of FIG. 12, a sequence of Ng light pulses 1202 are emitted by the TOF sensor device's emitter component 304, and a sequence of corresponding reflected pulses 1210 are received at the TOF sensor device's photo-sensor component 306. Concurrently or approximately concurrently with emission of each pulse (or at a defined time after emission of the pulse 1202), the control signal of the TAB goes low and the TX0 gating signal goes high, after which the pulse period sequence proceeds as described above in connection with FIGS. 9 and 10. Since the RST control signal is not pulsed during this measuring cycle (but rather is only pulsed at the beginning of the measuring sequence in order to initialize the measuring capacitors), the charges stored on measuring capacitors C0, C1, and C2 are accumulated over the Ng pulse periods under the control of the TX0, TX1, and TX2 gating signals, respectively, without being cleared after each pulse period.

The vertical dashed lines 1204 represent the sampling points at which each received pulse 1210 is split. In the example measuring sequence of FIG. 12, the pulses are split between measuring capacitors C0 and C1 based on the time of flight of the pulse. By repeating this accumulation for the sequence of Ng pulses, the charges on measuring capacitors C0, C1, and C2 are accumulated over the Ng received pulses 1210 to attain measurable quantities of charge $Q_0$, $Q_1$, and $Q_2$ with an acceptable signal to noise ratio. As in the single-capacitor examples described above, the number of pulses Ng defining this measuring cycle is the integration number or gating number.

At the end of this measuring cycle, photo-sensor component 306 activates a read-out signal 1206 to trigger a reading of the accumulated charges $Q_0$, $Q_1$, and $Q_2$ (or corresponding voltages $V_0$, $V_1$, and $V_2$) from respective measuring capacitors C0, C1, and C2. For embodiments in which the readout channels for the respective measuring capacitors use ADCs 804, as in the architecture depicted in FIG. 8, each of the three readout channels of a pixel can provide a digital value of the charge or voltage stored on its corresponding measuring capacitor. In other embodiments, each readout channel may output an analog value of its corresponding charge or voltage. In either case, the measured values (analog or digital values of $Q_0$, $Q_1$, and $Q_2$, or of $V_0$, $V_1$, and $V_2$) are sampled and stored in memory upon completion of the measuring cycle.

Figure 13:
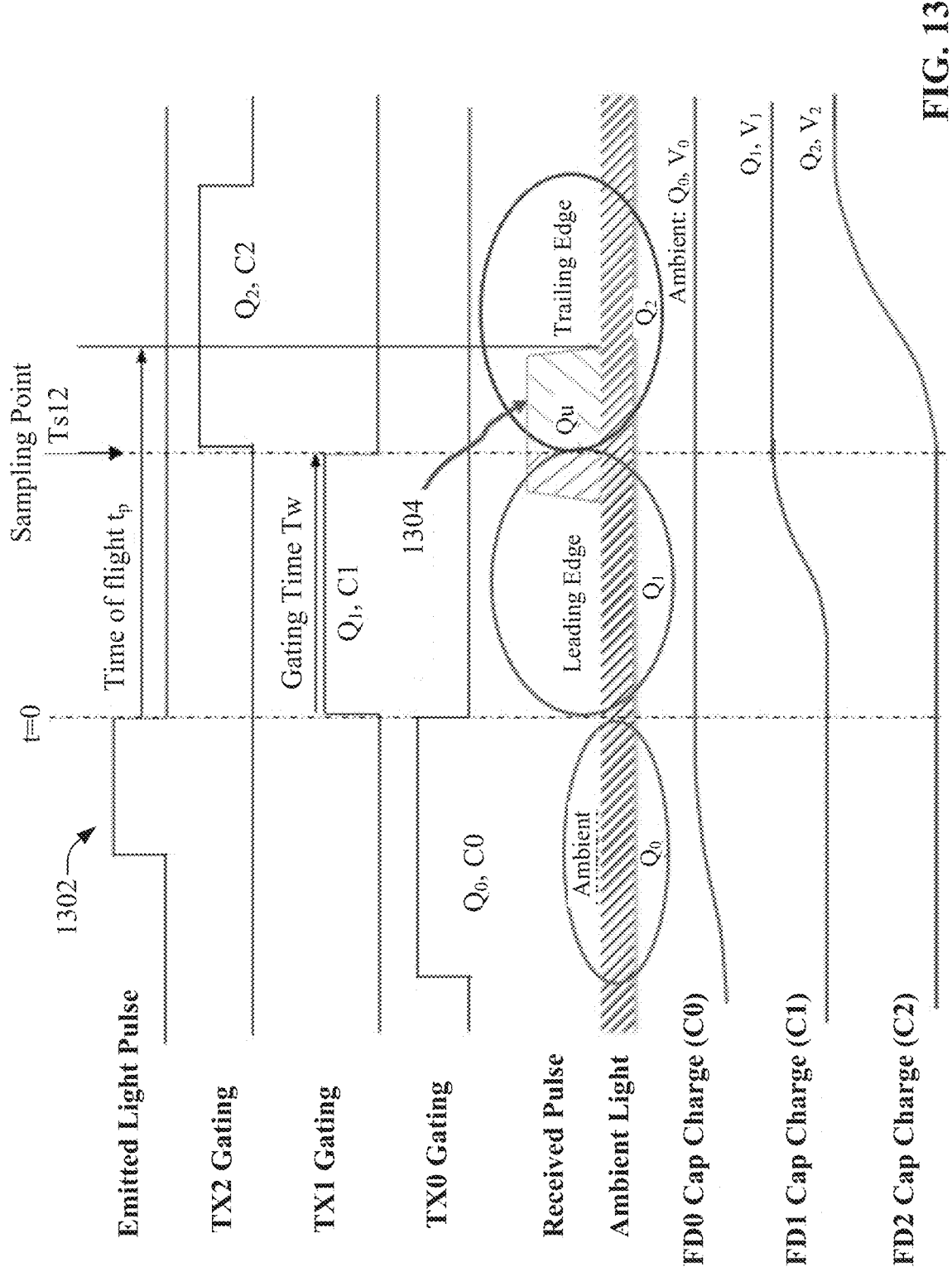
FIG. 13 is a timing diagram illustrating an example pulse period.

The quantity of charges transferred into each of the measuring capacitors for each pulse period (and consequently for the measuring cycle as a whole, which comprises multiple iterations of the pulse period) depends on the position of the pulse relative to the sampling point. FIG. 13 is a timing diagram illustrating another example pulse period, in which pulse 1302 is emitted by emitter component 304, and corresponding reflected pulse 1304 is received and processed by photo-sensor component 306. As noted above, the pulse period illustrated in FIG. 13 is one period of a multi-period burst sequence in which multiple pulses 1302 are emitted, and the charges collected for corresponding multiple reflected pulses 1304 are accumulated in measuring capacitors C0, C1, and C2 (see FIGS. 11 and 12).

In the example depicted in FIG. 13, the time of flight $t_p$ of the pulse (a function of object distance) is such that the reflected pulse 1304 is split at sampling point Ts12. Assuming received pulse 1304 is mostly rectangular, the charges captured by measuring capacitors C2 and C1 when Ts12 is the sampling point can be expressed as:

$$Q_2 = \frac{t_p - T_{s12}}{T_0} Q_u + Q_A \quad (9)$$

$$Q_1 = \left(1 - \frac{t_p - T_{s12}}{T_0}\right) Q_u + Q_A \quad (10)$$

$Q_u$ is the total amount of charge generated by the received light pulse 1304 without ambient light (that is, the sum of the leading and trailing edge portions, represented by the shaded area $Q_u$ in FIG. 13) and available for transfer into the measuring capacitors, $Q_A$ is the amount of charge generated by received ambient light during the gating time Tw, and $T_0$ is the pulse width of the received pulse 1304.

Since measuring capacitor C0 stores charge representative of only ambient light when the sampling time is Ts12, then $$Q_0 = Q_A \quad (11)$$

and the total charge generated by pulse 1304 is given by $$Q_u = Q_1 + Q_2 - 2 \cdot Q_0 \quad (12)$$

The amounts of charge accumulated on each measuring capacitor generate respective voltages based on the capacitances of the capacitors. Assuming that $C_0$, $C_1$, and $C_2$ are the respective capacitances of measuring capacitors C0, C1, and C2, the charges accumulated on the measuring capacitors are given by:

$$Q_0 = C_0 \cdot V_0 \quad (13)$$

$$Q_1 = C_1 \cdot V_1 \quad (14)$$

$$Q_2 = C_2 \cdot V_2 \quad (15)$$

Solving equation (9) for $t_p$ and substituting equations (11) and (12), the time of flight $t_p$ can be expressed as $$t_p = \frac{Q_2 - Q_0}{Q_1 + Q_2 - 2 \cdot Q_0} T_0 + T_{s12} \quad (16)$$

and substituting equations (13), (14), and (15) yields $$t_p = \frac{C_2 \cdot V_2 - C_0 \cdot V_0}{C_1 \cdot V_1 + C_2 \cdot V_2 - 2 \cdot C_0 \cdot V_0} T_0 + T_{s12} \quad (17)$$

Similarly, solving equation (10) for $t_p$ and making the same substitutions yields $$t_p = \left(1 - \frac{C_1 \cdot V_1 - C_0 \cdot V_0}{C_1 \cdot V_1 + C_2 \cdot V_2 - 2 \cdot C_0 \cdot V_0}\right) T_0 + T_{s12} \quad (18)$$

The capacitances can be factored out of equation (16) to yield $$t_p = \frac{V_2 - V_0}{V_1 + V_2 - 2 \cdot V_0} T_0 + T_{s12} \quad (19)$$

Once the values of $V_0$, $V_1$, and $V_2$ have been obtained upon completion of a measuring sequence, and if Ts12 is determined to be the sampling point (based on evaluation of equations (7) and (8), the distance determination component 308 can use equation (19) (or a reasonable variation of this equation) to calculate the propagation time $t_p$, and use this propagation time value to compute the distance using equation (1). If Ts01 is determined to be the sampling point rather than Ts12, equation (19) can be suitably modified as $$t_p = \frac{V_1 - V_2}{V_0 + V_1 - 2 \cdot V_2} T_0 + T_{s01} \quad (20)$$

In some embodiments, any of $V_0$, $V_1$, or $V_2$ may be multiplied by a compensation factor in equations (19) and (20) to compensate for mismatches between the three measuring capacitors. Alternatively, other techniques can be used to compensate for capacitance mismatch between C0, C1, and C2. For example, co-pending U.S. patent application Ser. No. 15/978,679 (incorporated herein by reference), describes techniques for mitigating the effects of mismatched measuring capacitors and read-out paths by permutating the roles of the measuring capacitors for different measuring sequences. This technique can be combined with the measuring techniques described herein in some embodiments.

As in the single-capacitor embodiments described above, in order to increase the dynamic range capabilities of the three-capacitor embodiments of TOF sensor device 302, multiple measuring cycles are performed for each measuring sequence carried out by the sensor device, where the integration number is increased with each subsequent measuring cycle. For the three-capacitor embodiments, each of the multiple measuring cycles has the general timing illustrated in FIG. 12, whereby Ng pulses are emitted and received, and the gating signals on TX0, TX1, and TX2 are cycled for each pulse in order to capture the leading edge pulse portions, trailing edge pulse portions, and ambient light, respectively, in the three measuring capacitors. Similar to the single-capacitor sequence timing described above in connection with FIG. 7, upon completion of a measuring cycle, the stored voltage values $V_0$, $V_1$, and $V_2$ are read from the respective measuring capacitors C0, C1, and C2 and stored in memory. The integration number Ng is then increased and the next measuring cycle is performed using the new, higher integration number. In some embodiments, these iterations of the measuring cycle are repeated until all n measuring cycles that make up the measuring sequence have been performed, resulting in n stored values for each of the three measuring capacitors (3n total values for the measuring sequence). Specifically, upon completion of the measuring sequence comprising n measuring cycles of increasing integration numbers, there are n stored values of $V_0$ (identified as $V_{01}$ through $V_{0n}$), n stored values of $V_1$ (identified as $V_{1n}$ through $Vin$), and n stored values of $V_2$ (identified as $V_{21}$ through $V_{2n}$). The TOF sensor device 302 (e.g., the photo-sensor component 306 or the distance determination component 308) then selects, for each of the three measuring capacitors, one of the capacitor's n values for use in calculating the distance using one or more selection criteria (similar to the selection criteria described above for the single-capacitor embodiment).

Since there are three independent values ($V_0$, $V_1$, and $V_2$) to be selected for the three-capacitor embodiment, rather than a single value as in the single-capacitor embodiments, there are a number of variations of the n-cycle measuring sequence that can serve as the basis for one or more of the three-capacitor embodiments of TOF sensor device 302. FIG. 14 is a table 1402 illustrating a first approach to storing and selecting suitable values of $V_0$, $V_1$, and $V_2$ for some three-capacitor embodiments of TOF sensor device 302. The present example assumes an embodiment in which a measuring sequence comprises ten measuring cycles (n=10), similar to the single-capacitor example described above in connection with Table 1. According to this first variation, all n measuring cycles are performed for all measuring sequences regardless of the measurement conditions, and the resulting n values of $V_0$, $V_1$, and $V_2$ are read out and stored in memory, resulting in three sets of n stored values for the measuring sequence ($V_{01}$–$V_{0n}$, $V_{11}$–$V_{1n}$, and $V_{21}$–$V_{2n}$), the sets respectively corresponding to possible values of $V_0$, $V_1$, and $V_2$ read from measuring capacitors C0, C1, and C2 at the completion of each measuring cycle. Rows $V_0$, $V_1$, and $V_2$ in Table 1402 represent the three sets of ten stored values, respectively, for the present ten-cycle example. The TOF sensor device 302 will then individually select a value from each set based on one or more of the selection criteria described above. Specifically, the TOF sensor device 302 will select, from each of the three sets of n values, the highest non-saturated value from that set. The selected value will then be scaled using the appropriate scaling factor (indicated in the Scaling Factor row of Table 1402) corresponding to the number of total gating exposures that gave rise to the selected value (as described above in connection with Table 1). In the example measuring sequence depicted in FIG. 14, the selected values for $V_0$, $V_1$, and $V_2$ are $V_{07}$ (corresponding to the $7^{th}$ measuring cycle), $V_{18}$ (corresponding to the $8^{th}$ measuring cycle), and $V_{24}$ (corresponding to the $4^{th}$ measuring cycle), respectively.

As illustrated in FIG. 14, it is possible that the selected values of $V_0$, $V_1$, and $V_2$ for a given measuring sequence may be based on respective different gating numbers when using this approach. For example, if the trailing edge portion represented by $V_2$ is considerably larger than the leading edge portion represented by $V_1$ for a given measuring sequence, measuring capacitor C2 may saturate at an earlier measuring cycle than measuring capacitor C1. Consequently, the selected value of $V_2$ (that is, the highest non-saturated value of $V_2$) may correspond to an earlier read-out number (e.g., Read-out 4 in FIG. 14) than the selected value of $V_1$ (e.g., Read-out 8 in FIG. 14). Although the raw values for these two selected values $V_1$ and $V_2$ will be scaled differently due to the different integration numbers associated with the respective values (depending on which measuring cycle gave rise to the values), the different scaling factors applied to these raw values based on their associated measuring cycles prior to computing the propagation time and distance will substantially accommodate for these different scales, effectively normalizing the values to a common scale. In the example sequence represented by Table 1402, $V_{07}$ will be scaled by 8, $V_{18}$ will be scaled by 4, and $V_{24}$ will be scaled by 64. These scaled values of $V_0$, $V_1$, and $V_2$ can then be used in equations (19) or (20) to determine the propagation time, and the distance can be calculated using equation (1).

FIG. 15 is a table 1502 illustrating a second approach to storing and selecting suitable values of $V_0$, $V_1$, and $V_2$ for some three-capacitor embodiments of TOF sensor device 302. According to this approach, all n values will again be stored for the three measuring capacitors for all measuring sequences, as in the previous approach described in connection with FIG. 14. However, in contrast to the previous approach, the TOF sensor device 302 selects values of $V_0$, $V_1$, and $V_2$ from the respective three sets of n stored values such that the selected values all derive from the same measuring sequence (Read-out 4 in the example illustrated in FIG. 15). Selecting the values of $V_0$, $V_1$, and $V_2$ corresponding to the same measuring sequence can mitigate potential time-based distortions that may arise in some circumstances when using the first approach illustrated in FIG. 14. For example, if the level of ambient light incident on the photo-detector 802 changes between measuring cycles, values of $V_0$, $V_1$, and $V_2$ selected from different measuring cycles of a given sequence may contain different levels of ambient light, which may reduce the accuracy of the propagation time calculation (e.g., as determined by equations (19) or (20) or variations thereof). Selecting values of $V_0$, $V_1$, and $V_2$ that were obtained during the same measuring cycle, as illustrated in FIG. 15, can mitigate such time-based errors.

Any suitable selection criterion can be used to select which of the n measuring cycles is to provide the values of $V_0$, $V_1$, and $V_2$. For example, after the n values have been stored for each of $V_0$, $V_1$, and $V_2$ upon completion of the n measuring cycles, the TOF sensor device 302 can identify the highest non-saturated value for each of the three sets. Following from the previous example of FIG. 14, the highest non-saturated values of $V_0$, $V_1$, and $V_2$ correspond to measuring cycles 7, 8, and 4, respectively. The TOF sensor device 302 can then identify which of these three highest non-saturated values corresponds to the earliest of the n measuring cycles, and select the values of $V_0$, $V_1$, and $V_2$ associated with this earliest measuring cycle to be used in the propagation time and distance calculations. In the illustrated example, since value $V_2$ is associated with the earliest measuring cycle—measuring cycle 4—values $V_{04}$, $V_{14}$, and $V_{24}$ are selected, as shown in FIG. 15. These three selected values are scaled by the scaling factor associated with the selected measuring cycle (64 in the present example), and the resulting scaled values are used to calculate the propagation time and distance (e.g., using equations (19) or (20) as well as equation (1)).

The example approaches described above in connection with FIGS. 14 and 15 require 3n measured values (where n is the number of measuring cycles performed for each measuring sequence) to be stored in memory for each measuring sequence prior to selection of suitable values of $V_0$, $V_1$, and $V_2$. To reduce memory consumption, these two approaches can be modified in some embodiments to employ the overwrite technique described above for single-capacitor embodiments. That is, rather than executing all n cycles for each value $V_0$, $V_1$, and $V_2$ for every measuring sequence and storing the resulting three sets of n values in memory prior to selecting a value from each set, some embodiments can determine whether a value generated by a measuring cycle is a saturated value upon completion of that measuring cycle, and if the new value is not saturated, overwrite the previously obtained value generated by the immediately preceding measuring cycle. This process continues until all n measuring cycles have been completed or until a measuring cycle produces a saturated value. If a saturated value is generated by a measuring sequence, the previous value obtained by the immediately preceding measuring cycle is not overwritten, but instead is selected as the value to be used for the propagation time and distance calculations. Any remaining unexecuted measuring cycles after the cycle that generated the saturated value can remain unexecuted in order to minimize processing time.

This technique of overwriting previously obtained values until a saturated value is generated can be applied to both the first example approach described in connection with FIG. 14, where the selection criterion is applied to each of $V_0$, $V_1$, and $V_2$ independently, and the second example approach of FIG. 15, where values of $V_0$, $V_1$, and $V_2$ are selected from the same measuring cycle in all cases. This technique can conserve both the amount of memory required for storage of pulse characteristic information for each pixel as well as processing time, since measuring sequences that receive light pulses of relatively high signal levels may not require all n measuring cycles to be performed if pixel saturation occurs before all n measuring cycles are performed.

Applying this overwrite technique to the example scenario depicted in FIG. 14, upon completion of each measuring cycle, the TOF sensor device 302 determines whether any of the three values of $V_0$, $V_1$, and $V_2$ obtained during that cycle are saturated values (e.g., based on a determination of whether the voltage levels on the respective measuring capacitors C0, C1, and C2 exceed their defined saturation setpoints). Any non-saturated values of $V_0$, $V_1$, or $V_2$ are stored in memory, overwriting the previously stored value obtained during the previous measuring cycle. If a measuring cycle generates a saturated value, that value is discarded and the previously stored corresponding value is maintained in memory. In the example scenario depicted in FIG. 14, measuring cycle 5 yields a saturated value of $V_2$ ($V_{25}$), and so value $V_{25}$ is discarded and value $V_{24}$ (obtained during the immediately preceding measuring cycle 4) is maintained in memory. Since there are remaining measuring cycles to be executed for the measuring sequence, and saturated values of $V_0$ and $V_1$ have not yet been generated, the measuring cycles continue to be executed. However, all values of $V_2$ obtained during subsequent measuring cycles of the present measuring sequence are discarded without being stored, since the fourth value of $V_2$ ($V_{24}$) has already been selected.

New values of $V_0$ and $V_1$ continue to be generated and stored over preceding values of $V_0$ and $V_1$ upon completion of each subsequent measuring cycle until a saturated value of $V_0$ or $V_1$ is generated. In the scenario depicted in FIG. 14, a saturated value of $V_0$($V_{08}$) is detected upon completion of measuring cycle 8, and so value $V_{08}$ is discarded and value $V_{07}$ is maintained in memory as the value of $V_0$ to be used for the propagation time and distance calculation. Since a suitable value $V_1$ has not yet been determined, the measuring cycles continue to be executed until a saturated value of $V_1$ is generated (or until all n measuring cycles have been executed). In the present example, this occurs at the completion of measuring cycle 9, which yields saturated value $V_{19}$. When value $V_{19}$ is determined to be a saturated value, $V_{19}$ is discarded and value $V_{18}$ to be maintained in memory as the value to be used in the propagation time and distance calculations. Since suitable values of $V_0$, $V_1$, and $V_2$ have been determined as of completion of the $8^{th}$ measuring cycle, the remaining measuring sequences are not executed, and distance determination component 308 uses these selected values of $V_0$, $V_1$, and $V_2$ to compute the propagation time and distance (e.g., using equations (19) or (20) together with equation (1), or variations of these equations).

Applying the value overwrite technique to the example second approach illustrated in FIG. 15, the measuring cycles of a given measuring sequence will continue to execute, with each new value of $V_0$, $V_1$, and $V_2$ overwriting their corresponding previously obtained values in memory, until a saturated value of any of $V_0$, $V_1$, or $V_2$ is generated. In the example scenario depicted in FIG. 15, a saturated value of $V_2$ ($V_{25}$) is generated by the $5^{th}$ measuring cycle (similar to the example of FIG. 14). Accordingly, the values of $V_0$, $V_1$, or $V_2$ that were generated by the immediately preceding measuring cycle—measuring cycle 4—are maintained in memory, and the values $V_{05}$, $V_{15}$, and $V_{25}$ generated during the $5^{th}$ measuring cycle are discarded. The remaining measuring cycles are not executed, and values $V_{04}$, $V_{14}$, and $V_{24}$ are provided to the distance determination component 308 for computation of the propagation time and distance.

In another variation, some embodiments may define a sufficient signal level threshold in addition to, or instead of, the saturation threshold. In such embodiments, upon completion of a measuring cycle, the TOF sensor device 302 determines whether the value for a given measuring capacitor generated by the measuring cycle exceeds the sufficient signal level threshold. If the value does not exceed the sufficient signal level threshold, the sensor device 302 will discard the value without saving. If the value does exceed the sufficient signal level threshold, the sensor device 302 saves the value and discards values obtained for that measuring capacitor by the remaining measuring cycles. This value is then used by the distance determination component 308 to calculate the propagation time and distance as described in previous examples. For three-capacitor sensors that implement this approach, values for each measuring capacitor can be obtained individually using this technique. Alternatively, in a variation of these embodiments, upon completion of a measuring cycle in which one or more of the measuring capacitors yields a value that exceeds the sufficient signal level threshold, the sensor device 302 may prevent storage of all measuring capacitor values for all subsequent measuring cycles, and compute the propagation time and distance using the three measuring capacitor values produced by that measuring cycle.

The various embodiments of TOF sensor device 302 described herein are capable of accurate object detection across a high dynamic range without requiring a variable gain to be placed in the signal path, and without a priori knowledge of the strength of the incoming pulse signal. The techniques described herein, wherein multiple measuring cycles of increasing integration numbers are executed per measuring cycle and highest non-saturated pulse characteristic values are selected from the among the resulting values, can ensure that high-resolution pulse characteristic information is used to calculate propagation time and distance while controlling for pixel saturation across a wide range of signal strength levels.

FIGS. 16A-19D illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 16A:
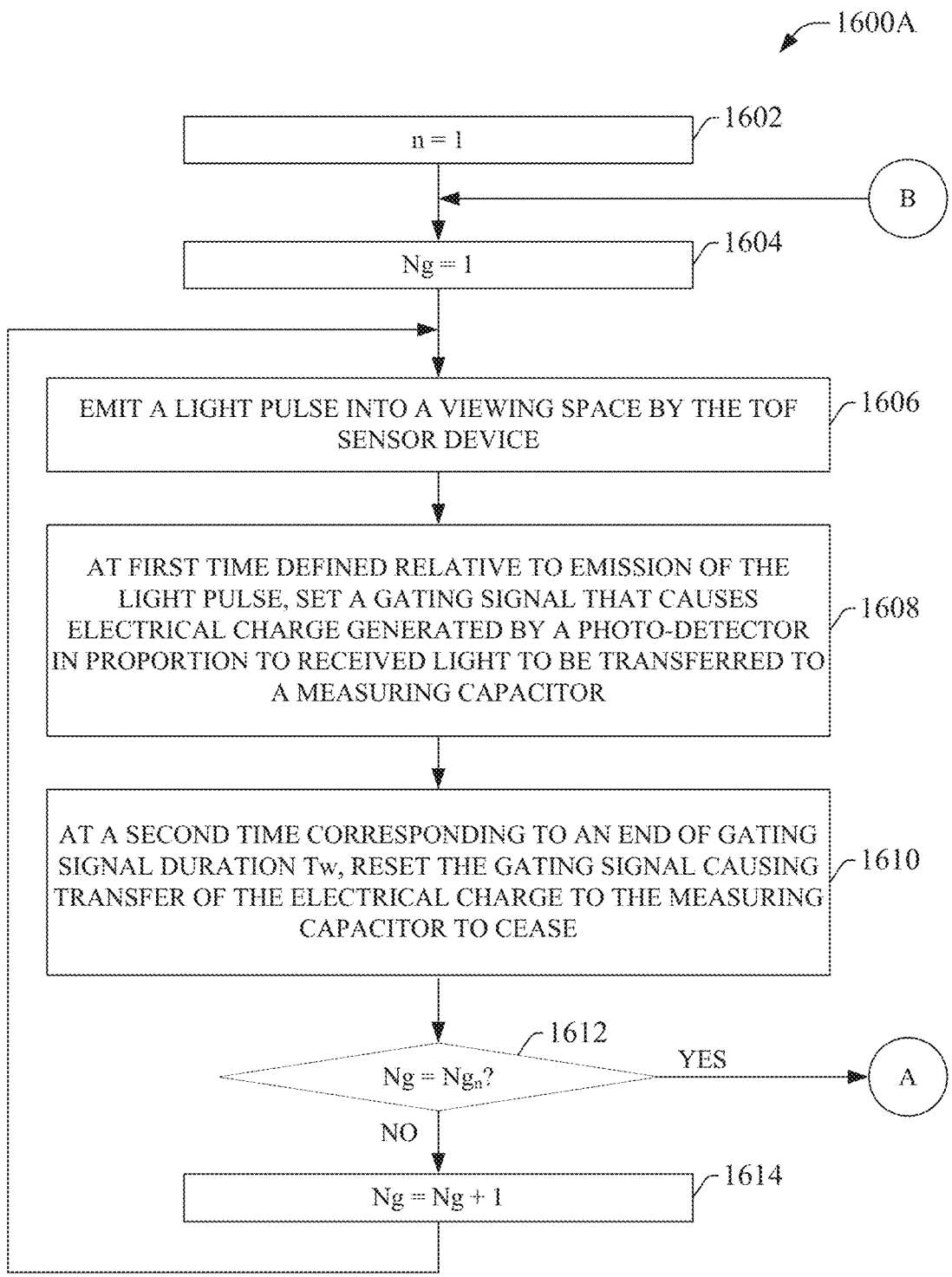
FIG. 16A is a flowchart of a first part of an example methodology for executing a measuring sequence that determines a distance of an object or surface corresponding to a pixel of a TOF sensor image for TOF sensor devices comprising one measuring capacitor per pixel.

FIG. 16A illustrates a first part of an example methodology 1600A for executing a measuring sequence that determines a distance of an object or surface corresponding to a pixel of a TOF sensor image. The methodology illustrated in FIGS. 16A-16C may be suitable for execution on a TOF sensor device having an array of single-capacitor photo-detectors (or photo-detectors having other types of charge integration components) as illustrated in FIG. 4.

Initially, at 1602, an integer variable n is set to 1. This variable n is used to track the number of measuring cycles executed for the measuring sequence. At 1604, another integer variable Ng is also set to 1. This variable Ng is used to track the number of light pulses that are emitted for the present measuring cycle.

At 1606, a light pulse is emitted into the viewing space by the TOF sensor device. At 1608, at a first time defined relative to emission of the light pulse, a gating signal is set that causes electrical charge generated by a photo-detector in proportion to received light to be transferred to a measuring capacitor associated with the pixel. At 1610, at a second time corresponding to an end of a gating signal duration Tw subsequent to the first time, the gating signal is reset, which ceases transfer of electrical charge to the measuring capacitor to cease.

At 1612, a determination is made as to whether Ng is equal to $Ng_n$, which is the integration number (or gating number) for the current measuring cycle, and which is a function of the present measuring cycle number n. The integration number $Ng_n$ represents the total number of light pulses to be emitted and accumulated by the photo-detector for the current measuring cycle. If Ng is not equal to $Ng_n$ (NO at step 1612), then Ng is incremented at step 1614 and the methodology returns to step 1606. Steps 1606-1612 are then repeated so that another light pulse is emitted at step 1606 and the gating signal is cycled again at steps 1608 and 1610. Repetition of steps 1606-1612 causes additional charge to accumulate on the measuring capacitor in proportion to a captured portion of the received light pulses, where the captured portion is a function of when the gating signal is set relative to emission of the pulse. The captured portion may be a leading edge portion of the pulses (as in the example timing depicted in FIG. 5B) or a trailing edge portion (as in the example timing depicted in FIG. 5A). In the present example, it is assumed that the captured portion is the trailing edge portion. The repeated $Ng_n$ iterations of steps 1606-1612 are performed without clearing the electrical charge on the measuring capacitor.

Figure 16B:
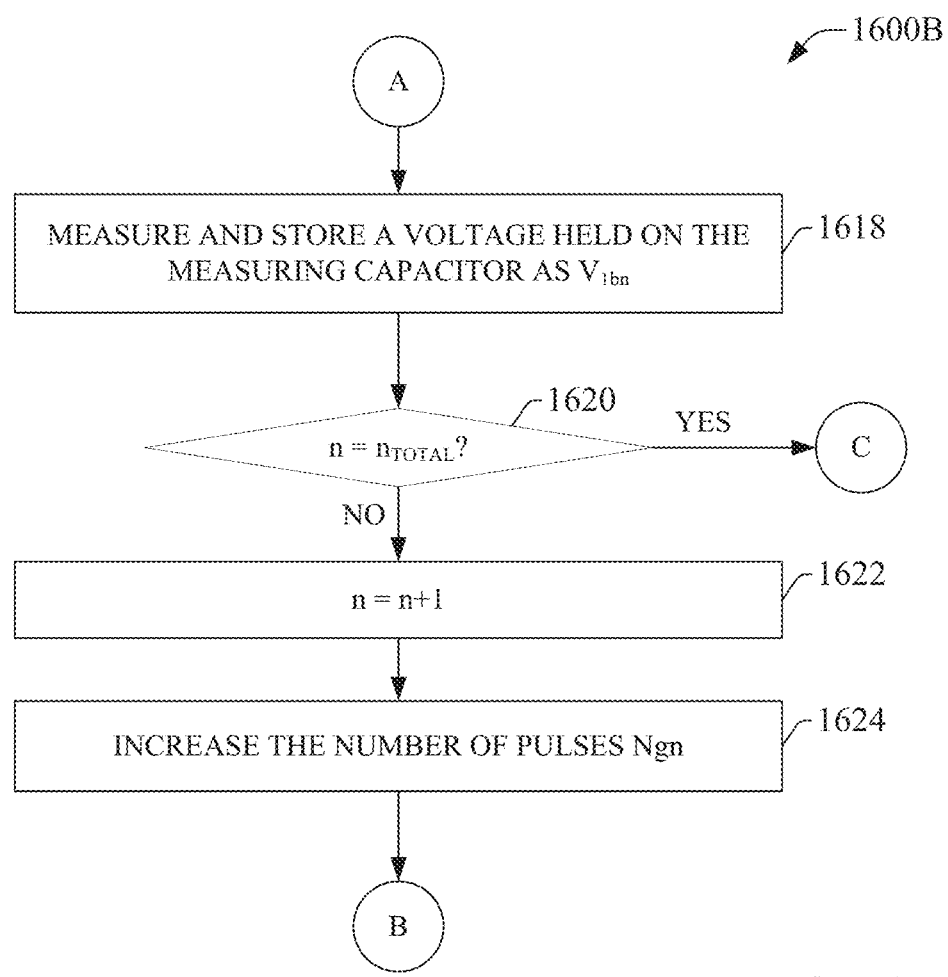
FIG. 16B is a flowchart of a second part of the example methodology for executing a measuring sequence that determines a distance of an object or surface corresponding to a pixel of a TOF sensor image for TOF sensor devices comprising one measuring capacitor per pixel.
Figure 16C:
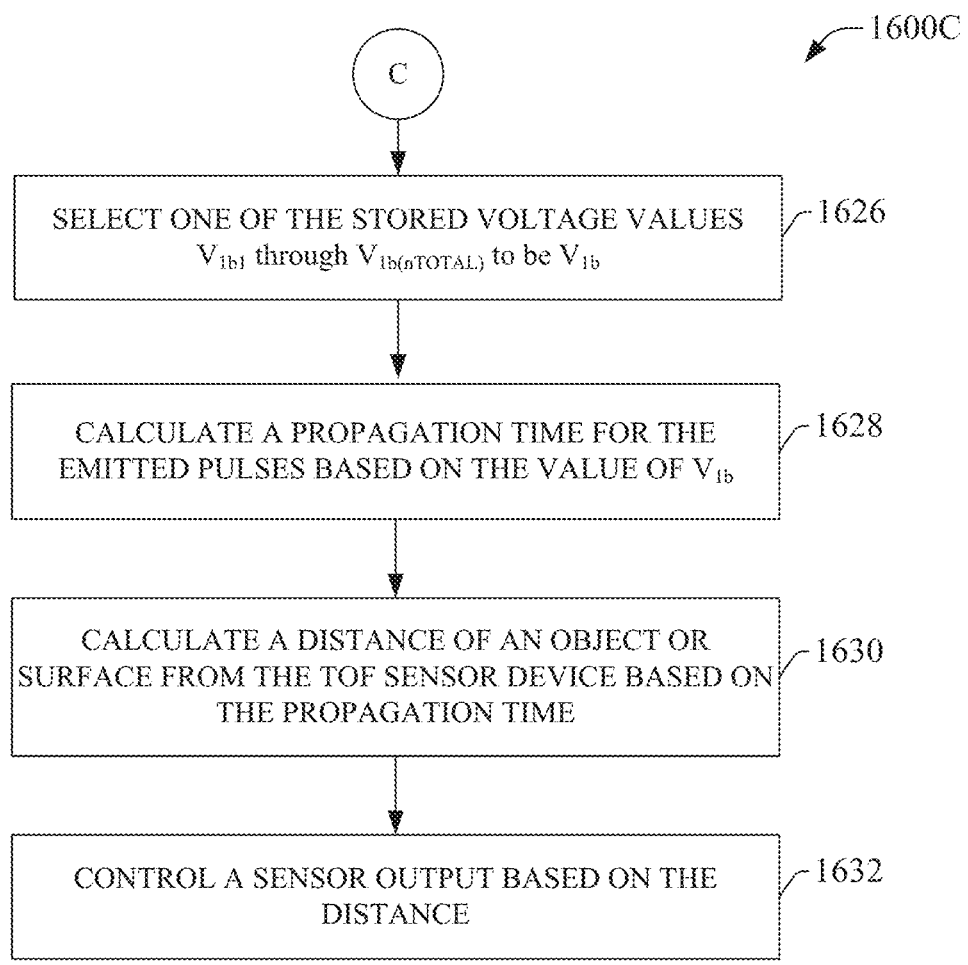
FIG. 16C is a flowchart of a third part of the example methodology for executing a measuring sequence that determines a distance of an object or surface corresponding to a pixel of a TOF sensor image for TOF sensor devices comprising one measuring capacitor per pixel.

When $Ng_n$ pulses have been emitted and received (YES at step 1612), the methodology proceeds to the second part 1600B illustrated in FIG. 16B. At step 1618, a voltage held on the measuring capacitor is measured and stored as a value $V_{1bn}$. This value is proportional to the captured portion of the reflected pulses (corresponding to the emitted pulses) received by the photo-detector, accumulated over the sum of all $Ng_n$ pulses emitted for all measuring cycles thus far executed for the present measuring sequence (see equation (3)). At 1620, a determination is made as to whether the current value of n (representing the number of the present measuring cycle) is equal to $n_{TOTAL}$, where $n_{TOTAL}$ is the total number of measuring cycles to be executed for the measuring sequence. If n does not equal $n_{TOTAL}$ (NO at step 1620), the integer n is incremented at step 1622. Also, the number of pulses $Ng_n$ to be emitted for the next measuring cycle is increased at step 1624. The number of pulses $Ng_n$ can be increased between measuring cycles according to substantially any arithmetic or exponential increasing function (e.g., a power of two progression as depicted in Table 1 as well as FIGS. 14 and 15). The methodology then returns to step 1604, where Ng is set to 1 and steps 1606-1614 are repeated $Ng_n$ times for the next measuring cycle, yielding another stored value of $V_{1bn}$ at step 1618 upon completion of the measuring cycle. Since the voltage stored on measuring capacitor is not cleared between measuring cycles, the magnitude of each value of $V_{1bn}$ stored at step 1618 is based on an accumulation of all $Ng_n$ pulses emitted over all measuring cycles executed thus far for the present measuring cycle.

Steps 1604-1624 are repeated for all $n_{TOTAL}$ measuring cycles to be performed for the measuring sequence, yielding n values of $V_{1bn}$ upon completion of all $n_{TOTAL}$ measuring cycles, where the sequential values of $V_{1bn}$ represent the captured pulse characteristic at a progressively higher signal level or resolution. When all $n_{TOTAL}$ measuring cycles have been completed (YES at step 1620), the methodology proceeds to the third part 1600C illustrated in FIG. 16C. At 1626, one of the stored voltage values $V_{1b1}$ through $V_{1b(nTOTAL)}$ is selected to be the value of $V_{1b}$, which will be used to compute the propagation time for the emitted pulses. Substantially any selection criterion can be used to select one of the stored values for use in the propagation time calculation. For example, a saturation voltage setpoint may be defined for the pixel, and step 1626 may select the highest of the values $V_{1b1}$ through $V_{1b(nTOTAL)}$ that does not exceed this saturation voltage setpoint. In another example, a minimum acceptable signal level threshold may be defined for the pixel, and step 1626 may select the lowest of the values $V_{1b1}$ through $V_{1b(nTOTAL)}$ that exceeds this minimum signal threshold. Other selection criteria are also within the scope of one or more embodiments of this disclosure.

At 1628, a propagation time for the emitted pulses is calculated based on the value of $V_{1b}$ selected at 1626. For example, equation (2) or a variation thereof can be used to determine the propagation time based on the selected value of $V_{1b}$. In such embodiments, steps 1602-1626 can be executed a second time for the measuring sequence using a different gating signal timing at steps 1608 and 1610 in order to generate and store values of the leading edge portion of the emitted pulses as $V_{1a1}$ through $V_{1a(nTOTAL)}$, and to select one of these stored values to be used as $V_{1a}$ in the propagation time calculation of equation (2).

At 1630, a distance of an object or surface from the TOF sensor device is calculated based on the propagation time determined at step 1628 (e.g., using equation (1) or a variation thereof). At 1632, a sensor output is controlled based on the distance value determined at step 1630. For example, in the case of a TOF sensor device used as an industrial safety sensor, the sensor output may be a safety output signal triggered in response to a determination that the distance calculated at step 1630 is less than a defined minimum safe distance.

Figure 17A:
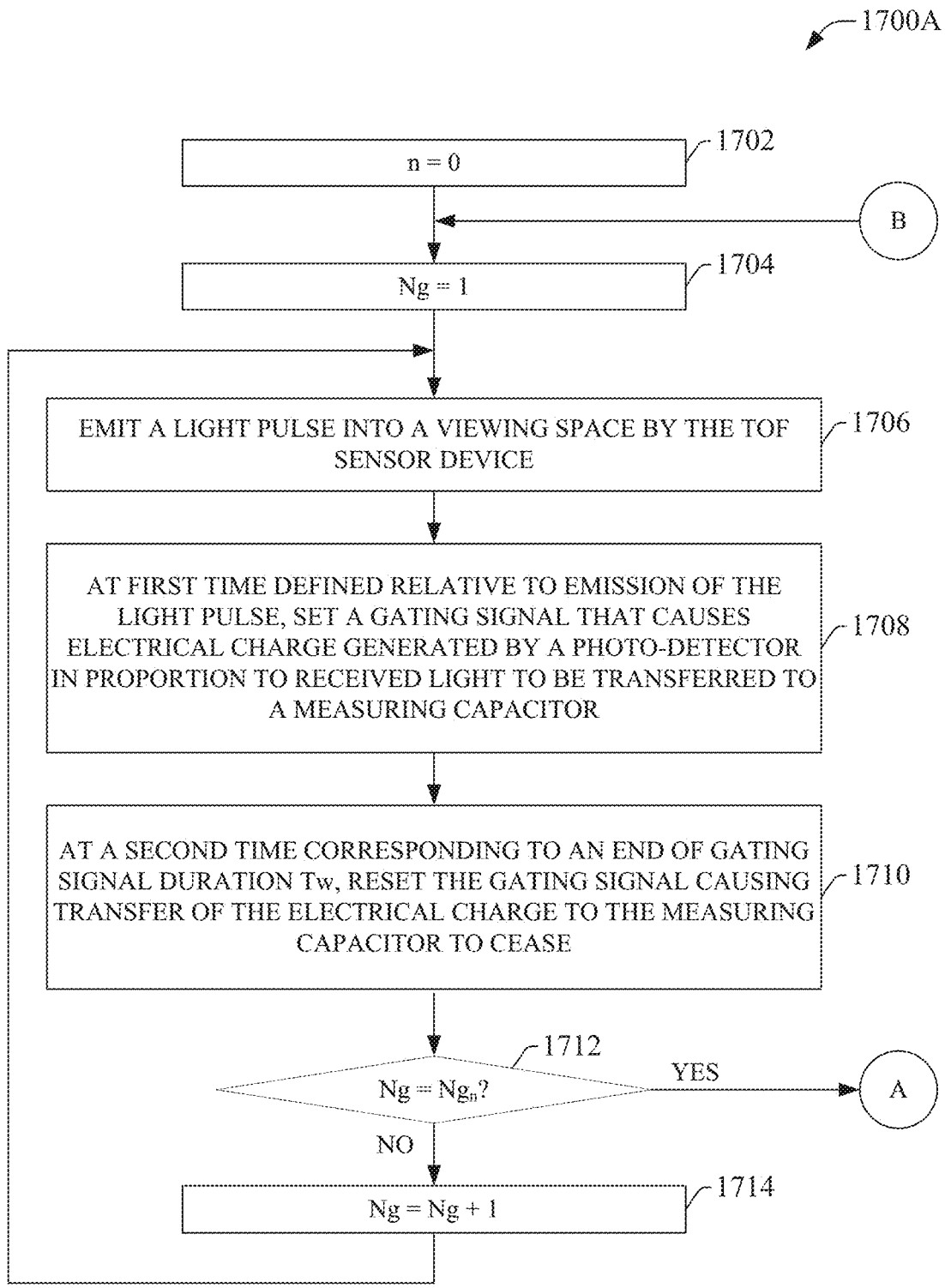
FIG. 17A is a flowchart of a first part of another example methodology for executing a measuring sequence that determines a distance of an object or surface corresponding to a pixel of a TOF sensor image for TOF sensor devices comprising one measuring capacitor per pixel.
Figure 17B:
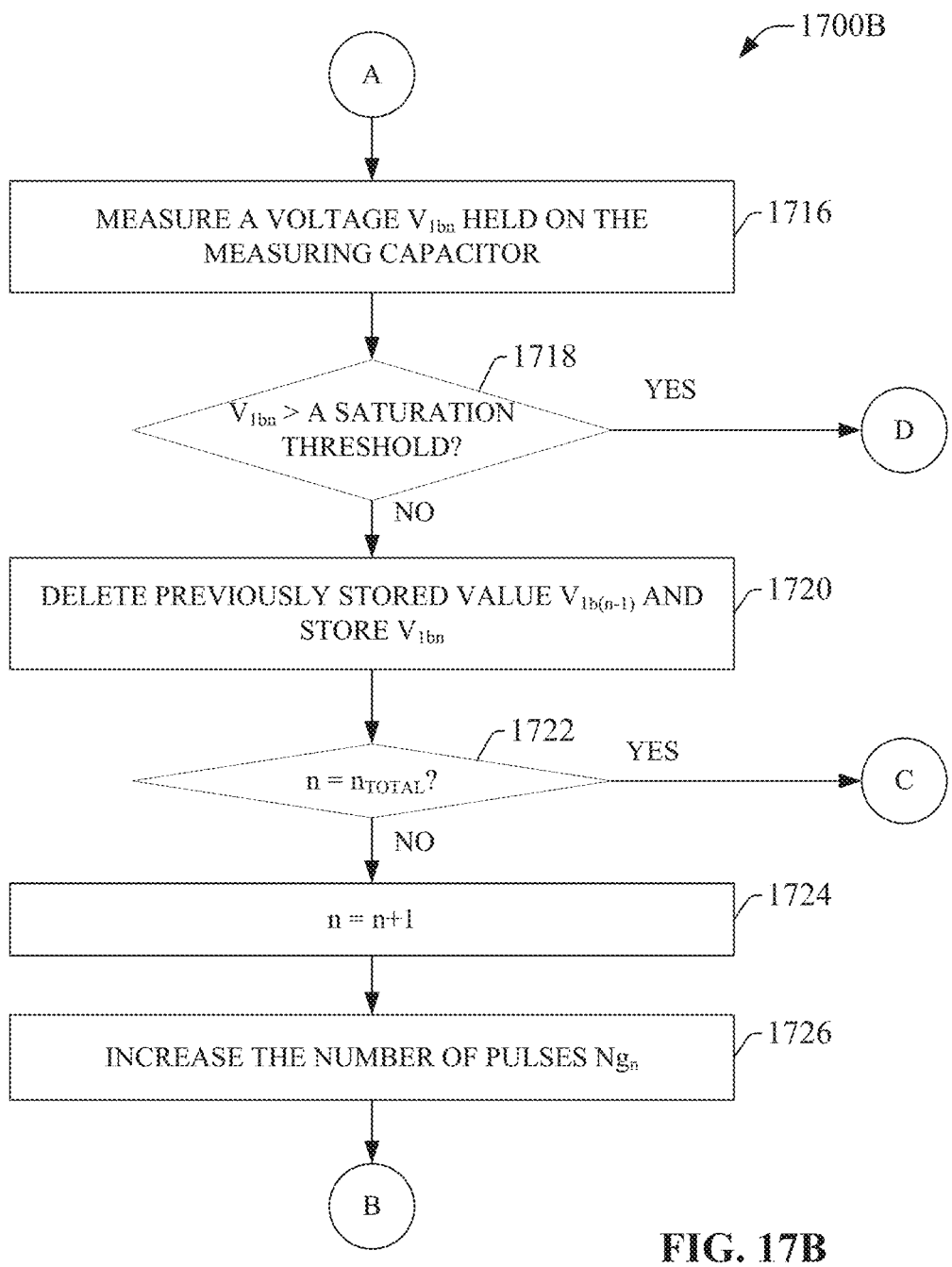
FIG. 17B is a flowchart of a second part of the other example methodology for executing a measuring sequence that determines a distance of an object or surface corresponding to a pixel of a TOF sensor image for TOF sensor devices comprising one measuring capacitor per pixel.
Figure 17C:
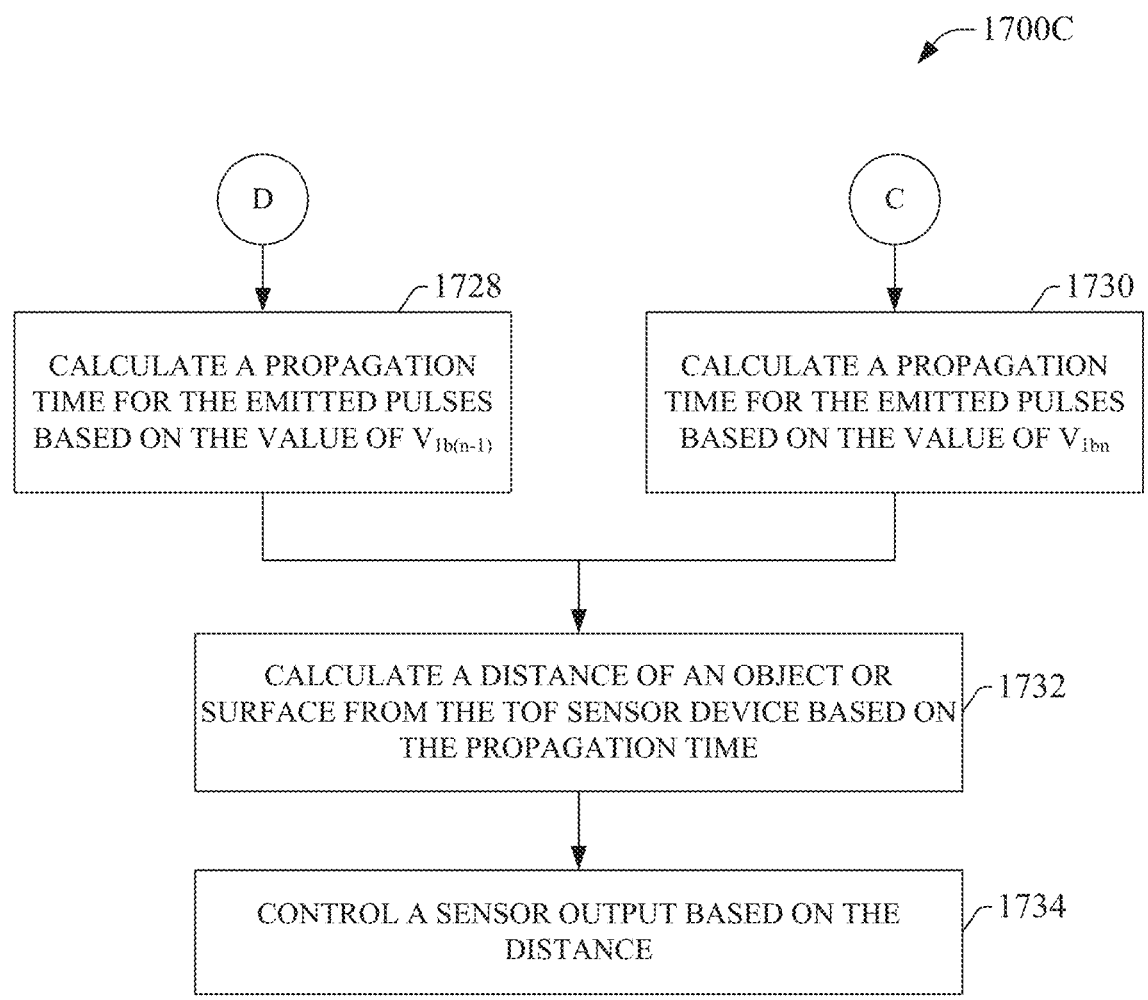
FIG. 17C is a flowchart of a third part of the other example methodology for executing a measuring sequence that determines a distance of an object or surface corresponding to a pixel of a TOF sensor image for TOF sensor devices comprising one measuring capacitor per pixel.

FIG. 17A is a first part of an example methodology 1700A for executing a measuring sequence that determines a distance of an object or surface corresponding to a pixel of a TOF sensor image. Similar to the methodology illustrated in FIGS. 16A-16C, the methodology depicted in FIGS. 17A-17C is suitable for execution on a TOF sensor device having an array of single-capacitor photo-detectors (or photo-detectors having other types of charge integration components) as illustrated in FIG. 4. However, whereas the methodology of FIGS. 16A-16C stored all n values of the pulse characteristic information before selecting one of the n values to be used to compute the distance, the methodology of FIGS. 17A-17C overwrites previously obtained pulse characteristic values with new values upon completion of each measuring cycle until the pixel's measuring capacitor become saturated, at which time the most recently obtained non-saturated value is used to compute the distance.

Steps 1702-1714 are substantially similar to corresponding steps 1602-1614 described above in connection with FIG. 16A. Initially, at 1702, the integer n, which tracks the number of measuring cycles performed for the present measuring sequence, is set to 1. At 1704, the integer Ng, which tracks the number of light pulses emitted for the present measuring cycle, is also set to 1. At 1706, at a first time defined relative to emission of the light pulse at step 1706, a gating signal is set that causes electrical charge generated by a photo-detector in proportion to received light to be transferred to a measuring capacitor. At 1710, at a second time corresponding to an end of a gating signal duration Tw, the gating signal is reset, which ceases transfer of the electrical charge to the measuring capacitor.

At 1712, a determination is made as to whether Ng is equal to $Ng_n$ (the integration number for the present measuring cycle), which indicates that all $Ng_n$ light pulses for the present measuring cycle have been emitted. If Ng is not equal to $Ng_n$ (NO at step 1712), Ng is incremented at step 1714 and steps 1706-1714 are repeated until all $Ng_n$ pulses have been emitted. When all $Ng_n$ pulses have been emitted (YES at step 1712), the methodology proceeds to the second part 1700B illustrated in FIG. 17B.

At 1716, a voltage $V_{1bn}$ held on the measuring capacitor is measured (in the present example, it is again assumed that the trailing edge portion of the emitted pulses is being captured). At 1718, a determination is made as to whether the measured voltage $V_{1bn}$ is greater than a defined saturation threshold. The saturation threshold is based on a saturation voltage of the measuring capacitor, or the maximum storage capacity of the measuring capacitor. For example, the saturation threshold may be defined to be a setpoint that is 10% below the maximum voltage capable of being stored by the measuring capacitor, beyond which data will be lost. Other saturation threshold definitions are also within the scope of one or more embodiments.

If the measured value of $V_{1bn}$, does not exceed the saturation threshold (NO at step 1718), the methodology proceeds to step 1720, where the previously stored voltage value $V_{1b(n-1)}$ (if any) is deleted from memory and the new values of $V_{1bn}$ is stored.

At 1722, a determination is made as to whether n is equal to $n_{TOTAL}$, indicating that the maximum number of measuring cycles for the measuring sequence have been executed. If the maximum number of measuring cycles have not been executed (NO at step 1722), the integer n is incremented at step 1724 for the next measuring cycle. At 1724, the number of pulses $Ng_n$ to be emitted for the next measuring cycle is increased as described in previous examples (e.g., according to an arithmetic or exponential increasing function). The methodology then returns to step 1704, where $Ng_n$ iterations of steps 1704-1712 are executed, yielding another measured value of $V_{1bn}$ at step 1716. This new value of $V_{1bn}$, which is based on an accumulation of the sum of all $Ng_n$ pulses emitted during all measuring cycles heretofore performed during the present measuring sequence (see equation (3)), is then compared with the saturation threshold at step 1718, and if the new value of $V_{1bn}$ does not exceed the saturation threshold at step 1718, the previously stored value $V_{1b(n-1)}$ is again deleted and the new value $V_{1bn}$ is stored.

Steps 1704-1726 are repeated, with each new value of $V_{1bn}$ replacing the previous value $V_{1b(n-1)}$ in memory until either the new value of $V_{1bn}$ exceeds the saturation threshold at step 1718 (YES at step 1718) or the maximum number of measuring cycles $n_{TOTAL}$ for the measuring sequence have been executed (YES at step 1722). If either of these conditions become true, the methodology proceeds to the third part 1700C illustrated in FIG. 17C.

If the new value of $V_{1bn}$ is greater than the saturation threshold (YES at step 1718), the methodology proceeds to step 1728, where a propagation time for the emitted pulses is calculated based on the value of $V_{1b(n-1)}$, the most recently stored non-saturated value measured from the measuring capacitor (the current value of $V_{1bn}$ measured from the measuring capacitor is discarded). Alternatively, if the new value of $V_{1bn}$ is not greater than the saturation threshold (NO at step 1718) but n is equal to $n_{TOTAL}$ (YES at step 1722), indicating that the maximum number of measuring cycles for the measuring sequence have been executed, the methodology proceeds to step 1730, where the propagation time is calculated based on the value of $V_{1bn}$. In either case (step 1728 or 1730), the propagation time can be calculated in a manner similar to that described above in connection with step 1628 in FIG. 16C (e.g., using equation (2)). At 1732, the distance of an object or surface from the TOF sensor device is calculated based on the propagation time determined at either step 1728 or 1730 (e.g., using equation (1) or a variation thereof). At 1734, a sensor output is controlled based on the distance determined at step 1732, as in step 1632 of FIG. 16C.

Figure 18A:
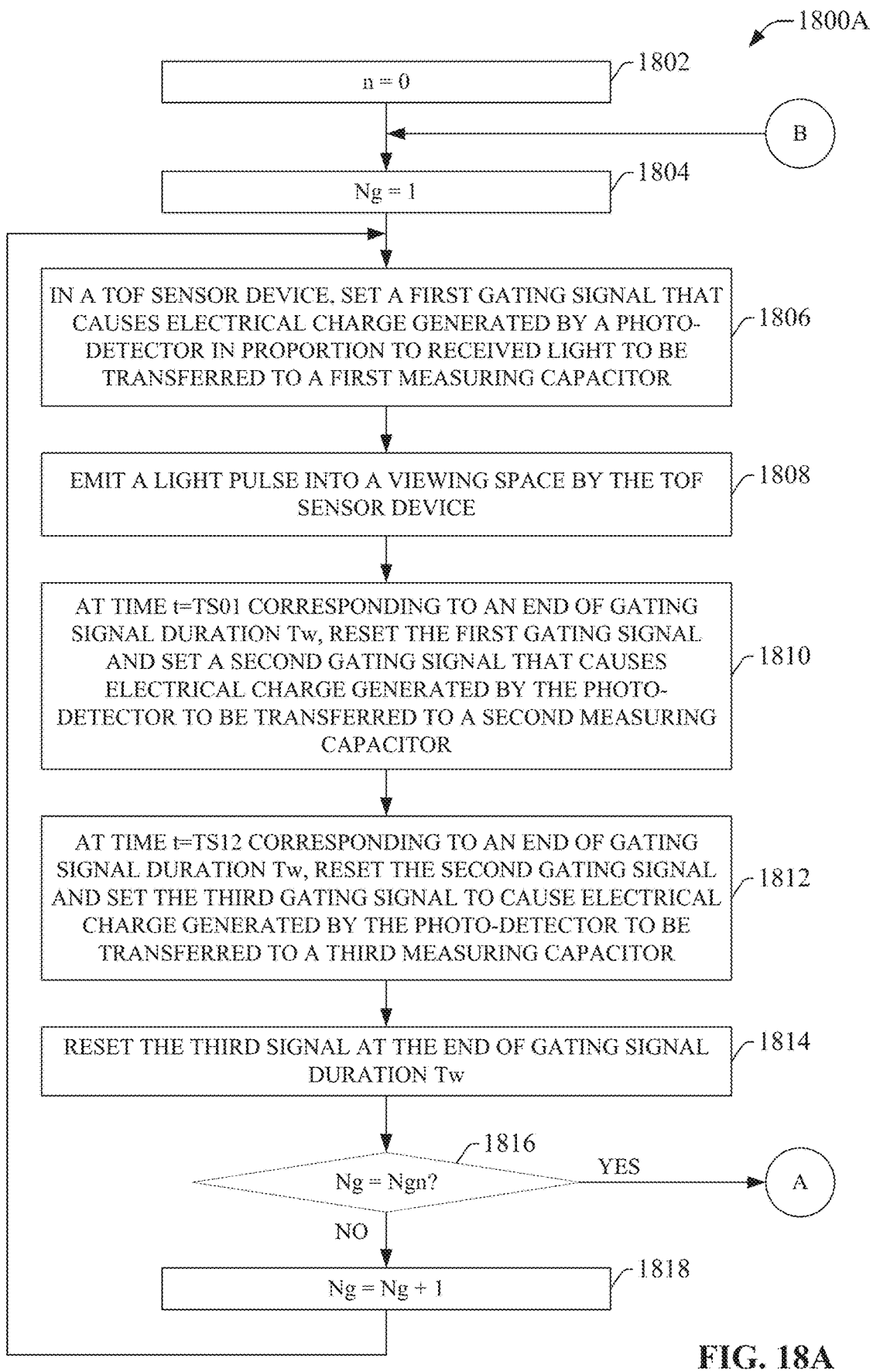
FIG. 18A is a flowchart of a first part of an example methodology for executing a measuring sequence that determines a distance of an object or surface corresponding to a pixel of a TOF sensor image for TOF sensor devices comprising three measuring capacitors per pixel.
Figure 18B:
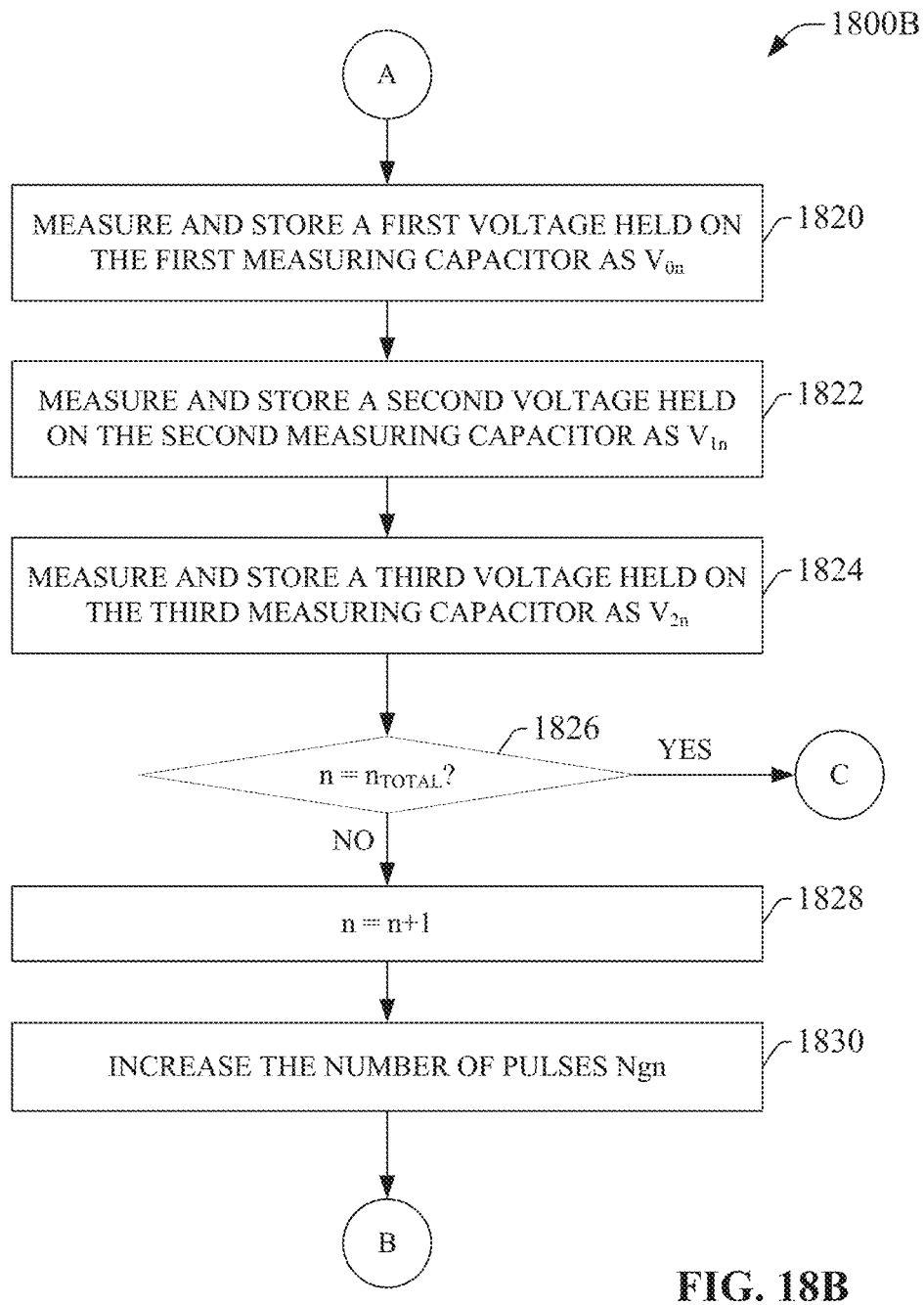
FIG. 18B is a flowchart of a second part of the example methodology for executing a measuring sequence that determines a distance of an object or surface corresponding to a pixel of a TOF sensor image for TOF sensor devices comprising three measuring capacitors per pixel.
Figure 18C:
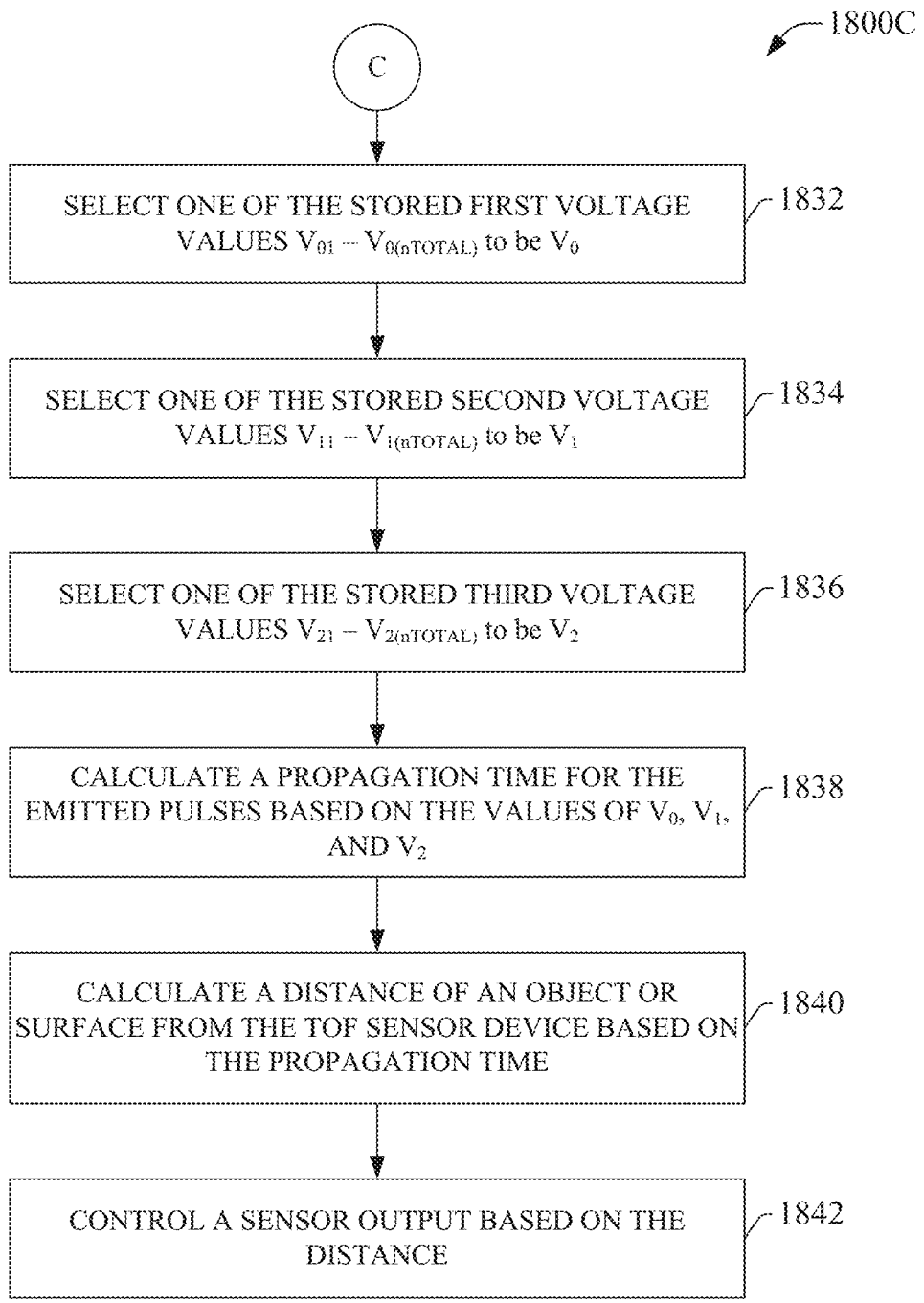
FIG. 18C is a flowchart of a third part of the example methodology for executing a measuring sequence that determines a distance of an object or surface corresponding to a pixel of a TOF sensor image for TOF sensor devices comprising three measuring capacitors per pixel.

FIG. 18A illustrates a first part of an example methodology 1800A for executing a measuring sequence that determines a distance of an object or surface corresponding to a pixel of a TOF sensor image. The methodology illustrated in FIGS. 18A-18C may be suitable for execution on a TOF sensor device having an array of photo-detectors that each comprise three measuring capacitors (or three other types of charge integration components) as illustrated in FIG. 8. However, the general methodology of FIGS. 18A-18C can be modified to accommodate TOF sensor devices having photo-detectors that employ more or less than three measuring capacitors.

Initially, at 1802 and 1804, the measuring cycle tracking integer n and pulse tracking number Ng are both set to 1, as in the methodologies described above. At 1806, a first gating signal is set that causes electrical charge generated by a photo-detector in proportion to received light to be transferred to a first measuring capacitor. At 1808, a light pulse is emitted into a viewing space by the TOF sensor device. At 1810, at a time t=Ts01 corresponding to an end of a gating signal duration Tw measured from the time that the first gating signal was set at step 1806, the first gating signal is reset, causing charges to cease transferring to the first measuring capacitor. At the same time or approximately the same time, the second gating signal is set, causing electrical charge generated by the photo-detector to begin transferring to the second measuring capacitor. At 1812, at a time t=Ts12 corresponding to the end of the gating signal duration Tw measured from the time that the second gating signal was set at step 1810, the second gating signal is reset, causing charges to cease transferring to the second measuring capacitor. At the same time or approximately the same time, the third gating signal is set, causing electrical charge generated by the photo-detector to begin transferring to the third measuring capacitor. At 1814, the third gating signal is reset at the end of the gating duration Tw measured from the time that the third gating signal was set at step 1812.

At 1816, a determination is made as to whether Ng is equal to $Ng_n$ (the integration number for the present measuring cycle). If Ng is not equal to $Ng_n$ (NO at step 1816), Ng is incremented at step 1818, the methodology returns to step 1806, and steps 1806-1816 repeat for another emitted pulse. When all $Ng_n$ pulses have been emitted and captured for the present measuring cycle (YES at step 1816), the methodology proceeds to the second part 1800B illustrated in FIG. 18B.

At 1820, a first voltage held on the first measuring capacitor is measured and stored as $V_{0n}$. At 1822, a second voltage held on the second measuring capacitor is measured and stored as $V_{1n}$. At 1824, a third voltage held on the third measuring capacitor is measured and stored as $V_{2n}$. Voltages $V_{0n}$, $V_{1n}$, and $V_{2n}$ are proportional to a leading edge portion of a reflected pulse received at the photo-detector, a trailing edge portion of the reflected pulse, and ambient light, and the particular pulse characteristic information (leading edge, trailing edge, or ambient light) represented by each of the three voltages depends on the timings of the gating signals and the emission of the light pulse in steps 1806-1814. Moreover, the magnitudes of $V_{0n}$, $V_{1n}$, and $V_{2n}$ upon completion of a given measuring cycle is based on an accumulation of the sum of all Ngn pulses received over all measuring cycles executed thus far during the present measuring sequence, since the voltages stored on the measuring capacitors are not cleared at the end of each measuring cycle.

At 1826, a determination is made as to whether integer n is equal to $n_{TOTAL}$ (the number of measuring cycles to be performed for the measuring sequence). If n is not equal to $n_{TOTAL}$ (NO at step 1826), n is incremented at step 1828 for the next measuring cycle. Also, at 1830, the number of pulses $Ng_n$ to be emitted and integrated for the next measuring cycle (that is, the integration number) is increased for the next measuring cycle. As in the methodologies described above, $Ng_n$ can be increased between measuring cycles according to an arithmetic or exponential increasing function. The methodology then returns to step 1804, where Ng is set to 1, and steps 1806-1818 are repeated for $Ng_n$ pulses. Since $Ng_n$ has been increased relative to the previous measuring cycle, steps 1806-1818 will be performed a greater number of times relative to the previous measuring cycle. When Ng is equal to the increased value of $Ng_n$, values of $V_{0n}$, $V_{1n}$, and $V_{2n}$ are again measured from the three measuring capacitors and stored at steps 1820, 1822, and 1824, respectively.

Steps 1804-1824 are repeated for $n_{TOTAL}$ measuring cycles, resulting in three sets of n measured and stored values—$V_{01}$-$V_{0(nTOTAL)}$, $V_{11}$-$V_{1(nTOTAL)}$, and $V_{21}$-$V_{2(nTOTAL)}$. When n is equal to $n_{TOTAL}$ (YES at step 1826), indicating that all $n_{TOTAL}$ measuring cycles have been executed, the methodology proceeds to the third part 1800C illustrated in FIG. 18C.

At 1832, one of the stored first voltage values $V_{01}$-$V_{0(nTOTAL)}$ is selected to be $V_0$. The selection criteria can be similar to that described above in connection with step 1626 of FIG. 16C. For example, the highest one of the values $V_{01}$-$V_{0(nTOTAL)}$ that does not exceed a saturation setpoint can be selected to be $V_0$. In another example, the lowest one of the values $V_{01}$-$V_{0(nTOTAL)}$ that exceeds a minimum signal level threshold can be selected to be $V_0$. Similarly, at 1834, one of the stored second voltage values $V_{11}$-$V_{1(nTOTAL)}$ is selected to be $V_1$ using the same selection criterion used at step 1832. At 1836, one of the stored third voltage values $V_{21}$-$V_{2(nTOTAL)}$ is selected to be $V_2$ using the same selection criterion used at steps 1832 and 1834. As an alternative to selecting values $V_0$, $V_1$, and $V_2$ individually from the three sets of values in steps 1832-1836 using the same selection criterion for each set, some embodiments may select a value from one of the three sets corresponding to an $n^{th}$ measuring cycle, and select values from the other two sets corresponding to the same $n^{th}$ measuring cycle.

At 1838, a propagation time of the emitted pulses is calculated based on the values of $V_0$, $V_1$, and $V_2$ selected at steps 1832-1836, respectively. In one or more embodiments, the propagation time can be determined based on equation (19) or equation (20), or another propagation time formula. At 1840, the distance of an object or surface from the TOF sensor device is calculated based on the propagation time determined at step 1838 (e.g., using equation (1) or a variation thereof). At 1842, a sensor output is controlled based on the distance determined at step 1840 (similar to step 1632 of FIG. 16C).

Figure 19A:
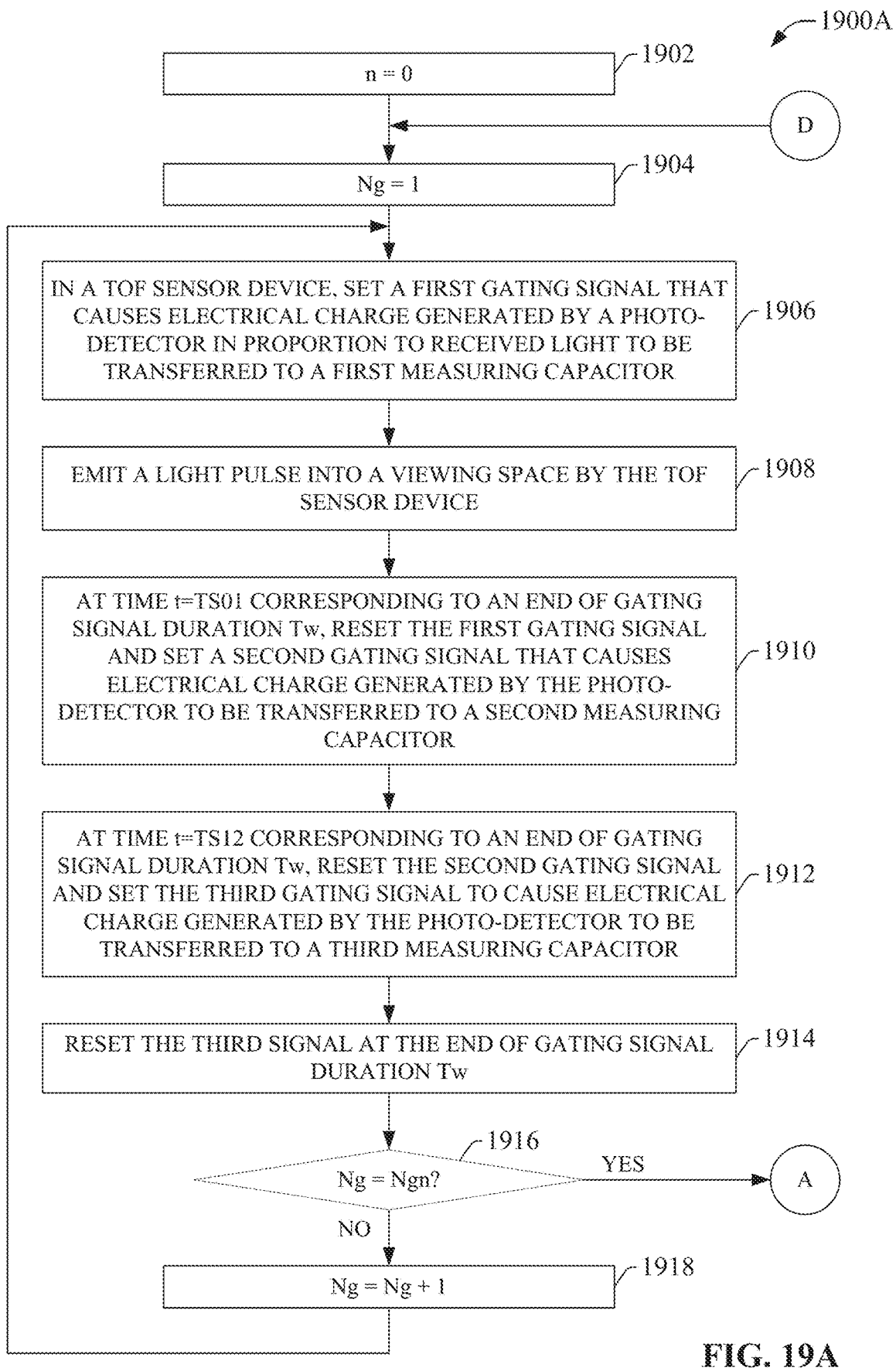
FIG. 19A is a flowchart of a first part of another example methodology for executing a measuring sequence that determines a distance of an object or surface corresponding to a pixel of a TOF sensor image for TOF sensor devices comprising three measuring capacitors per pixel.
Figure 19B:
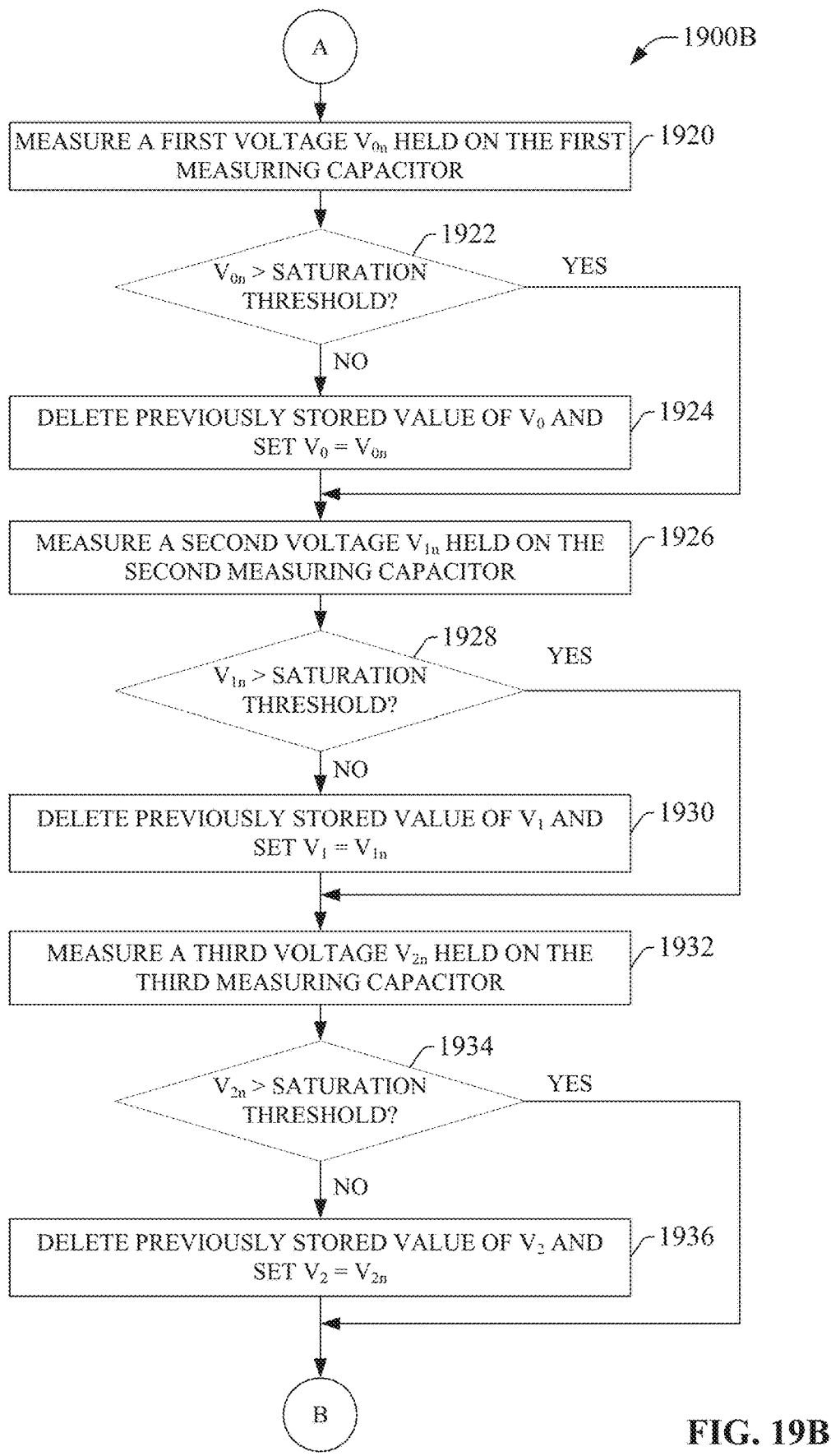
FIG. 19B is a flowchart of a second part of the other example methodology for executing a measuring sequence that determines a distance of an object or surface corresponding to a pixel of a TOF sensor image for TOF sensor devices comprising three measuring capacitors per pixel.
Figure 19C:
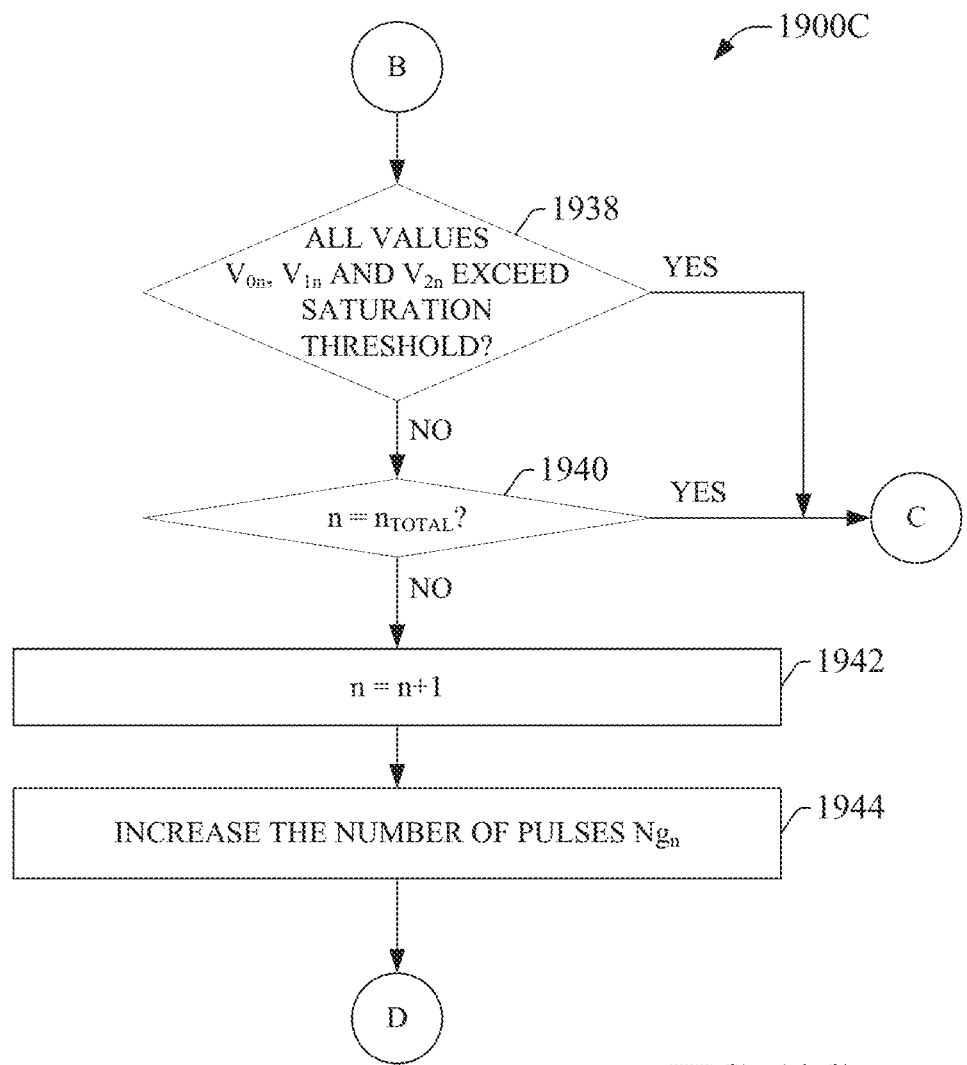
FIG. 19C is a flowchart of a third part of the other example methodology for executing a measuring sequence that determines a distance of an object or surface corresponding to a pixel of a TOF sensor image for TOF sensor devices comprising three measuring capacitors per pixel.
Figure 19D:
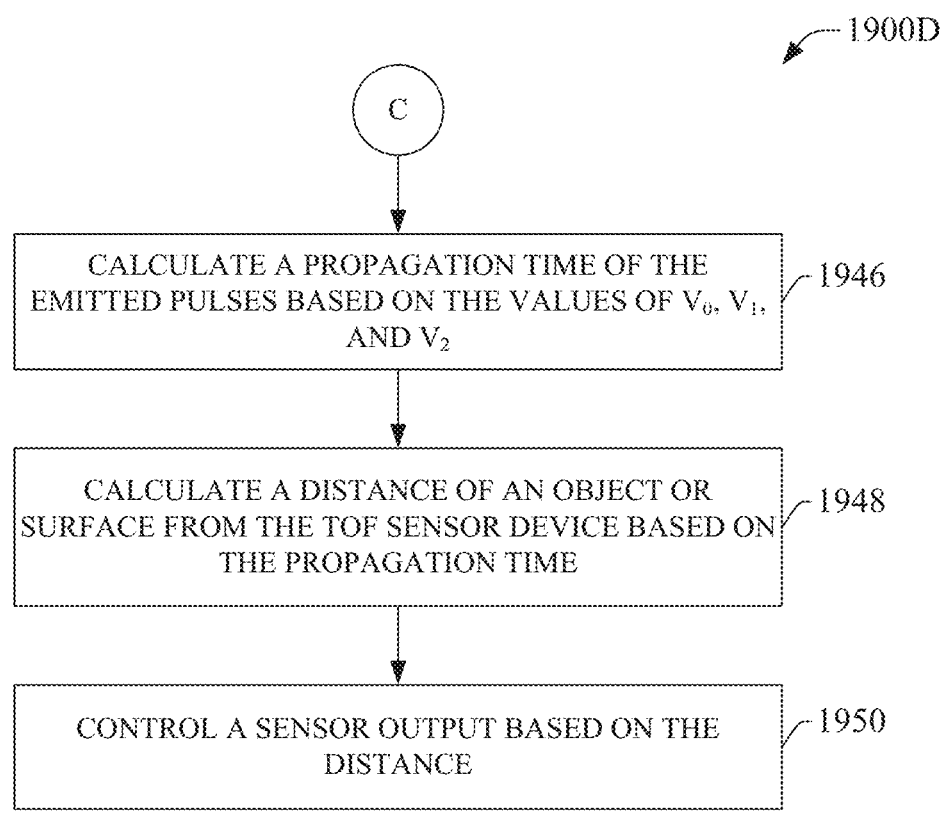
FIG. 19D is a flowchart of a fourth part of the other example methodology for executing a measuring sequence that determines a distance of an object or surface corresponding to a pixel of a TOF sensor image for TOF sensor devices comprising three measuring capacitors per pixel.

FIG. 19A is a first part of an example methodology 1900A for executing a measuring sequence that determines a distance of an object or surface corresponding to a pixel of a TOF sensor image. As with the methodology described above in connection with FIGS. 18A-18C, the methodology illustrated in FIGS. 19A-19D may be suitable for execution on a TOF sensor device employs three measuring capacitors per photo-detector (pixel), such as the photo-detector architecture illustrated in FIG. 8. The general methodology of FIGS. 19A-19D can also be modified to accommodate TOF sensor devices having photo-detectors that employ more or less than three measuring capacitors per pixel. In contrast to the methodology of FIGS. 18A-18C, which stored all n values of $V_0$, $V_1$, and $V_2$ before selecting one of the n values from each set to be used for the distance calculation, the methodology of FIGS. 19A-19D overwrites previously obtained pulse characteristic values with new values upon completion of each measuring cycle until the pixel's measuring capacitor become saturated, at which time the most recently obtained non-saturated value is used to compute the distance.

Steps 1902-1918 are similar to corresponding steps 1802-1818 described above in connection with FIG. 18A. Initially, at 1902 and 1904, the measuring cycle tracking integer n and pulse tracking number Ng are both set to 1, as in the methodologies described above. At 1906, a first gating signal is set that causes electrical charge generated by a photo-detector in proportion to received light to be transferred to a first measuring capacitor. At 1908, a light pulse is emitted into a viewing space by the TOF sensor device. At 1910, at a time t=Ts01 corresponding to an end of a gating signal duration Tw measured from the time that the first gating signal was set at step 1906, the first gating signal is reset, causing charges to cease transferring to the first measuring capacitor. At the same time or approximately the same time, the second gating signal is set, causing electrical charge generated by the photo-detector to begin transferring to the second measuring capacitor. At 1912, at a time t=Ts12 corresponding to the end of the gating signal duration Tw measured from the time that the second gating signal was set at step 1910, the second gating signal is reset, causing charges to cease transferring to the second measuring capacitor. At the same time or approximately the same time, the third gating signal is set, causing electrical charge generated by the photo-detector to begin transferring to the third measuring capacitor. At 1914, the third gating signal is reset at the end of the gating duration Tw measured from the time that the third gating signal was set at step 1912.

At 1916, a determination is made as to whether Ng is equal to Ng$_n$ (where Ng$_n$ is the integration number for the present measuring cycle). If Ng is not equal to Ng$_n$ (NO at step 1916), Ng is incremented at step 1918, the methodology returns to step 1906, and steps 1906-1916 repeat for another emitted pulse. When all Ng$_n$ pulses have been emitted and captured for the present measuring cycle (YES at step 1916), the methodology proceeds to the second part 1900B illustrated in FIG. 19B.

At 1920, a first voltage V$_{0n}$ held on the first measuring capacitor is measured. At 1922, a determination is made as to whether the value of V$_{0n}$ measured at 1920 is greater than a defined saturation threshold. Similar to the saturation threshold described above in connection with step 1718 of FIG. 17B, the saturation threshold is based on a saturation voltage of the measuring capacitors, or the maximum storage capacity of the measuring capacitors (assumed to be substantially the same for all three measuring capacitors in this example). For example, the saturation threshold may be defined to be a setpoint that is 10% below the maximum voltage capable of being stored by the measuring capacitors, beyond which data will be lost. Other saturation threshold definitions are also within the scope of one or more embodiments.

If the measured value of V$_{0n}$ does not exceed the saturation threshold (NO at step 1922), the methodology proceeds to step 1924, where V$_{0n}$ is stored as value V$_0$. If V$_0$ had already been set to be equal to the previous measured voltage V$_{0(n-1)}$ obtained from an immediately preceding measuring cycle, this previously stored value is deleted and replaced with the newest value V$_{0n}$ at step 1924. If the measured value V$_{0n}$ does exceed the saturation threshold (YES at step 1922), the current value of V$_0$ is maintained and the measured value V$_{0n}$ is discarded without being stored, and the methodology proceeds to step 1926 without executing step 1924.

The same procedure is carried out for the second measuring capacitor. At 1926, a second voltage V$_1$, held on the second measuring capacitor upon completion of the current measuring cycle is measured. At 1928, a determination is made as to whether this measured value V$_{1n}$ exceeds the saturation threshold. If V$_{1n}$ does not exceed the saturation threshold (NO at step 1928), the methodology proceeds to step 1930, where the measured value V$_{1n}$ is stored as V$_1$, replacing the previously measured value V$_{1(n-1)}$ generated by the immediately preceding measuring cycle if necessary. If the measured value V$_{1n}$ does exceed the saturation threshold (YES at step 1928), the methodology proceeds to step 1932 without executing step 1930, such that the measured value V$_{1n}$ is discarded and the present value of V$_1$ is maintained.

The same procedure is also carried out for the third measuring capacitor. At 1932, a third voltage V$_{2n}$ held on the third measuring capacitor upon completion of the current measuring cycle is measured. At 1934, a determination is made as to whether this measured value V$_{2n}$ exceeds the saturation threshold. If V$_2$ does not exceed the saturation threshold (NO at step 1934), the methodology proceeds to step 1936, where the measured value V$_{2n}$ is stored as V$_2$, replacing the previously measured value V$_{2(n-1)}$ generated by the immediately preceding measuring cycle if necessary. If the measured value V$_{2n}$ does exceed the saturation threshold (YES at step 1934), the methodology proceeds to the third part 1900C illustrated in FIG. 19C without executing step 1936, such that the measured value V$_{2n}$ is discarded and the present value of V$_2$ is maintained.

Voltages V$_0$, V$_1$, and V$_2$ are proportional to a leading edge portion of a reflected pulse received at the photo-detector, a trailing edge portion of the reflected pulse, and ambient light. The particular pulse characteristic information (leading edge, trailing edge, or ambient light) represented by each of the three voltages depends on the timings of the gating signals relative to receipt of the light pulse in steps 1906-1914.

At 1938, a determination is made as to whether all of the measured values V$_{0n}$, V$_{1n}$, and V$_{2n}$ respectively stored on the three measuring capacitors for the current measuring cycle exceed the saturation threshold. If one or more of the measured values V$_{0n}$, V$_{1n}$, and V$_{2n}$ do not exceed the saturation threshold (NO at step 1938), the methodology proceeds to step 1940, where a determination is made as to whether the measuring cycle integer n is equal to n$_{TOTAL}$, which is the maximum number of measuring cycles to be executed for the measuring sequence. If n is not equal to n$_{TOTAL}$ (NO at step 1940), the measuring cycle tracking integer n is incremented at step 1942. Also, the integration number Ng$_n$, or the number of light pulses to be emitted during the next measuring cycle, is increased at step 1944 (e.g., according to an arithmetic or exponential increasing function as described in previous examples). The methodology then returns to step 1904 where the light pulse tracking integer Ng is again set to 1, and steps 1906-1936 are iterated again for the next measuring cycle. For this next measuring cycle, the number of light pulses Ng$_n$ is increased relative to the previous measuring cycle, yielding updated values of one or more of V$_0$, V$_1$, or V$_2$ (depending on whether any of the new measured voltages exceed the saturation threshold at steps 1922, 1928, and 1934). If any of V$_0$, V$_1$, or V$_2$ are updated with measured values generated by the new measuring cycle, these updated values will be of a higher resolution than those recorded in the immediately preceding measuring cycles due to the higher number of pulse accumulations stored on the measuring capacitors.

These measuring cycle iterations continue until either all measured values V$_{0n}$, V$_{1n}$, and V$_{2n}$ exceed the saturation threshold (YES at step 1938), or until the maximum number of measuring cycles n$_{TOTAL}$ have been executed (YES at step 1940). When either of these conditions are true, the methodology proceeds to the fourth part 1900D illustrated in FIG. 19D. At 1946, a propagation time of the emitted pulses is calculated based on the values of $V_0$, $V_1$, and $V_2$ (e.g., based on equation (19) or equation (20) or variations thereof). At 1948, a distance of an object or surface from the TOF sensor device is calculated based on the propagation time determined at step 1946 (e.g., based on equation (1) or a variation thereof). At 1950, a sensor output is controlled based on the distance determined at step 4950 (similar to step 1632 of FIG. 16C).

Figure 20A:
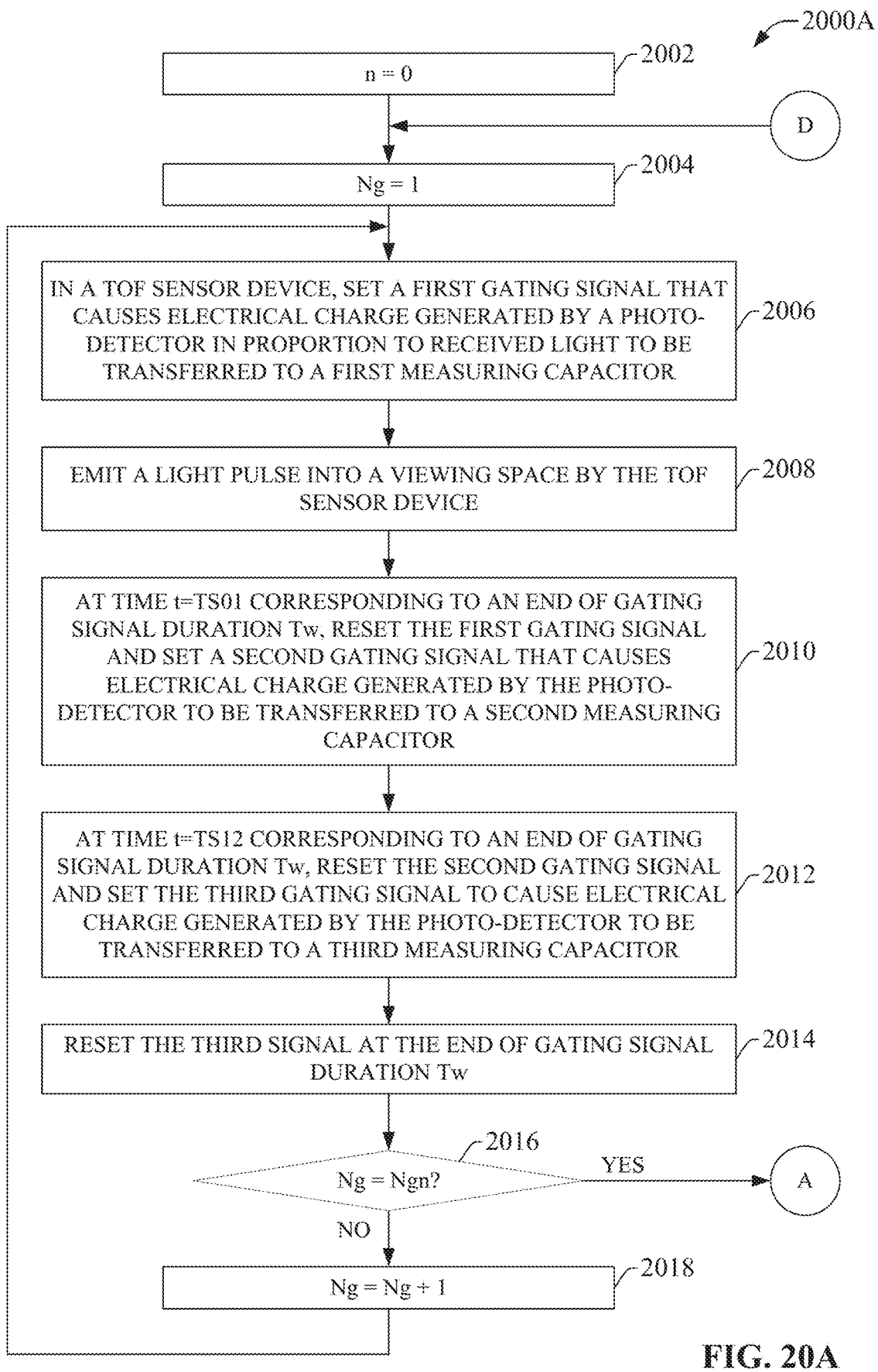
FIG. 20A is a first part of another example methodology for executing a measuring sequence that determines a distance of an object or surface corresponding to a pixel of a TOF sensor image.
Figure 20B:
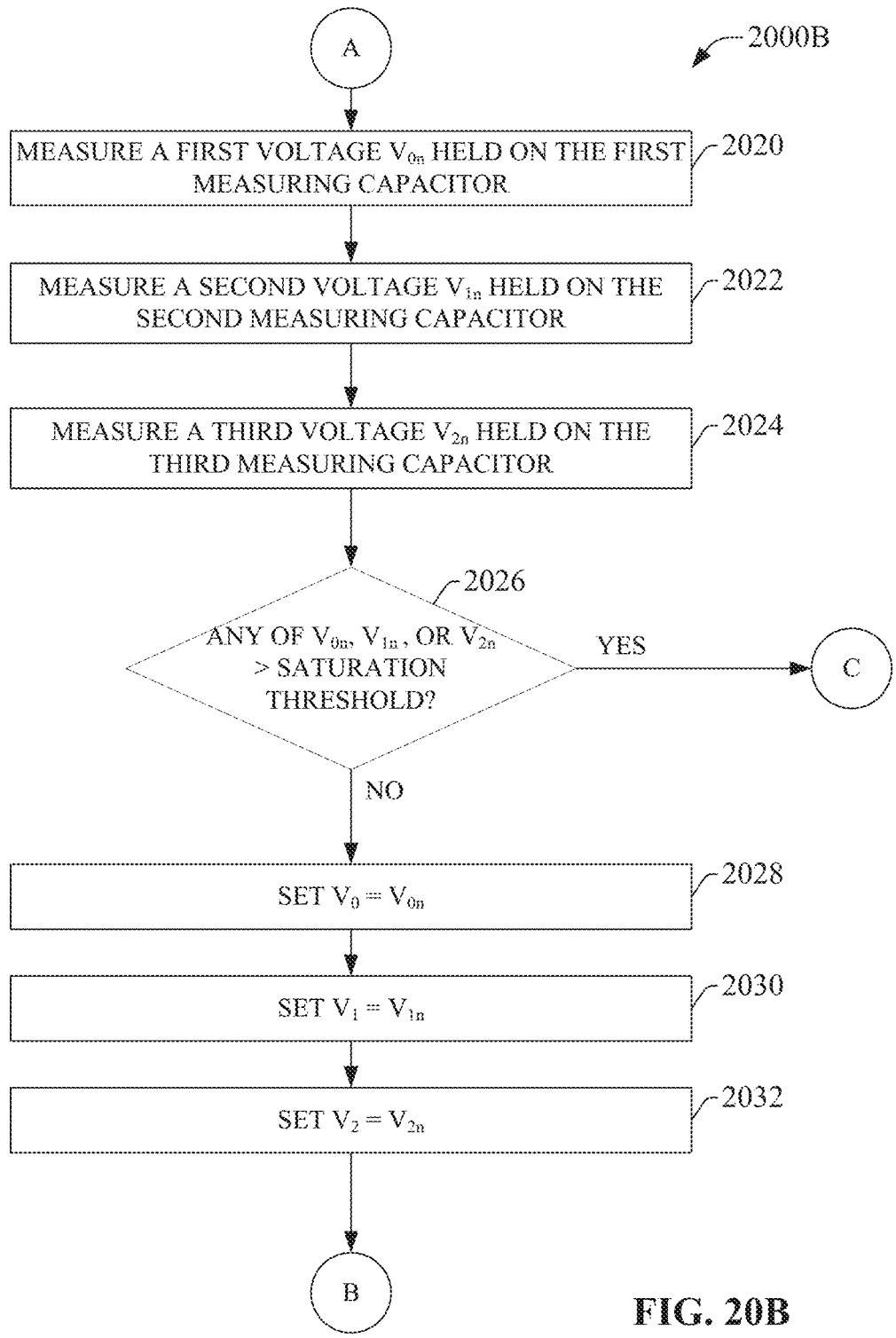
FIG. 20B is a second part of the other example methodology for executing a measuring sequence that determines a distance of an object or surface corresponding to a pixel of a TOF sensor image.
Figure 20C:
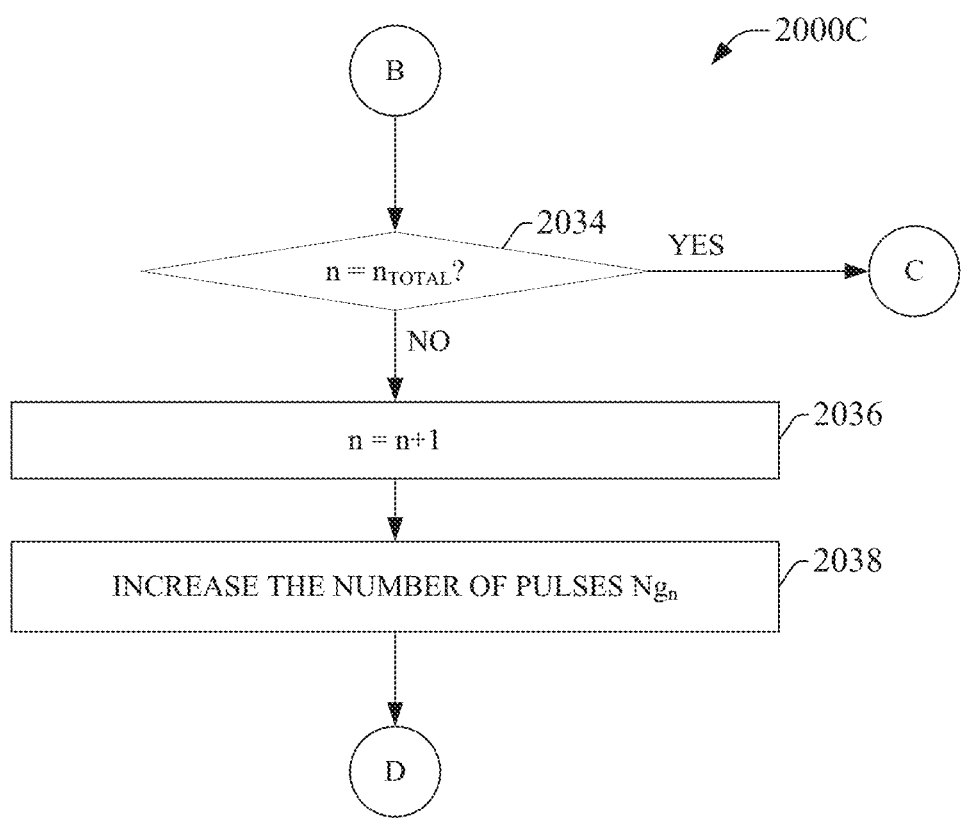
FIG. 20C is a third part of the other example methodology for executing a measuring sequence that determines a distance of an object or surface corresponding to a pixel of a TOF sensor image.
Figure 20D:
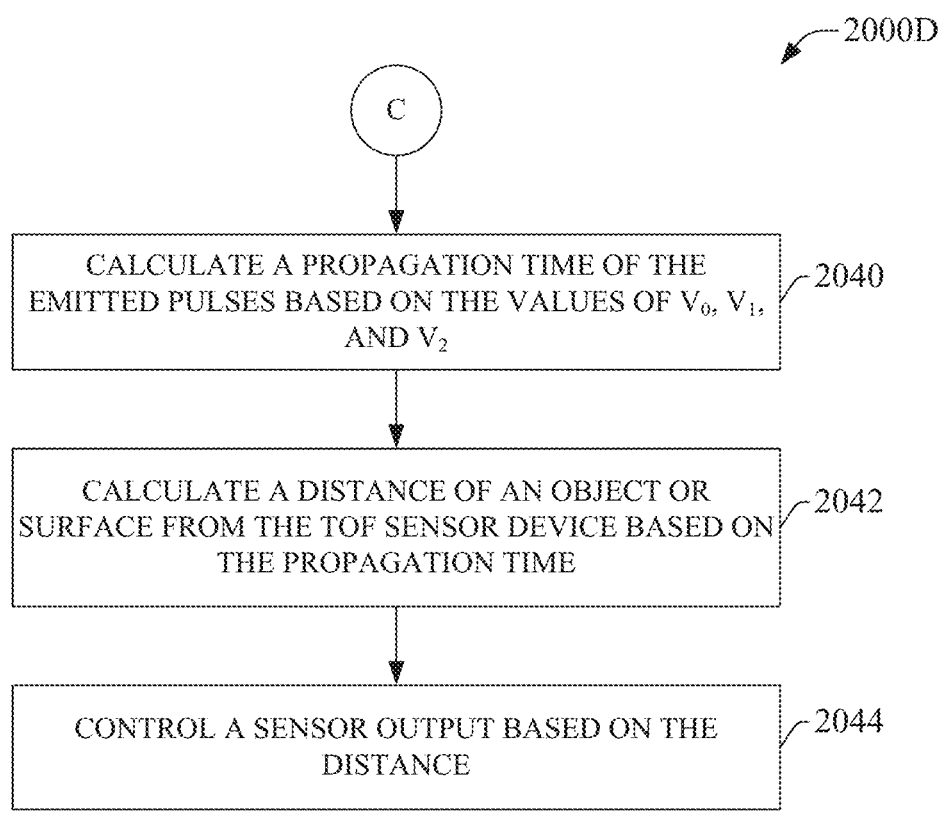
FIG. 20D is a fourth part of the other example methodology for executing a measuring sequence that determines a distance of an object or surface corresponding to a pixel of a TOF sensor image.

FIG. 20A is a first part of another example methodology 2000A for executing a measuring sequence that determines a distance of an object or surface corresponding to a pixel of a TOF sensor image. As with the methodology described above in connection with FIGS. 18A-18C, the methodology illustrated in FIGS. 20A-20D may be suitable for execution on a TOF sensor device employs three measuring capacitors per photo-detector (pixel), such as the photo-detector architecture illustrated in FIG. 8. The general methodology of FIGS. 20A-20D can also be modified to accommodate TOF sensor devices having photo-detectors that employ more or less than three measuring capacitors per pixel. In contrast to the methodology of FIGS. 18A-18C, which stored all n values of $V_0$, $V_1$, and $V_2$ before selecting one of the n values from each set to be used for the distance calculation, the methodology of FIGS. 20A-20D overwrites previously obtained pulse characteristic values with new values upon completion of each measuring cycle. Also, in contrast to the methodology of FIGS. 19A-19D, which selects values of $V_0$, $V_1$, and $V_2$ independently of one another (and therefore can conceivably select values for $V_0$, $V_1$, and $V_2$ from different measuring cycles), the methodology of FIGS. 20A-20D selects values of $V_0$, $V_1$, and $V_2$ from the same measuring cycle upon determining that one or more of the values $V_0$, $V_1$, and $V_2$ are saturated as of the subsequent measuring cycle.

Steps 2002-2018 are similar to corresponding steps 1802-1818 described above in connection with FIG. 18A. Initially, at 2002 and 2004, the measuring cycle tracking integer n and pulse tracking number Ng are both set to 1, as in the methodologies described above. At 2006, a first gating signal is set that causes electrical charge generated by a photo-detector in proportion to received light to be transferred to a first measuring capacitor. At 2008, a light pulse is emitted into a viewing space by the TOF sensor device. At 2010, at a time t=Ts01 corresponding to an end of a gating signal duration Tw measured from the time that the first gating signal was set at step 2006, the first gating signal is reset, causing charges to cease transferring to the first measuring capacitor. At the same time or approximately the same time, the second gating signal is set, causing electrical charge generated by the photo-detector to begin transferring to the second measuring capacitor. At 2012, at a time t=Ts12 corresponding to the end of the gating signal duration Tw measured from the time that the second gating signal was set at step 2010, the second gating signal is reset, causing charges to cease transferring to the second measuring capacitor. At the same time or approximately the same time, the third gating signal is set, causing electrical charge generated by the photo-detector to begin transferring to the third measuring capacitor. At 2014, the third gating signal is reset at the end of the gating duration Tw measured from the time that the third gating signal was set at step 2012.

At 2016, a determination is made as to whether Ng is equal to $Ng_n$ (where $Ng_n$ is the integration number for the present measuring cycle). If Ng is not equal to $Ng_n$ (NO at step 2016), Ng is incremented at step 2018, the methodology returns to step 2006, and steps 2006-2016 repeat for another emitted pulse. When all $Ng_n$ pulses have been emitted and captured for the present measuring cycle (YES at step 2016), the methodology proceeds to the second part 2000B illustrated in FIG. 20B.

At 2020, a first voltage $V_{0n}$ held on the first measuring capacitor is measured. At 2022, a second voltage $V_{1n}$ held on the second measuring capacitor is measured. At 2024, a third voltage $V_{2n}$ held on the third measuring capacitor is measured. At 2026, a determination is made as to whether any of the values $V_{0n}$, $V_{1n}$, or $V_{2n}$ are greater than a defined saturation threshold. Similar to the threshold described above in connection with step 1718 of FIG. 17B, the saturation threshold can be based on a saturation voltage of the measuring capacitors, or the maximum storage capacity of the measuring capacitors (assumed to be substantially the same for all three measuring capacitors in this example). For example, the saturation threshold may be defined to be a setpoint that is 10% below the maximum voltage capable of being stored by the measuring capacitors, beyond which data will be lost. Other saturation threshold definitions are also within the scope of one or more embodiments.

If none of the values $V_{0n}$, $V_{1n}$, or $V_{2n}$ are greater than the defined saturation threshold (NO at step 2026), the methodology proceeds to step 2028, where $V_{0n}$ is stored as value $V_0$. If $V_0$ had already been set to be equal to the previous measured voltage $V_{0(n-1)}$ obtained from an immediately preceding measuring cycle, this previously stored value is deleted and replaced with the newest value $V_{0n}$ at step 2028. Similarly, at steps 2030 and 2032, the values $V_{1n}$ and $V_{2n}$ are stored as values $V_1$ and $V_2$, respectively, replacing any previous values of $V_1$ and $V_2$ that may have been obtained from an immediately preceding measuring cycle. Voltages $V_0$, $V_1$, and $V_2$ are proportional to a leading edge portion of a reflected pulse received at the photo-detector, a trailing edge portion of the reflected pulse, and ambient light. The particular pulse characteristic information (leading edge, trailing edge, or ambient light) represented by each of the three voltages depends on the timings of the gating signals relative to receipt of the light pulse in steps 2006-2014.

The methodology then proceeds to the third part 2000C, where, at step 2034, where a determination is made as to whether the measuring cycle integer n is equal to $n_{TOTAL}$, which is the maximum number of measuring cycles to be executed for the measuring sequence. If n is not equal to $n_{TOTAL}$ (NO at step 2034), the measuring cycle tracking integer n is incremented at step 2036. Also, the integration number $Ng_n$, or the number of light pulses to be emitted during the next measuring cycle, is increased at step 2038 (e.g., according to an arithmetic or exponential increasing function as described in previous examples). The methodology then returns to step 2004 where the light pulse tracking integer Ng is again set to 1, and steps 2006-2026 are iterated again for the next measuring cycle (as well as steps 2028-2032 if none of the values of $V_{0n}$, $V_{1n}$, or $V_{2n}$ are greater than the defined saturation threshold at step 2026). For this next measuring cycle, the number of light pulses $Ng_n$ is increased relative to the previous measuring cycle, yielding updated values of $V_0$, $V_1$, or $V_2$. These updated values of $V_0$, $V_1$, or $V_2$ will be of a higher resolution than those recorded in the immediately preceding measuring cycles due to the higher number of pulse accumulations stored on the measuring capacitors.

These measuring cycle iterations continue until either any of the measured values $V_{0n}$, $V_{1n}$, and $V_{2n}$ exceed the saturation threshold (YES at step 2026), or until the maximum number of measuring cycles $n_{TOTAL}$ have been executed (YES at step 2034). When either of these conditions are true, the methodology proceeds to the fourth part 2000D illustrated in FIG. 20D. At 2040, a propagation time of the emitted pulses is calculated based on the values of $V_0$, $V_1$, and $V_2$ (e.g., based on equation (19) or equation (20) or variations thereof). At 2042, a distance of an object or surface from the TOF sensor device is calculated based on the propagation time determined at step 2040 (e.g., based on equation (1) or a variation thereof). At 2044, a sensor output is controlled based on the distance determined at step 2040 (similar to step 1632 of FIG. 16C).

Figure 21A:
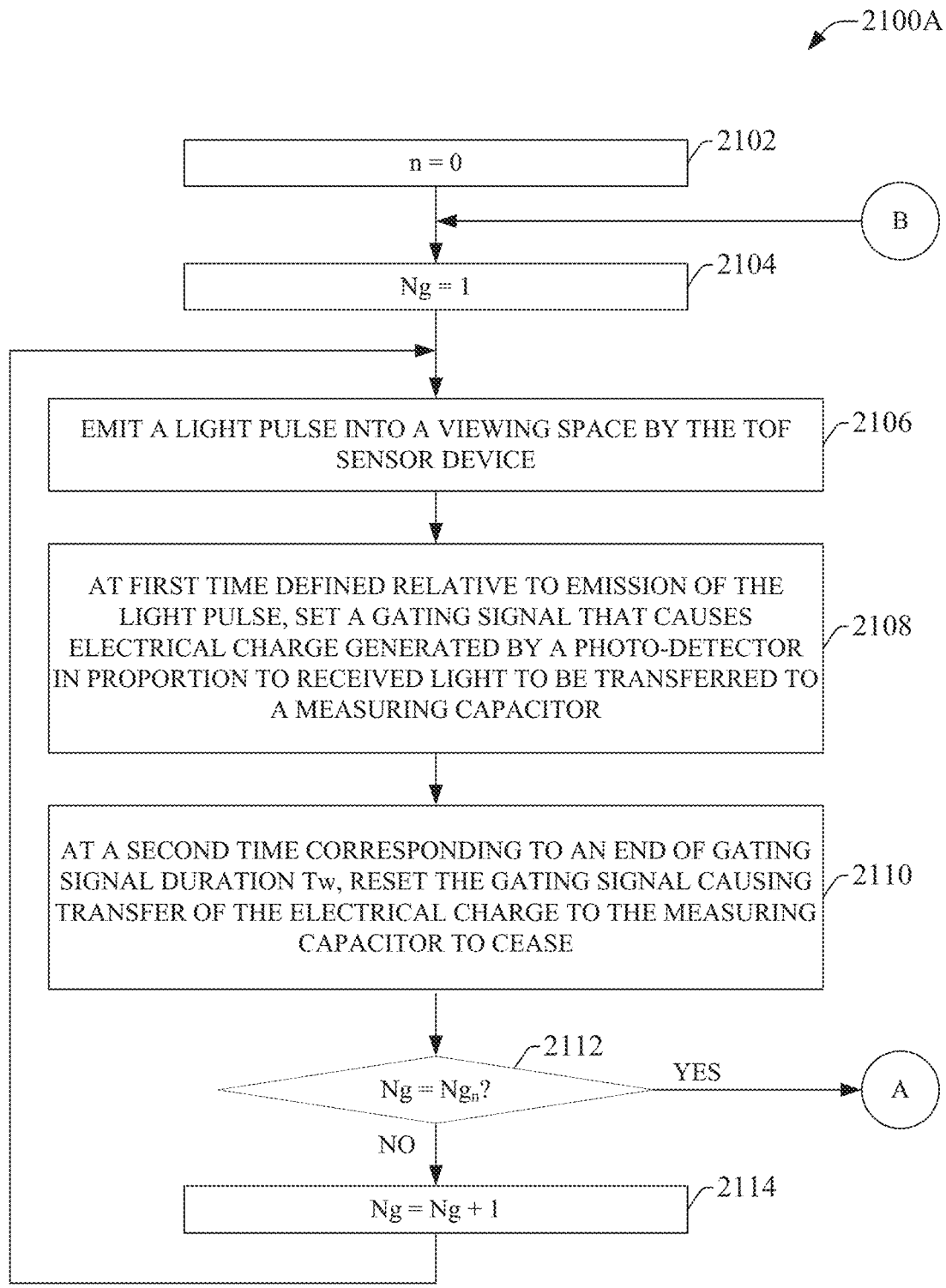
FIG. 21A is a first part of another example methodology for executing a measuring sequence that determines a distance of an object or surface corresponding to a pixel of a TOF sensor image.
Figure 21B:
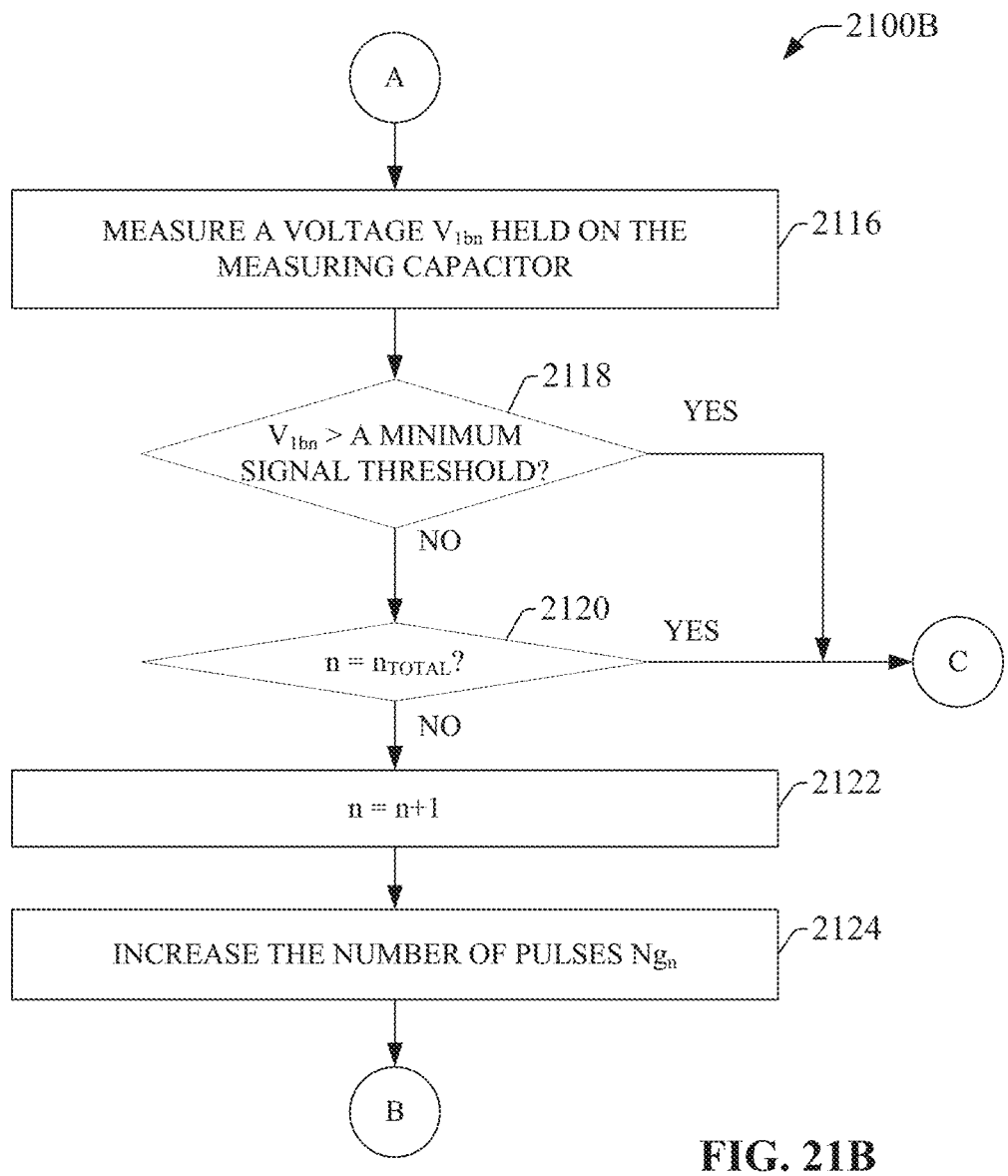
FIG. 21B is a second part of the other example methodology for executing a measuring sequence that determines a distance of an object or surface corresponding to a pixel of a TOF sensor image.
Figure 21C:
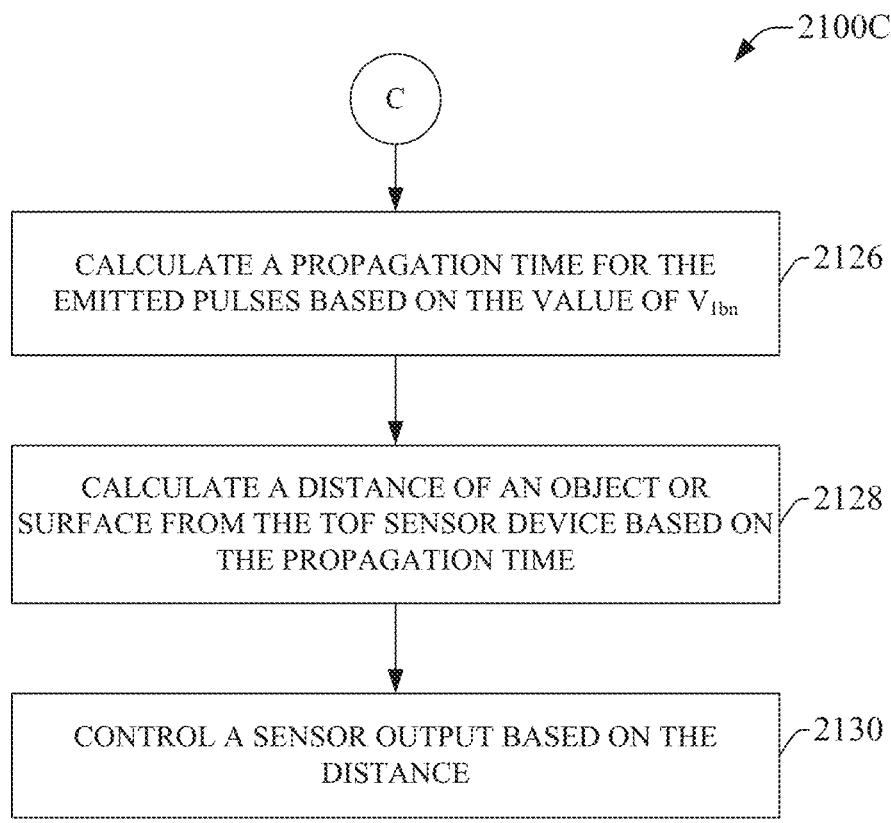
FIG. 21C is a third part of the other example methodology for executing a measuring sequence that determines a distance of an object or surface corresponding to a pixel of a TOF sensor image.

FIG. 21A is a first part of an example methodology 2100A for executing a measuring sequence that determines a distance of an object or surface corresponding to a pixel of a TOF sensor image. This methodology is broadly similar to the methodology discussed above in connection with FIGS. 17A-17C, but rather than selecting, as a suitable pulse characteristic value, a highest non-saturated value, the methodology depicted in FIGS. 21A-21C selects the a lowest value that surpasses a minimum signal level threshold. Also similar to the methodology illustrated in FIGS. 17A-17C, the methodology depicted in FIGS. 21A-21C is suitable for execution on a TOF sensor device having an array of single-capacitor photo-detectors (or photo-detectors having other types of charge integration components) as illustrated in FIG. 4

Steps 2102-2114 are similar to steps 1702-1714 of methodology 1700A described above. Initially, at 2102, the integer n, which tracks the number of measuring cycles performed for the present measuring sequence, is set to 1. At 2104, the integer Ng, which tracks the number of light pulses emitted for the present measuring cycle, is also set to 1. At 2106, at a first time defined relative to emission of the light pulse at step 2106, a gating signal is set that causes electrical charge generated by a photo-detector in proportion to received light to be transferred to a measuring capacitor. At 2110, at a second time corresponding to an end of a gating signal duration Tw, the gating signal is reset, which ceases transfer of the electrical charge to the measuring capacitor.

At 2112, a determination is made as to whether Ng is equal to $Ng_n$ (the integration number for the present measuring cycle), which indicates that all $Ng_n$ light pulses for the present measuring cycle have been emitted. If Ng is not equal to $Ng_n$ (NO at step 2112), Ng is incremented at step 2114 and steps 2106-2114 are repeated until all $Ng_n$ pulses have been emitted. When all $Ng_n$ pulses have been emitted (YES at step 2112), the methodology proceeds to the second part 2100B illustrated in FIG. 21B.

At 2116, a voltage $V_{1bn}$ held on the measuring capacitor is measured (in the present example, it is again assumed that the trailing edge portion of the emitted pulses is being captured). At 2118, a determination is made as to whether the measured voltage $V_{1bn}$ is greater than a minimum signal threshold. The minimum signal threshold can correspond to a minimum signal level that is known to be sufficiently high to produce reliable propagation time and distance calculation results.

If the measured value of $V_{1bn}$ does not exceed the minimum signal threshold (NO at step 2118), the methodology proceeds to step 2120, where a determination is made as to whether n is equal to $n_{TOTAL}$, indicating that the maximum number of measuring cycles for the measuring sequence have been executed. If the maximum number of measuring cycles have not been executed (NO at step 2120), the integer n is incremented at step 2122 for the next measuring cycle. At 2124, the number of pulses $Ng_n$ to be emitted for the next measuring cycle is increased as described in previous examples (e.g., according to an arithmetic or exponential increasing function). The methodology then returns to step 2104, where $Ng_n$ iterations of steps 2104-2112 are executed, yielding another measured value of $V_{1bn}$ at step 2116. This new value of $V_{1bn}$, which is based on an accumulation of the sum of all $Ng_n$ pulses emitted during all measuring cycles heretofore performed during the present measuring sequence (see equation (3)), is then compared with the minimum signal threshold at step 2118.

Steps 2104-1720 are repeated until either the new value of $V_{1bn}$ exceeds the minimum signal threshold at step 2118 (YES at step 2118) or the maximum number of measuring cycles $n_{TOTAL}$ for the measuring sequence have been executed (YES at step 2120). If either of these conditions become true, the methodology proceeds to the third part 2100C illustrated in FIG. 21C.

At 2126, a propagation time for the emitted pulses is calculated based on the current value of $V_{1b}$, corresponding to the first measured value of voltage $V_{1b}$ that exceeded the minimum signal threshold. The propagation time can be calculated in a manner similar to that described above in connection with step 1628 in FIG. 16C (e.g., using equation (2)). At 2128, the distance of an object or surface from the TOF sensor device is calculated based on the propagation time determined at step 2128 (e.g., using equation (1) or a variation thereof). At 2130, a sensor output is controlled based on the distance determined at step 2128, as in step 1632 of FIG. 16C.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated 1/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 22:
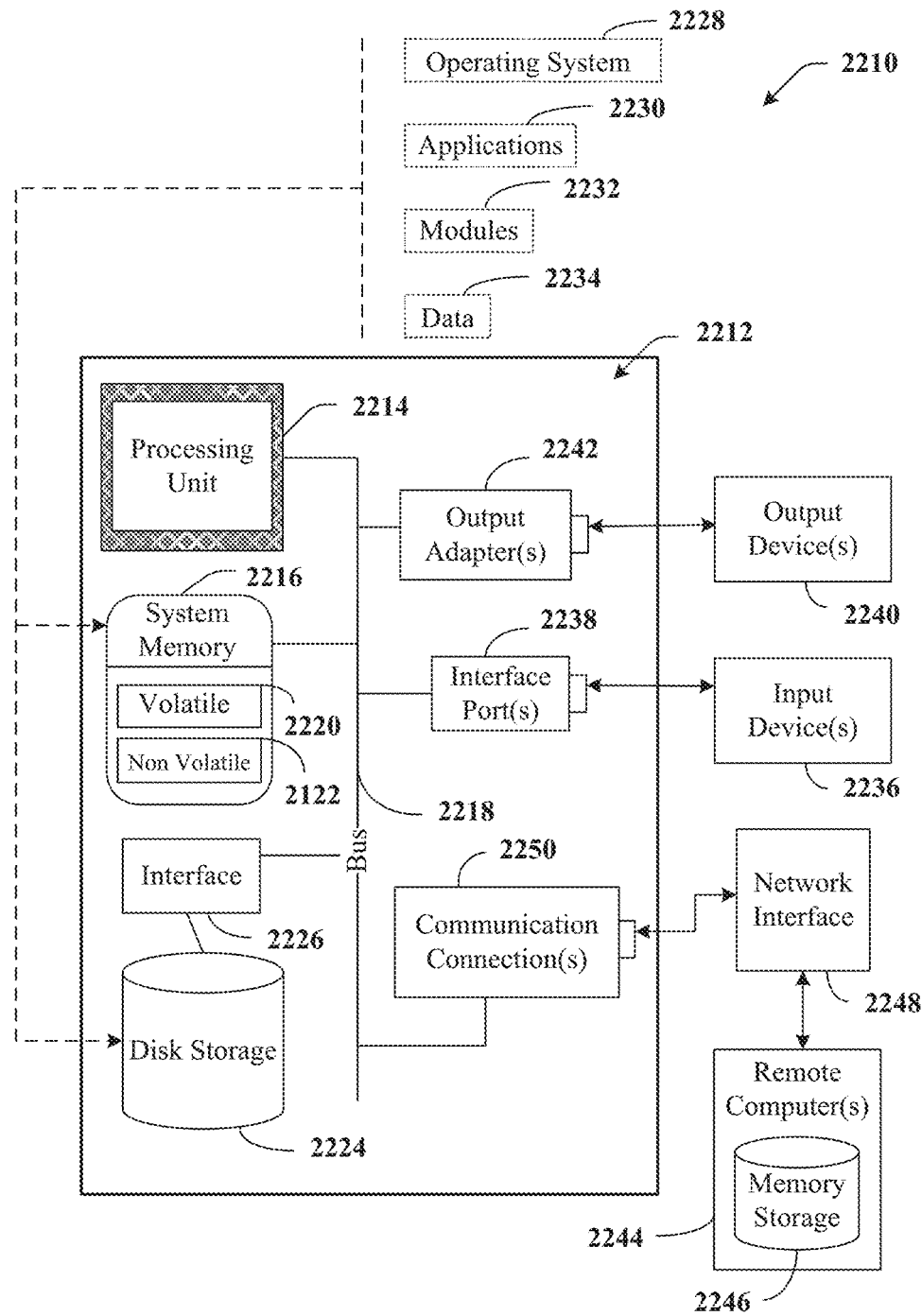
FIG. 22 is an example computing environment.
Figure 23:
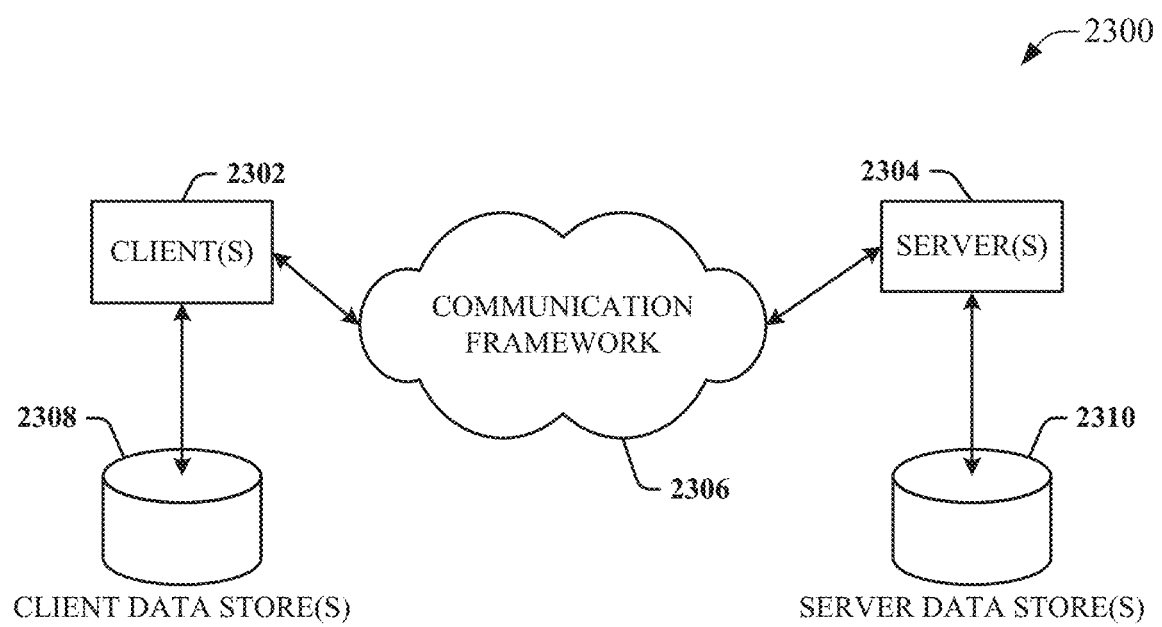
FIG. 23 is an example networking environment.

In order to provide a context for the various aspects of the disclosed subject matter, FIGS. 22 and 23 as well as the following discussion are intended to provide a brief, general description of a suitable environment in which the various aspects of the disclosed subject matter may be implemented.

With reference to FIG. 22, an example environment 2210 for implementing various aspects of the aforementioned subject matter includes a computer 2212. The computer 2212 includes a processing unit 2214, a system memory 2216, and a system bus 2218. The system bus 2218 couples system components including, but not limited to, the system memory 2216 to the processing unit 2214. The processing unit 2214 can be any of various available processors. Multi-core microprocessors and other multiprocessor architectures also can be employed as the processing unit 2214.

The system bus 2218 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2216 includes volatile memory 2220 and nonvolatile memory 2222. The basic input/output system (BIOS), containing the basic routines to transfer information between elements within the computer 2212, such as during start-up, is stored in nonvolatile memory 2222. By way of illustration, and not limitation, nonvolatile memory 2222 can include read only memory (ROM), programmable ROM (PROM), electrically programmable ROM (EPROM), electrically erasable PROM (EEPROM), or flash memory. Volatile memory 2220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2212 also includes removable/non-removable, volatile/non-volatile computer storage media. FIG. 22 illustrates, for example a disk storage 2224. Disk storage 2224 includes, but is not limited to, devices like a magnetic disk drive, floppy disk drive, tape drive, Jaz drive, Zip drive, LS-100 drive, flash memory card, or memory stick. In addition, disk storage 2224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2224 to the system bus 2218, a removable or non-removable interface is typically used such as interface 2226.

It is to be appreciated that FIG. 22 describes software that acts as an intermediary between users and the basic computer resources described in suitable operating environment 2210. Such software includes an operating system 2228. Operating system 2228, which can be stored on disk storage 2224, acts to control and allocate resources of the computer 2212. System applications 2230 take advantage of the management of resources by operating system 2228 through program modules 2232 and program data 2234 stored either in system memory 2216 or on disk storage 2224. It is to be appreciated that one or more embodiments of the subject disclosure can be implemented with various operating systems or combinations of operating systems.

A user enters commands or information into the computer 2212 through input device(s) 2236. Input devices 2236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2214 through the system bus 2218 via interface port(s) 2238. Interface port(s) 2238 include, for example, a serial port, a parallel port, a game port, and a universal serial bus (USB). Output device(s) 2240 use some of the same type of ports as input device(s) 2236. Thus, for example, a USB port may be used to provide input to computer 2212, and to output information from computer 2212 to an output device 2240. Output adapters 2242 are provided to illustrate that there are some output devices 2240 like monitors, speakers, and printers, among other output devices 2240, which require special adapters. The output adapters 2242 include, by way of illustration and not limitation, video and sound cards that provide a means of connection between the output device 2240 and the system bus 2218. It should be noted that other devices and/or systems of devices provide both input and output capabilities such as remote computer(s) 2244.

Computer 2212 can operate in a networked environment using logical connections to one or more remote computers, such as remote computer(s) 2244. The remote computer(s) 2244 can be a personal computer, a server, a router, a network PC, a workstation, a microprocessor based appliance, a peer device or other common network node and the like, and typically includes many or all of the elements described relative to computer 2212. For purposes of brevity, only a memory storage device 2246 is illustrated with remote computer(s) 2244. Remote computer(s) 2244 is logically connected to computer 2212 through a network interface 2248 and then physically connected via communication connection 2250. Network interface 2248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2250 refers to the hardware/software employed to connect the network interface 2248 to the system bus 2218. While communication connection 2250 is shown for illustrative clarity inside computer 2212, it can also be external to computer 2212. The hardware/software necessary for connection to the network interface 2248 includes, for exemplary purposes only, internal and external technologies such as, modems including regular telephone grade modems, cable modems and DSL modems, ISDN adapters, and Ethernet cards.

FIG. 23 is a schematic block diagram of a sample computing environment 2300 with which the disclosed subject matter can interact. The sample computing environment 2300 includes one or more client(s) 2302. The client(s) 2302 can be hardware and/or software (e.g., threads, processes, computing devices). The sample computing environment 2300 also includes one or more server(s) 2304. The server(s) 2304 can also be hardware and/or software (e.g., threads, processes, computing devices). The servers 2304 can house threads to perform transformations by employing one or more embodiments as described herein, for example. One possible communication between a client 2302 and servers 2304 can be in the form of a data packet adapted to be transmitted between two or more computer processes. The sample computing environment 2300 includes a communication framework 2306 that can be employed to facilitate communications between the client(s) 2302 and the server(s) 2304. The client(s) 2302 are operably connected to one or more client data store(s) 2308 that can be employed to store information local to the client(s) 2302. Similarly, the server(s) 2304 are operably connected to one or more server data store(s) 2310 that can be employed to store information local to the servers 2304.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A time of flight sensor device, comprising:
an emitter component configured to emit, for each pulse period of each measuring cycle of a distance measuring sequence, a light pulse having a falling e at a first time, wherein the distance measuring sequence comprises multiple measuring cycles and each measuring cycle comprises multiple pulse periods;
a photo-sensor component comprising a photo-detector, the photo-detector comprising
a photo device configured to generate electrical energy in proportion to a quantity of received light, and
a measuring capacitor connected to the photo device via a control line switch controlled by a gating signal,
wherein
the photo-sensor component is configured to, for each pulse period of each measuring cycle, set the gating signal of the control line switch at a second time during the pulse period defined relative to the first time, and reset the control signal at a third time, wherein setting the gating signal at the second time and resetting the gating signal at the third time causes a portion of the electrical energy to be stored in the measuring capacitor,
the portion of the electrical energy is proportional to one of ambient light, a leading edge portion of a received light pulse plus the ambient light, or a trailing edge portion of the received light pulse plus the ambient light,
the emitter component and the photo-sensor component are configured to, for each measuring cycle of the multiple measuring cycles after a first of the measuring cycles, increase the number of pulse periods executed in the measuring cycle relative to an immediately preceding measuring cycle of the multiple measuring cycles,
the photo-sensor component is configured to measure a voltage value on the measuring capacitor and store the voltage value in response to completion of each of the multiple measuring cycles to yield multiple values of a pulse characteristic, and
the time of flight sensor device further comprises a distance determination component configured to, in response to completion of all of the multiple measuring cycles of the distance measuring sequence, select a pulse characteristic value of the multiple values of the pulse characteristic and determine a propagation time of the light pulse based on the pulse characteristic value.

2. The time of flight sensor device of claim 1, wherein the distance determination component is configured to select, as the pulse characteristic value, a highest value of the multiple values that does not exceed a threshold value.

3. The time of flight sensor of claim 1, wherein the distance determination component is configured to select, as the pulse characteristic value, a lowest value of the multiple values that exceeds a threshold value.

4. The time of flight sensor device of claim 1, wherein
the measuring capacitor is a first measuring capacitor, the control line switch is a first control line switch, the gating signal is a first gating signal, the portion of the electrical energy is a first portion of the electrical energy, the voltage value is a first voltage value, and the multiple values of the pulse characteristic are multiple first values of a first pulse characteristic,
the photo-sensor component further comprises
a second measuring capacitor connected to the photo device via a second control line switch controlled by a second gating signal, and
a third measuring capacitor connected to the photo device via a third control line switch controlled by a third gating signal,
the photo-sensor component is further configured to, for each pulse period of the measuring cycle:
set the second gating signal of the second control line switch at or approximately at the third time and reset the second gating signal at a fourth time during the pulse period defined relative to the first time, wherein setting the second gating signal at or approximately at the third time and resetting the second gating signal at the fourth time causes a second portion of the electrical energy to be stored in the second measuring capacitor, and
set the third gating signal of the third control line switch at or approximately at the fourth time and reset the third gating signal at a fifth time during the pulse period defined relative to the first time, wherein setting the third gating signal at or approximately at the fourth time and resetting the third gating signal at the fifth time causes a third portion of the electrical energy to be stored in the third measuring capacitor, and
the photo-sensor component is further configured to:
measure a second voltage value on the second measuring capacitor and store the second voltage value in response to completion of each of the multiple measuring cycles to yield multiple second values of a second pulse characteristic, and
measuring a third voltage value on the third measuring capacitor and store the third voltage value in response to completion of each of the multiple measuring cycles to yield multiple third values of a third pulse characteristic.

5. The time of flight sensor device of claim 4, wherein the distance determination component is further configured to, in response to completion of the multiple measuring cycles of the distance measuring sequence,
select a second pulse characteristic value of the multiple second values,
select a third pulse characteristic value of the multiple third values, and determine the propagation time of the light pulse based on the first pulse characteristic value, the second pulse characteristic value, and the third pulse characteristic value.

6. The time of flight sensor device of claim 5, wherein the distance determination component is configured to determine the propagation time of the light pulse based on $$t_p = \frac{V_2 - V_0}{V_1 + V_2 - 2 \cdot V_0} T_0 + T_{s12}$$

where
tp is the propagation time,
$T_0$ is a duration of the light pulse,
$T_{s12}$ is the fourth time,
$V_0$ is the first pulse characteristic value indicative of ambient light,
$V_1$ is the second pulse characteristic value indicative of the leading edge portion of the received light pulse plus the ambient light, and
$V_2$ is the third pulse characteristic value indicative of the trailing edge portion of the received light pulse plus the ambient light.

7. The time of flight sensor device of claim 5, wherein the distance determination component is configured to determine the propagation time of the light pulse based on $$t_p = \frac{V_1 - V_2}{V_0 + V_1 - 2 \cdot V_2} T_0 + T_{s01}$$

where
tp is the propagation time,
$T_0$ is a duration of the light pulse,
$T_{s01}$ is the third time,
$V_0$ is the first pulse characteristic value indicative of the leading edge portion of the received light pulse plus the ambient light,
$V_1$ is the second pulse characteristic value indicative of railing edge portion of the received light pulse plus the ambient light, and
$V_2$ is the third pulse characteristic value indicative of the ambient light.

8. The time of flight sensor device of claim 1, wherein the emitter component and the photo-sensor component are configured to, for each measuring cycle of the multiple measuring cycles after a first of the measuring cycles, increase the number o pulse periods executed in the measuring cycle relative to the immediately preceding measuring cycle according to one of an arithmetic increasing function or an exponential increasing function.

9. The time of flight sensor device of claim 2, wherein the photo-sensor component is configured to,
in response to determining that the voltage value on the measuring capacitor does not exceed the threshold value upon completion of a measuring cycle of the multiple measuring cycles, overwrite a previously stored voltage value that was measured on the measuring capacitor upon completion of an immediately preceding measuring cycle of the multiple measuring cycles, and
in response to determining that the voltage value on the measuring capacitor exceeds the threshold value upon completion of the measuring cycle, discard the voltage value and select the previously stored voltage value as the pulse characteristic value.

10. The time of flight sensor device of claim 3, wherein the photo-sensor component is configured to,
in response to determining that the voltage value on the measuring capacitor does not exceed the threshold value upon completion of a measuring cycle of the multiple measuring cycles, overwrite a previously stored voltage value that was measured on the measuring capacitor upon completion of an immediately preceding measuring cycle of the multiple measuring cycles, and in response to determining that the voltage value on the measuring capacitor exceeds the threshold value upon completion of the measuring cycle and that the voltage value on the measuring capacitor upon completion of an immediately preceding measuring cycle does not exceed the threshold value, select the voltage value as the pulse characteristic value.

11. The time of flight sensor device of claim 1, wherein the distance determination component is further configured to determine, based on the propagation time, a distance of an object or a surface corresponding to a pixel that corresponds to the photo-detector, and the time of flight sensor device further comprises a control output component configured to generate an output signal in response to determining that the distance satisfies a defined criterion.

12. The time of flight sensor of claim 11, wherein the time of flight sensor is a component of an industrial safety system, and the output signal is configured to at least one of disconnect power from an industrial machine, place an industrial automation system in safe operation mode, or send a notification to one or more client devices.

13. A method for measuring a distance of an object, comprising
generating, by a photo device of a photo-detector of a time of flight sensor device comprising a processor, electrical energy in proportion to a quantity of light received at the photo device;
for each pulse period of each measuring cycle of a distance measuring sequence comprising multiple measuring cycles:
emitting, by the time of flight sensor device, a light pulse having a falling edge at a first time within the pulse period,
setting, by the time of flight sensor device at a second time during the pulse period defined relative to the first time, a gating signal of a control line switch, and
resetting, by the time of flight sensor device at a third time, the control signal, wherein the setting the gating signal at the second time and the resetting the gating signal at the third time causes a portion of the electrical energy to he stored in a measuring capacitor connected to the photo device via the first control line switch, and the portion of the electrical energy is proportional to one of ambient light, a leading edge portion of a received light pulse plus the ambient light, or a trailing edge portion of the received light pulse plus the ambient light;
performing, by the time of flight sensor device, the emitting, the setting, and the resetting for a number of pulse periods for each of the multiple measuring cycles, wherein the performing comprises increasing the number of pulse periods for each successive measuring cycle;
in response to completion of each of the multiple measuring cycles,
measuring, by the time of flight sensor device, a voltage value on the measuring capacitor, and
storing, by the time of flight sensor device, the voltage value,
wherein performing the measuring and the storing for each of the
multiple measuring cycles yields multiple values of a pulse characteristic; and
in response to completion of the multiple measuring cycles of the distance measuring sequence:
selecting, by the time of flight sensor device, a pulse characteristic value of the multiple values of the pulse characteristic, and
determining, by the time of flight sensor device, a propagation time of the light pulse based on the pulse characteristic value.

14. The method of claim 13, wherein the selecting comprises selecting, as the pulse characteristic value, a highest value of the multiple values that does not exceed a threshold value.

15. The method of claim 13, wherein
the measuring capacitor is a first measuring capacitor, the control line switch is a first control line switch, the gating signal is a first gating signal, the portion of the electrical energy is a first portion of the electrical energy, the voltage value is a first voltage value, and the multiple values of the pulse characteristic are multiple first values of a first pulse characteristic, and
the method further comprises:
for each pulse period of each measuring cycle of the distance measuring sequence:
setting, by the time of flight sensor device at or approximately at the third time, a second gating signal of a second control line switch, and
resetting, by the time of flight sensor device at a fourth time during the pulse period defined relative to the first time, the second gating control signal, wherein the setting the second gating signal at or approximately at the third time and the resetting the second gating signal at the fourth time causes a second portion of the electrical energy to be stored in a second measuring capacitor connected to the photo device via the second control line switch,
setting, by the time of flight sensor device at or approximately at the fourth time, a third gating signal of a third control line switch, and
resetting, by the time of flight sensor device at a fifth time during the pulse period defined relative to the first time, at third gating control signal, wherein the setting the third gating signal at or approximately at the fourth time and the resetting the third gating signal at the fifth time causes a third portion of the electrical energy to be stored in a third measuring capacitor connected to the photo device via the third control line switch; and
in response to completion of each of the multiple measuring cycles:
measuring, by the time of flight sensor device, a second voltage value on the second measuring capacitor,
storing, by the time of flight sensor device, the second voltage value, wherein performing the measuring and the storing of the second voltage value for each of the multiple measuring cycles yields multiple second values of a second pulse characteristic,
measuring, by the time of flight sensor device, a third voltage value on the third measuring capacitor, and
storing, by the time of flight sensor device, the third voltage value, wherein performing the measuring and the storing of the third voltage value for each of the multiple measuring cycles yields multiple third values of a third pulse characteristic.

16. The method of claim 15, wherein the determining the propagation time comprises:
selecting a second pulse characteristic value of the multiple second values,
selecting a third pulse characteristic value of the multiple third values, and determining the propagation time of the light pulse based on the first pulse characteristic value, the second pulse characteristic value, and the third pulse characteristic value.

17. The method of claim 14, further comprising:
in response to determining that the voltage value on the measuring capacitor does not exceed the threshold value upon completion of a measuring cycle of the multiple measuring cycles,
  overwriting, by the time of flight sensor device, a previously stored voltage value that was measured on the measuring capacitor upon completion of an immediately preceding measuring cycle of the multiple measuring cycles, and
in response to determining that the voltage value on the measuring capacitor exceeds the threshold value upon completion of the measuring cycle,
  discarding, by the time of flight sensor device, the voltage value, and
  selecting, by the time of flight sensor device, the previously stored voltage value as the pulse characteristic value.

18. The method of claim 13, further comprising:
determining, by the time of flight sensor device based on the propagation time, a distance of an object or a surface corresponding to a pixel that corresponds to the photo-detector; and
in response to determining that the distance satisfies a criterion, generating, by the time of flight sensor device, an output signal.

19. A non-transitory computer-readable medium having stored thereon instructions that, in response to execution, cause a time of flight sensor device comprising a processor and a photo device that generates electrical energy in proportion to a quantity of received light, to perform operations, the operations comprising:
  for each pulse period of each measuring cycle of a distance measuring sequence comprising multiple measuring cycles:
    initiating emission of a light pulse having a frilling edge at a first time within the pulse period,
    setting, at a second time during the pulse period defined relative to the first tune, a gating signal of a control line switch that controls transfer of the electrical energy to a measuring capacitor, and
    resetting, at a third time, the control signal, wherein the setting the gating signal at the second time and the resetting the gating signal at the third time causes a portion of the electrical energy to be stored in the measuring capacitor, and the portion of the electrical energy is proportional to one of ambient light, a leading edge portion of a received light pulse plus the ambient light, a trailing edge portion of the received light pulse plus the ambient light;
  performing the emitting, the setting, and the resetting for a number of pulse periods for each of the multiple measuring cycles, wherein the performing comprises increasing the number of pulse periods for each measuring cycle relative to an immediately preceding measuring cycle;
  in response to completion of each of the multiple measuring cycles,
    measuring a voltage value on the measuring capacitor, and
    storing the voltage value in a memory,
    wherein performing the measuring and the storing for each of the multiple measuring cycles yields multiple values of a pulse characteristic; and
  in response to completion of the multiple measuring cycles:
    selecting a pulse characteristic value of the multiple values of the pulse characteristic, and
    determining a propagation time of the light pulse based on the pulse characteristic value.

20. The non-transitory computer-readable medium of claim 19, wherein the selecting comprises selecting, as the pulse characteristic value, a highest value of the multiple values that does not exceed a threshold value.

* * * * *